(12) United States Patent
Pappas

(10) Patent No.: US 9,910,911 B2
(45) Date of Patent: Mar. 6, 2018

(54) COMPUTER IMPLEMENTED METHODS AND APPARATUS FOR IMPLEMENTING A TOPICAL-BASED HIGHLIGHTS FILTER

(71) Applicant: salesforce.com, inc., San Francisco, CA (US)

(72) Inventor: Jonathan Pappas, San Francisco, CA (US)

(73) Assignee: salesforce.com, San Francisco, CA (US)

( * ) Notice: Subject to any disclaimer, the term of this patent is extended or adjusted under 35 U.S.C. 154(b) by 0 days.

(21) Appl. No.: 15/152,820

(22) Filed: May 12, 2016

(65) Prior Publication Data

US 2016/0253409 A1  Sep. 1, 2016

Related U.S. Application Data

(63) Continuation of application No. 13/946,632, filed on Jul. 19, 2013, now Pat. No. 9,367,626.

(60) Provisional application No. 61/674,452, filed on Jul. 23, 2012.

(51) Int. Cl.
  *G06F 17/30* (2006.01)
  *G06Q 30/00* (2012.01)

(52) U.S. Cl.
  CPC ........ *G06F 17/30601* (2013.01); *G06F 17/30* (2013.01); *G06F 17/30867* (2013.01); *G06Q 30/01* (2013.01)

(58) Field of Classification Search
  CPC ......... G06F 17/30867; G06F 17/30864; G06F 17/30554; G06F 17/30572; G06F 17/30601; G06F 17/30; G06F 17/2247; G06F 3/00; G06F 17/30023; G06F 17/2785; G06F 17/30525; G06F 17/3056; G06F 17/30598; G06F 17/20; G06F 17/30705; G06C 50/01; G06C 30/0202; G06C 30/01;

(Continued)

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

(Continued)

*Primary Examiner* — Anh Ly
(74) *Attorney, Agent, or Firm* — Weaver Austin Villeneuve & Sampson LLP

(57) ABSTRACT

Disclosed are methods, apparatus, systems, and computer readable storage media for filtering content to be displayed in an online social network. Highlights from a plurality of highlight sources relevant to a first user can be received. Topics or other subject matter associated with the received highlights can be identified and social network data to be presented to the first user can be determined based on the identified subject matter. In some implementations, data indicating the determined social network data can be generated and provided to a display device associated with the first user. A presentation including a reference to the determined social network data can be displayed on the display device.

19 Claims, 26 Drawing Sheets

(58) Field of Classification Search
CPC ......... G06C 30/10; H04L 41/22; H04L 51/16; G09B 5/02; G06N 3/0472; G06Q 20/405
See application file for complete search history.

(56) References Cited

U.S. PATENT DOCUMENTS

| | | |
|---|---|---|
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 * | 6/2010 | Weissman ........... G06F 21/6218 717/100 |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,893,030 B1 | 11/2014 | Anderson et al. |
| 9,367,626 B2 | 6/2016 | Pappas |
| 9,552,334 B1 * | 1/2017 | Meisels ................ G06F 17/218 707/E17.005 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0001885 A1 | 1/2003 | Lin et al. |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |

(56) References Cited

U.S. PATENT DOCUMENTS

| | | |
|---|---|---|
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0098290 A1 | 5/2004 | Hirschenberger et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0016091 A1 | 1/2008 | Chandra |
| 2008/0016164 A1 | 1/2008 | Chandra |
| 2008/0040370 A1* | 2/2008 | Bosworth ............ G06F 17/3089 707/E17.116 |
| 2008/0046845 A1 | 2/2008 | Chandra |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0240569 A1 | 9/2009 | Ramer et al. |
| 2009/0245603 A1 | 10/2009 | Koruga et al. |
| 2009/0327520 A1 | 12/2009 | Lee et al. |
| 2010/0223581 A1* | 9/2010 | Manolescu ............ G06Q 10/00 715/853 |
| 2010/0241964 A1* | 9/2010 | Belinsky ................ G06Q 10/10 715/738 |
| 2010/0257117 A1* | 10/2010 | Shvadron .......... G06F 17/30616 705/36 R |
| 2010/0318571 A1 | 12/2010 | Pearlman et al. |
| 2010/0332404 A1 | 12/2010 | Valin |
| 2011/0004831 A1* | 1/2011 | Steinberg ............. H04N 21/454 715/753 |
| 2011/0022465 A1* | 1/2011 | Malleshaiah .......... G06Q 30/02 705/14.54 |
| 2011/0047013 A1 | 2/2011 | McKenzie, III |
| 2011/0068885 A1 | 3/2011 | Fullerton et al. |
| 2011/0107373 A1* | 5/2011 | Scott .................. H04N 7/17318 725/40 |
| 2011/0161130 A1 | 6/2011 | Whalin et al. |
| 2011/0218958 A1 | 9/2011 | Warshaysky et al. |
| 2011/0247051 A1 | 10/2011 | Bulumulla et al. |
| 2011/0271230 A1 | 11/2011 | Harris et al. |
| 2011/0276513 A1* | 11/2011 | Erhart ............... G06F 17/30539 705/347 |
| 2011/0289010 A1* | 11/2011 | Rankin, Jr. ............ G06Q 50/16 705/313 |
| 2011/0301441 A1 | 12/2011 | Bandic et al. |
| 2012/0042218 A1 | 2/2012 | Cinarkaya et al. |
| 2012/0095863 A1* | 4/2012 | Schiff ................ G06Q 30/0631 705/26.7 |
| 2012/0110515 A1* | 5/2012 | Abramoff ......... G06F 17/30994 715/854 |
| 2012/0233137 A1 | 9/2012 | Jakobson et al. |
| 2012/0233212 A1* | 9/2012 | Newton ................. G06Q 30/02 707/774 |
| 2012/0290407 A1 | 11/2012 | Hubbard et al. |
| 2013/0007787 A1 | 1/2013 | John et al. |
| 2013/0018954 A1* | 1/2013 | Cheng ................... G06Q 10/00 709/204 |
| 2013/0018957 A1* | 1/2013 | Parnaby ................ G06Q 10/10 709/204 |
| 2013/0024465 A1* | 1/2013 | Schiff ............... G06F 17/30873 707/749 |
| 2013/0073983 A1 | 3/2013 | Rasmussen et al. |
| 2013/0080881 A1 | 3/2013 | Goodspeed et al. |
| 2013/0085803 A1 | 4/2013 | Mauro et al. |
| 2013/0117677 A1 | 5/2013 | St. Jacques, Jr. |
| 2013/0198196 A1 | 8/2013 | Myslinski |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0254308 A1 | 9/2013 | Rose et al. |
| 2013/0263020 A1 | 10/2013 | Heiferman et al. |
| 2014/0025692 A1* | 1/2014 | Pappas .................... G06F 17/30 707/754 |
| 2014/0040162 A1* | 2/2014 | McConnell ....... G06F 17/30312 705/347 |
| 2014/0101247 A1 | 4/2014 | Pappas |
| 2014/0115004 A1* | 4/2014 | Isaacs ................... H04L 67/306 707/784 |
| 2014/0136521 A1 | 5/2014 | Pappas |
| 2014/0143681 A1 | 5/2014 | Chandra |
| 2014/0156673 A1 | 6/2014 | Mehta et al. |
| 2014/0310079 A1 | 10/2014 | Girard et al. |
| 2014/0337436 A1* | 11/2014 | Hoagland ......... G06F 17/30867 709/204 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0089409 A1* | 3/2015 | Asseily .................. G06Q 10/10 715/765 |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2015/0244750 A1* | 8/2015 | Bosworth ........... G06F 17/3089 709/204 |
| 2015/0301703 A1 | 10/2015 | Steinberg et al. |

OTHER PUBLICATIONS

U.S. Office Action dated Apr. 22, 2015 issued in U.S. Appl. No. 13/946,632.

U.S. Final Office Action dated Oct. 27, 2015 issued in U.S. Appl. No. 13/946,632.

U.S. Notice of Allowance dated Feb. 9, 2016 issued in U.S. Appl. No. 13/946,632.

Kagawa-Singer, et al. "Health-Related Quality of Life and Culture" *Seminars in Oncology Nursing* 26(1):59-67, 2010.

Wakkee, Ingrid "Mapping Network Development of International New Ventures with the Use of Company E-mails" *J Int Entrepr* 4:191-208, 2006.

\* cited by examiner

| Event ID 911 | Object ID 912 | Created by ID 913 |
|---|---|---|
| E1 | O615 | U5 |
| E2 | O489 | U101 |

Event History Table 910

| Event ID 931 | Comment 932 | Time/Date 933 |
|---|---|---|
| E37 | " " | 10-21-2010 5:32 PM |
| E37 | " " | 9-17-2010 |

Comment Table 930

| Event ID 921 | Old value 922 | New value 923 |
|---|---|---|
| E37 | 300 | 400 |
| E37 | 4.23 | 4.10 |

Field Change Table 920

| Event ID 951 | Post Text 952 | Time/Date 953 |
|---|---|---|
| E69 | " " | 10-11-2010 4:12 PM |
| E90 | " " | 8-12-2010 |

Post Table 950

| User ID 941 | Object ID 942 |
|---|---|
| U819 | O615 |
| U819 | O489 |
| U719 | O615 |

User Subscription Table 940

| User ID 961 | Event ID 962 |
|---|---|
| U819 | E37 |
| U819 | E90 |
| U719 | E37 |

News Feed Table 960

*FIGURE 9A*

| User ID 1701 | Inner Circle Object ID 1703 | Inner Circle User ID 1705 |
|---|---|---|
| U919 | O615, O712, O987... | U921, U981, U100... |
| U920 | O489, O213, O912... | U1400, U910, U111... |
| U921 | O615, O12, O451... | U919, U900, U202... |

⋮

Inner Circle Table 1700

| User ID 1711 | Global Influence Value 1713 |
|---|---|
| U098 | 531 |
| U419 | 256 |
| U999 | 098 |
| U120 | 087 |

⋮

Global Influence Table 1710

| Topic ID 1721 | User ID 1723 | Topical Influence Value 1725 |
|---|---|---|
| T199 | U521 | 145 |
| T199 | U777 | 43 |
| T199 | U098 | 099 |
| T199 | U761 | 003 |

⋮

Topical Influence Table 1720

| User ID 1711 | Topic ID 1713 |
|---|---|
| U919 | T412 |
| U919 | T212 |
| U919 | T909 |
| U920 | T511 |

⋮

Topical Relevance Table 1730

*FIGURE 17*

| Topic ID 2001 | Associated information update IDs 2011 |
|---|---|
| T331 | P522 |
| T331 | C123 |
| T332 | FC140 |

⋮

Topic Table 2000

COMPUTER IMPLEMENTED METHODS AND APPARATUS FOR IMPLEMENTING A TOPICAL-BASED HIGHLIGHTS FILTER

PRIORITY DATA

This patent document is a continuation of and claims priority to co-pending and commonly assigned U.S. patent application Ser. No. 13/946,632, now U.S. Pat. No. 9,367,626, titled "Computer Implemented Methods and Apparatus for Implementing a Topical-Based Highlights Filter", by Jonathan Pappas, filed Jul. 19, 2013, which claims priority to U.S. Provisional Patent Application No. 61/674,452, titled "System And Method For Implementing A Topical-Based Highlights Filter", by Jonathan Pappas, filed Jul. 23, 2012. The entire disclosures of U.S. patent application Ser. No. 13/946,632 and U.S. Provisional Patent Application No. 61/674,452 are hereby incorporated by reference in their entireties and for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This patent document relates generally to providing on-demand services in an online social network using a database system and, more specifically, to techniques for filtering data in the social network.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Database resources can be provided in a cloud computing context. However, using conventional database management techniques, it is difficult to know about the activity of other users of a database system in the cloud or other network. For example, the actions of a particular user, such as a salesperson, on a database resource may be important to the user's boss. The user can create a report about what the user has done and send it to the boss, but such reports may be inefficient, not timely, and incomplete. Also, it may be difficult to identify other users who might benefit from the information in the report.

BRIEF DESCRIPTION OF THE DRAWINGS

The included drawings are for illustrative purposes and serve only to provide examples of possible structures and operations for the disclosed inventive systems, apparatus, and methods for filtering data in an online social network. These drawings in no way limit any changes in form and detail that may be made by one skilled in the art without departing from the spirit and scope of the disclosed implementations.

FIG. 7 shows an example of a group feed on a group page according to some implementations.

FIG. 8 shows an example of a record feed containing a feed tracked update, post, and comments according to some implementations.

FIG. 9A shows an example of a plurality of tables that may be used in tracking events and creating feeds according to some implementations.

FIG. 17 shows examples of database tables that may be used in tracking highlight sources according to some implementations.

FIG. 20 shows an example of a topic table 2000 that may be used in tracking information updates and topic associations in accordance with some implementations.

FIG. 23 shows an example of an overlay window 2300 showing an expanded view of social network data derived from an inner circle highlight source according to some implementations.

DETAILED DESCRIPTION

Figure 1A:
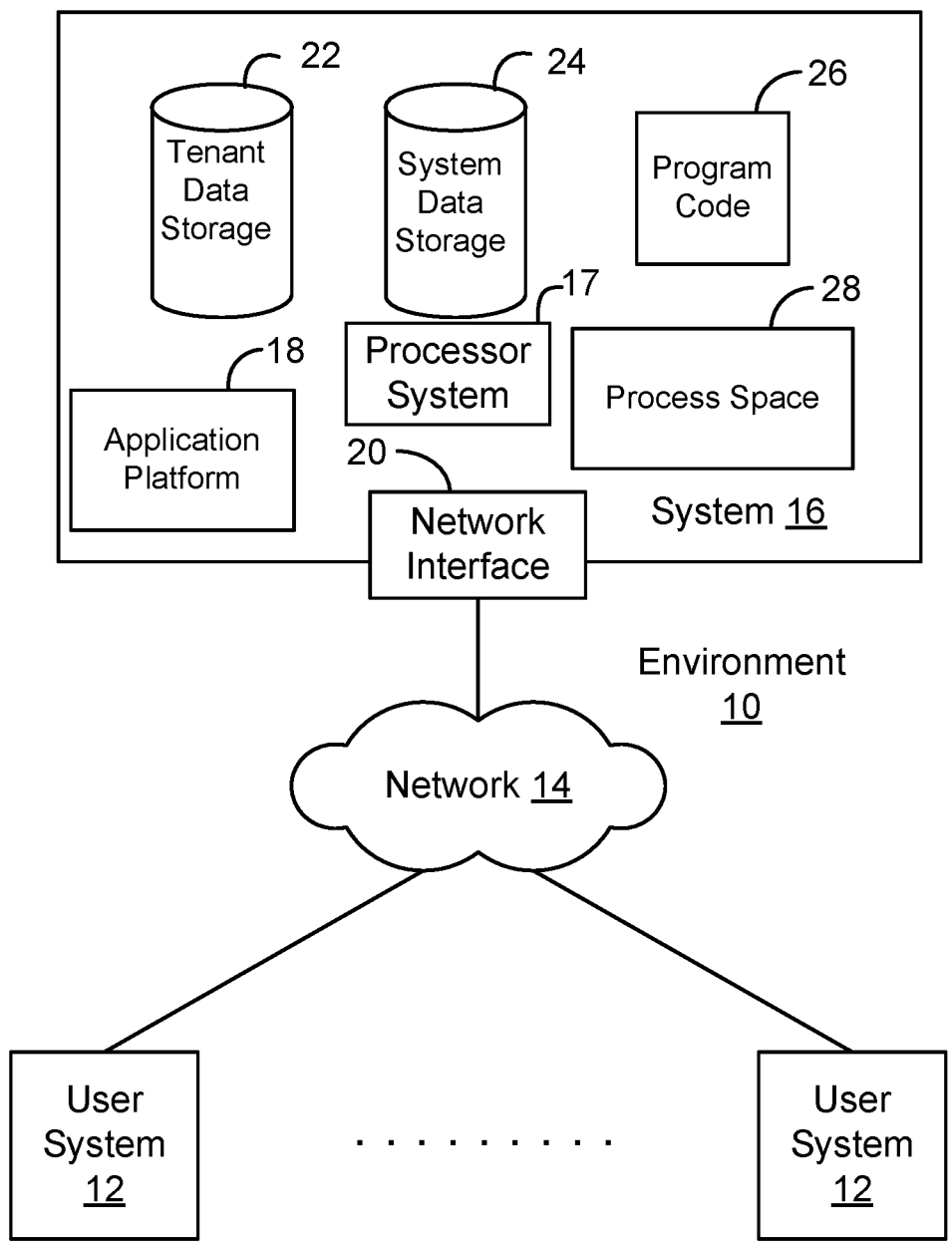
FIG. 1A shows a block diagram of an example of an environment 10 in which an on-demand database service can be used in accordance with some implementations.

Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, and computer-readable storage media for filtering content to display in an online social network, also referred to herein as a social networking system. One example of an online social network is Chatter®, provided by salesforce.com, inc. of San Francisco, Calif. Online social networks are increasingly becoming a common way to facilitate communication among people and groups of people, any of whom can be recognized as users of a social networking system. Some online social networks can be implemented in various settings, including organizations, e.g., enterprises such as companies or business partnerships, academic institutions, or groups within such an organization. For instance, Chatter® can be used by employee users in a division of a business organization to share data, communicate, and collaborate with each other for various purposes.

In some online social networks, users can access one or more information feeds, which include information updates presented as items or entries in the feed. Such a feed item can include a single information update or a collection of individual information updates. A feed item can include various types of data including character-based data, audio data, image data and/or video data. An information feed can be displayed in a graphical user interface (GUI) on a display device such as the display of a computing device as described below. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, an online social network may allow a user to follow data objects in the form of records such as cases, accounts, or opportunities, in addition to following individual users and groups of users. The "following" of a record stored in a database, as described in greater detail below, allows a user to track the progress of that record. Updates to the record, also referred to herein as changes to the record, are one type of information update that can occur and be noted on an information feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be user-submitted messages or can otherwise be generated in response to user actions or in response to events. Examples of messages include: posts, comments, indications of a user's personal preferences such as "likes" and "dislikes", updates to a user's status, uploaded files, and hyperlinks to social network data or other network data such as various documents and/or web pages on the Internet. Posts can include alphanumeric or other character-based user inputs such as words, phrases, statements, questions, emotional expressions, and/or symbols. Comments generally refer to responses to posts, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed, also referred to herein as the user's "wall," which is one example of an information feed displayed on the user's profile page.

In some implementations, an information feed may be specific to a group of users of an online social network. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to an information feed for a particular user, group, object, or other construct within an online social network, an email notification or other type of network communication may be transmitted to all users following the user, group, or object in addition to the inclusion of the data as a feed item in one or more feeds, such as a user's profile feed, a news feed, or a record feed. In some online social networks, the occurrence of such a notification is limited to the first instance of a published input, which may form part of a larger conversation. For instance, a notification may be transmitted for an initial post, but not for comments on the post. In some other implementations, a separate notification is transmitted for each such information update.

Some of the disclosed techniques can be implemented to filter content in an online social network to increase relevancy of information provided to a user. In some implementations, the techniques can be implemented to consider and aggregate information generated from multiple "graphs" of an online social network. For example, information gleaned from the social graph of a user may be aggregated with other data available from the social network to provide information on where to find better information on a social network feed. Information generated from the social graph can be aggregated and/or analyzed with information from a user's interest graph and/or sentiment graph in some instances, as explained in greater detail below. In some implementations, the techniques help identify and provide suggestions for pertinent information sources, thereby increasing the usefulness of the online social network. Some of the disclosed techniques may be implemented in an enterprise social network to increase the relevance of social network data to a user in a workplace setting, for example.

Some social networks make use of a social graph for mapping relationships between social network users. Relationships are formed between users that follow one another; a first user will follow a second user, and the second user's social network activities, such as comments, photographs, links, status updates, and product recommendations, will appear in both the second user's and the first user's respective social network feeds. In this fashion, the relative influential impact of the second user's activities will score higher on the social graph than similar activities by users not followed by the first user. This type of information can be used to suggest other users for the first user to follow, or may be used to identify relevant advertising.

In some conventional social networks, a suggestion to follow a user may appear when a first user follows a second user. The first user may be presented with a message that states "Followers of [second user] typically follow the following people." However, this suggestion may not be as relevant in a workplace setting where an enterprise social network may be used differently than a consumer social network. Enterprise social network users may follow a number of people in their company, including various executives and management leaders outside of their immediate department, project team members, and the like. This does not necessarily mean that they are "friends" with or communicate closely with all of those followed people—they may only be interested in the content or information provided by those followed people. In contrast, in a consumer social network, a first user follows a second user primarily to receive status updates and converse on a social level. Put another way, in an enterprise social network, information is a chief reason that a first user follows a second user.

Some of the disclosed techniques provide relevant information to an enterprise social network user. In one example, the disclose techniques permit suggestions such as "Because of your role and/or your current responsibilities and/or your current team, you should follow this person/topic/object/record, etc." In some implementations, the disclosed techniques can consider highlights from two or more different highlight sources to provide relevant information and/or recommendations to a first user. Highlights can include information updates or other content posted or published to a social network. Examples include conversations, posts, comments, updates to a user's status, updates to a record, uploaded files, and hyperlinks to social network data or other network data such as various documents and/or web pages on the Internet. Highlight sources can include one or more collections of users, entities, and/or topics that are relevant to the first user. Examples of highlights include inner circle highlights; global influence highlights; topical highlights; and serendipity highlights. The combination of multiple types of highlights such as these can provide insight on the overlap between a social network user's social graph, interest graph, and sentiment graph. Moreover, this insight can be analyzed to provide contextual recommendations that have more relevance to an enterprise social network user.

In some implementations, a highlight source can be defined based on a level of interaction with the first user. For example, inner circle highlights can include content posted to a social network from a group of users with whom a first user interacts most. Outside of the context of an online setting, this may be equivalent to a person's closest friends or a person's team. In one example, a user's inner circle may be identified manually by the first user, or by monitoring the user's activity on the social network, or a combination of the two. In some implementations, the inner circle may include only users, or data objects, or non-human entities such as servers or devices having a presence on the social network, or a combination. In some implementations, content published by a user's inner circle may readily identify the topics or people most relevant to the user. In an implementation, an inner circle may change over time.

In some implementations, a highlight source can be defined in whole or in part based on an influence level in the online social network. Influence considers users, data objects, and other entities that have influence on the online social network. For example, global influence can consider those users that exert the most influence on a social network. Another example of an influence highlight source is a topical influence highlight source. Topical influence can consider those entities that exert influence on a topic in the online social network. Influence may be measured using a number of different metrics, including but not limited to, the number of followers of a user, the number of posts of the user that are "liked" or re-posted, the number of comments the user receives, etc. Other techniques may be used to measure influence on a social network. Influence may be used to identify topics or people that may be relevant to a single user or a group of users. Those users identified as influential may change over time. According to various implementations, data objects, records, or other entities having presence on a social network may have influence.

In some implementations, a highlight source can be defined in whole or in part based on topics of interest to a user, e.g., topics that a user most commonly discusses in his posted content. In some implementations, topics may be identified automatically by a system or manually by the user using a closed or open library of terms. In some implementations, the system that receives and processes social network feed activity can apply machine learning to build a library or database of topics, and can assign or suggest topics to the user based upon that learning. In some implementations, a combination of manual and machine processes for identifying and labeling content with topics may be used. According to various implementations, a list of relevant topics to a user or a group of users can change over time.

Another example of a highlight source is a serendipity highlight source. According to some implementations, serendipity highlights can include topics, users, data objects, records, or other entities accessible through the social network feed that may be of interest to a user, but do not fall within any particular inner circle, influence, or common topic framework. Serendipity highlights may consider the user's activity over time on the social network, and may also consider other users' activities to identify a pattern. In some implementations, serendipity highlights can be selected in part based on random sampling of content in the online social network.

Some of the disclosed techniques involve considering highlights from two or more highlight sources and aggregating data generated from each to identify and suggest information sources that may be relevant to a user. Some implementations also considers data available from other external social networks, such that the user's activities on consumer social networks such as Facebook®, Twitter®, LinkedIn®, Instagram®, Pinterest® and the like are also used to help identify and suggest information sources that may be relevant to a user. Information from consumer social networks can be part of an interest graph of a user, for example. Some of the disclosed techniques further analyze information from highlight sources in connection with feelings associated with information. These sentiments may be part of a sentiment graph of the user. For example, if a group of users or users within a group of users express a certain sentiment around a topic, e.g., positive or negative, this can alter whether information sources will be relevant to the user or group of users.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "information feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different information feeds. A second user following a first user and a record can receive the feed items associated with the first user and the record for display in the second user's news feed, which is another type of information feed. In some implementations, the feed items from any number of followed users and records can be combined into a single information feed of a particular user.

As examples, a feed item can be a message, such as a user-generated post of text data, and a feed tracked update to a record or profile, such as a change to a field of the record. Feed tracked updates are described in greater detail below. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group. In one implementation, there is only one status for a record.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and messages, such as posts, comments, likes, etc., can define group conversations and change over time.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" is a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

I. General Overview

Systems, apparatus, and methods are provided for implementing enterprise level social and business information networking. Such implementations can provide more efficient use of a database system. For instance, a user of a database system may not easily know when important information in the database has changed, e.g., about a project or client. Implementations can provide feed tracked updates about such changes and other events, thereby keeping users informed.

By way of example, a user can update a record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed right to the manager's feed page or other page.

Next, mechanisms and methods for providing systems implementing enterprise level social and business information networking will be described with reference to several implementations. First, an overview of an example of a database system is described, and then examples of tracking events for a record, actions of a user, and messages about a user or record are described. Various implementations about the data structure of feeds, customizing feeds, user selection of records and users to follow, generating feeds, and displaying feeds are also described.

II. System Overview

FIG. 1A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 1A (and in more detail in FIG. 1B) user systems 12 might interact via a network 14 with an on-demand database service, which is implemented in the example of FIG. 1A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 1B:
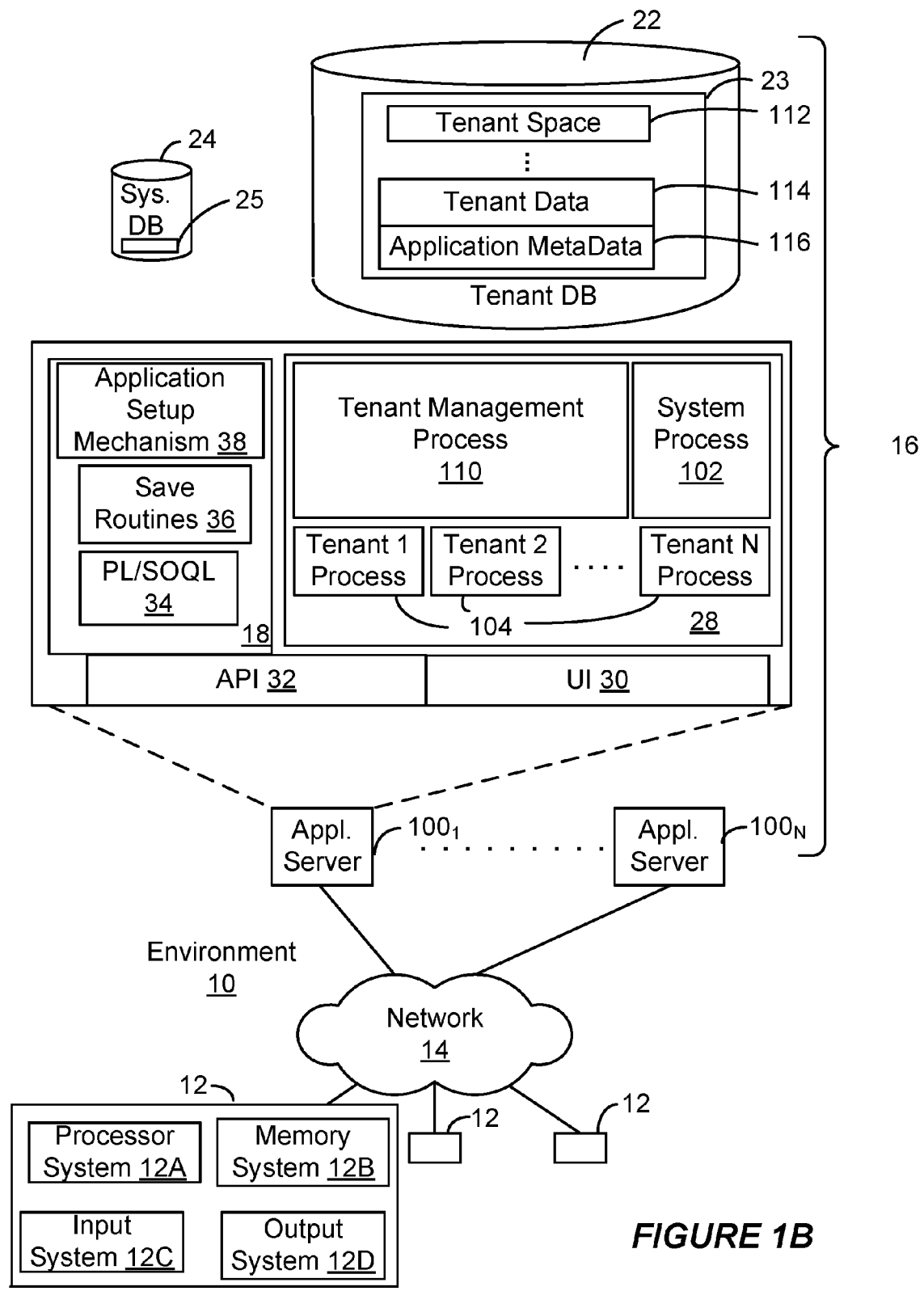
FIG. 1B shows a block diagram of an example of some implementations of elements of FIG. 1A and various possible interconnections between these elements.

One arrangement for elements of system 16 is shown in FIGS. 1A and 1B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 1B shows a block diagram of an example of some implementations of elements of FIG. 1A and various possible interconnections between these elements. That is, FIG. 1B also illustrates environment 10. However, in FIG. 1B elements of system 16 and various interconnections in some implementations are further illustrated. FIG. 1B shows that user system 12 may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 1001-100N, system process space 102, tenant process spaces 104, tenant management process space 110, tenant storage space 112, user storage 114, and application metadata 116. In other implementations, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to communicate with tenant data storage 22 and the tenant data 23 therein, and system data storage 24 and the system data 25 therein to serve requests of user systems 12. The tenant data 23 might be divided into individual tenant storage spaces 112, which can be either a physical arrangement and/or a logical arrangement of data. Within each tenant storage space 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage space 112. A UI 30 provides a user interface and an API 32 provides an application programmer interface to system 16 resident processes to users and/or developers at user systems 12. The tenant data and the system data may be stored in various databases, such as one or more Oracle☐ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 1001 might be coupled via the network 14 (e.g., the Internet), another application server 100N-1 might be coupled via a direct network link, and another application server 100N might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain implementations, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one implementation, therefore, an interface system implementing a load balancing function (e.g., an F5 Big-IP load balancer) is communicably coupled between the application servers 100 and the user systems 12 to distribute requests to the application servers 100. In one implementation, the load balancer uses a least connections algorithm to route user requests to the application servers 100. Other examples of load balancing algorithms, such as round robin and observed response time, also can be used. For example, in certain implementations, three consecutive requests from the same user could hit three different application servers 100, and three requests from different users could hit the same application server 100. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 100 to request and update system-level and tenant-level data from system 16 that may involve sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
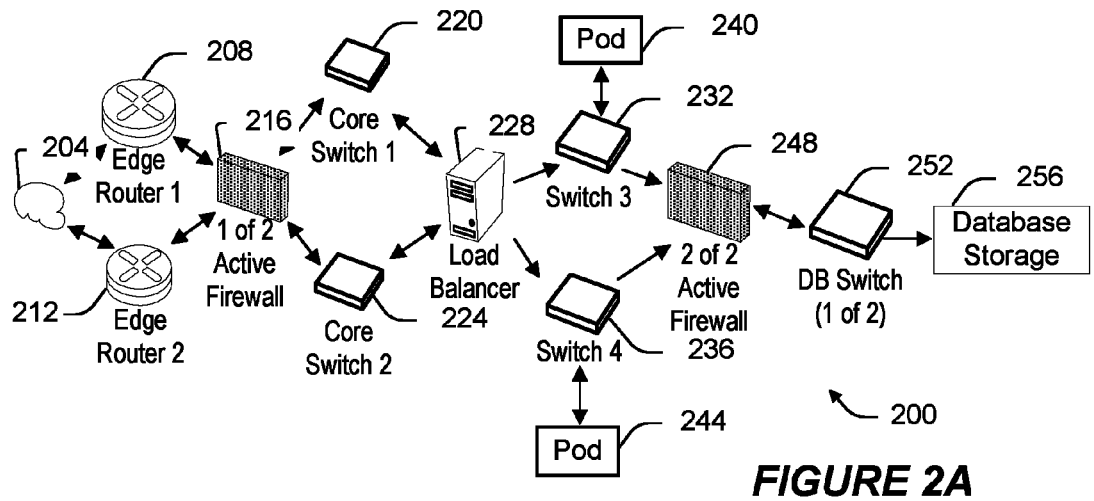
FIG. 2A shows a system diagram illustrating an example of architectural components of an on-demand database service environment 200 according to some implementations.

FIG. 2A shows a system diagram illustrating an example of architectural components of an on-demand database service environment 200 according to some implementations. A client machine located in the cloud 204, generally referring to one or more networks in combination, as described herein, may communicate with the on-demand database service environment via one or more edge routers 208 and 212. A client machine can be any of the examples of user systems 12 described above. The edge routers may communicate with one or more core switches 220 and 224 via firewall 216. The core switches may communicate with a load balancer 228, which may distribute server load over different pods, such as the pods 240 and 244. The pods 240 and 244, which may each include one or more servers and/or other computing resources, may perform data processing and other operations used to provide on-demand services. Communication with the pods may be conducted via pod switches 232 and 236. Components of the on-demand database service environment may communicate with a database storage 256 via a database firewall 248 and a database switch 252.

Figure 2B:
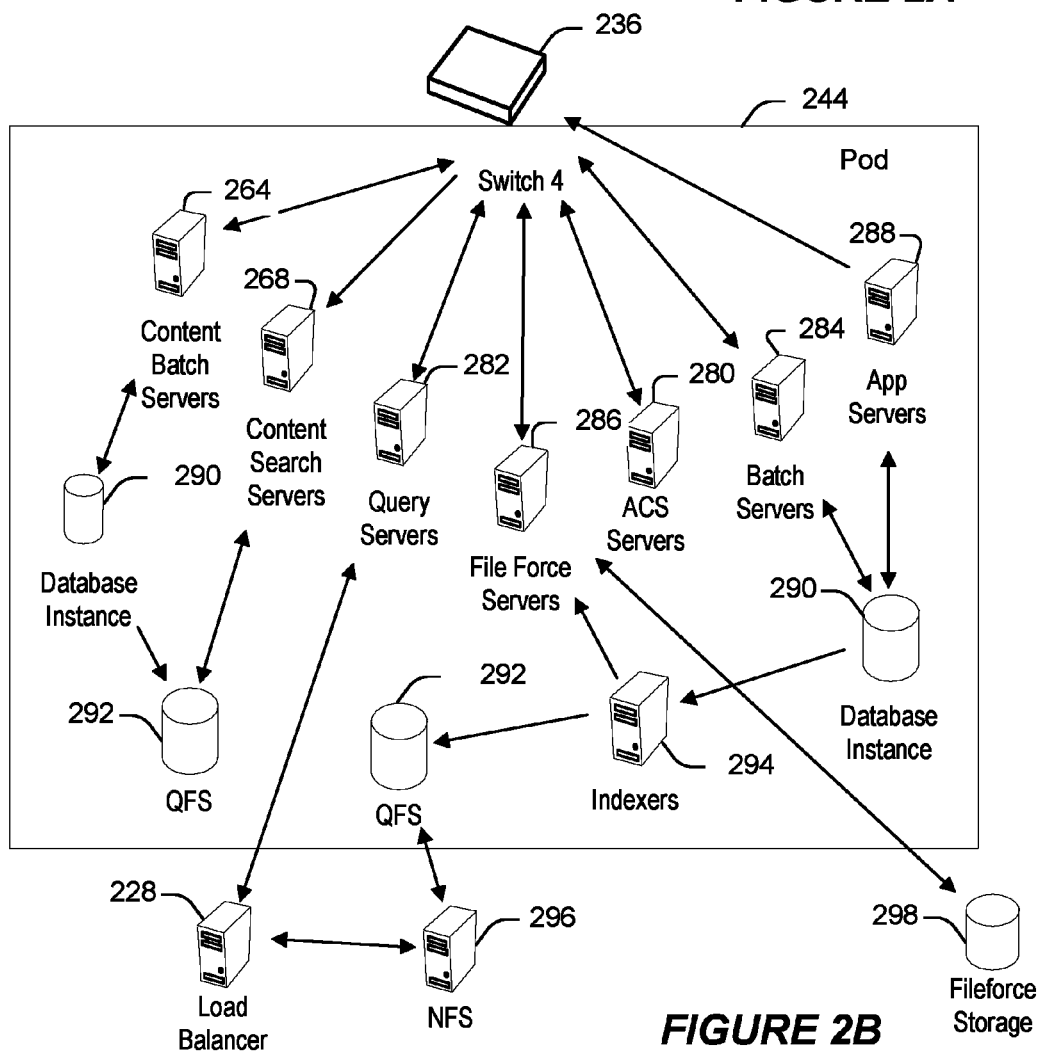
FIG. 2B shows a system diagram further illustrating an example of architectural components of an on-demand database service environment according to some implementations.

As shown in FIGS. 2A and 2B, accessing an on-demand database service environment may involve communications transmitted among a variety of different hardware and/or software components. Further, the on-demand database service environment 200 is a simplified representation of an actual on-demand database service environment. For example, while only one or two devices of each type are shown in FIGS. 2A and 2B, some implementations of an on-demand database service environment may include anywhere from one to many devices of each type. Also, the on-demand database service environment need not include each device shown in FIGS. 2A and 2B, or may include additional devices not shown in FIGS. 2A and 2B.

Moreover, one or more of the devices in the on-demand database service environment 200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 204 is intended to refer to a data network or plurality of data networks, often including the Internet. Client machines located in the cloud 204 may communicate with the on-demand database service environment to access services provided by the on-demand database service environment. For example, client machines may access the on-demand database service environment to retrieve, store, edit, and/or process information.

In some implementations, the edge routers 208 and 212 route packets between the cloud 204 and other components of the on-demand database service environment 200. The edge routers 208 and 212 may employ the Border Gateway Protocol (BGP). The BGP is the core routing protocol of the Internet. The edge routers 208 and 212 may maintain a table of IP networks or 'prefixes', which designate network reachability among autonomous systems on the Internet.

In one or more implementations, the firewall 216 may protect the inner components of the on-demand database service environment 200 from Internet traffic. The firewall 216 may block, permit, or deny access to the inner components of the on-demand database service environment 200 based upon a set of rules and other criteria. The firewall 216 may act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 may be configured as network bridges that quickly route data between different components within the on-demand database service environment. In some implementations, the use of two or more core switches 220 and 224 may provide redundancy and/or reduced latency.

In some implementations, the pods 240 and 244 may perform the core data processing and service functions provided by the on-demand database service environment. Each pod may include various types of hardware and/or software computing resources. An example of the pod architecture is discussed in greater detail with reference to FIG. 2B.

In some implementations, communication between the pods 240 and 244 may be conducted via the pod switches 232 and 236. The pod switches 232 and 236 may facilitate communication between the pods 240 and 244 and client machines located in the cloud 204, for example via core switches 220 and 224. Also, the pod switches 232 and 236 may facilitate communication between the pods 240 and 244 and the database storage 256.

In some implementations, the load balancer 228 may distribute workload between the pods 240 and 244. Balancing the on-demand service requests between the pods may assist in improving the use of resources, increasing throughput, reducing response times, and/or reducing overhead. The load balancer 228 may include multilayer switches to analyze and forward traffic.

In some implementations, access to the database storage 256 may be guarded by a database firewall 248. The database firewall 248 may act as a computer application firewall operating at the database application layer of a protocol stack. The database firewall 248 may protect the database storage 256 from application attacks such as structure query language (SQL) injection, database rootkits, and unauthorized information disclosure.

In some implementations, the database firewall 248 may include a host using one or more forms of reverse proxy services to proxy traffic before passing it to a gateway router. The database firewall 248 may inspect the contents of database traffic and block certain content or database requests. The database firewall 248 may work on the SQL application level atop the TCP/IP stack, managing applications' connection to the database or SQL management interfaces as well as intercepting and enforcing packets traveling to or from a database network or application interface.

In some implementations, communication with the database storage 256 may be conducted via the database switch 252. The multi-tenant database storage 256 may include more than one hardware and/or software components for handling database queries. Accordingly, the database switch 252 may direct database queries transmitted by other components of the on-demand database service environment (e.g., the pods 240 and 244) to the correct components within the database storage 256.

In some implementations, the database storage 256 is an on-demand database system shared by many different organizations. The on-demand database system may employ a multi-tenant approach, a virtualized approach, or any other type of database approach. An on-demand database system is discussed in greater detail with reference to FIGS. 1A and 1B.

FIG. 2B shows a system diagram further illustrating an example of architectural components of an on-demand database service environment according to some implementations. The pod 244 may be used to render services to a user of the on-demand database service environment 200. In some implementations, each pod may include a variety of servers and/or other systems. The pod 244 includes one or more content batch servers 264, content search servers 268, query servers 282, file force servers 286, access control system (ACS) servers 280, batch servers 284, and app servers 288. Also, the pod 244 includes database instances 290, quick file systems (QFS) 292, and indexers 294. In one or more implementations, some or all communication between the servers in the pod 244 may be transmitted via the switch 236.

In some implementations, the app servers 288 may include a hardware and/or software framework dedicated to the execution of procedures (e.g., programs, routines, scripts) for supporting the construction of applications provided by the on-demand database service environment 200 via the pod 244. In some implementations, the hardware and/or software framework of an app server 288 is configured to execute operations of the services described herein, including performance of the blocks of methods described with reference to FIGS. 15-23. In alternative implementations, two or more app servers 288 may be included and cooperate to perform such methods, or one or more other servers described herein can be configured to perform the disclosed methods.

The content batch servers 264 may handle requests internal to the pod. These requests may be long-running and/or not tied to a particular customer. For example, the content batch servers 264 may handle requests related to log mining, cleanup work, and maintenance tasks.

The content search servers 268 may provide query and indexer functions. For example, the functions provided by the content search servers 268 may allow users to search through content stored in the on-demand database service environment.

The file force servers 286 may manage requests for information stored in the Fileforce storage 298. The Fileforce storage 298 may store information such as documents, images, and basic large objects (BLOBs). By managing requests for information using the file force servers 286, the image footprint on the database may be reduced.

The query servers 282 may be used to retrieve information from one or more file systems. For example, the query system 282 may receive requests for information from the app servers 288 and then transmit information queries to the NFS 296 located outside the pod.

The pod 244 may share a database instance 290 configured as a multi-tenant environment in which different organizations share access to the same database. Additionally, services rendered by the pod 244 may call upon various hardware and/or software resources. In some implementations, the ACS servers 280 may control access to data, hardware resources, or software resources.

In some implementations, the batch servers 284 may process batch jobs, which are used to run tasks at specified times. Thus, the batch servers 284 may transmit instructions to other servers, such as the app servers 288, to trigger the batch jobs.

In some implementations, the QFS 292 may be an open source file system available from Sun Microsystems® of Santa Clara, Calif. The QFS may serve as a rapid-access file system for storing and accessing information available within the pod 244. The QFS 292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 268 and/or indexers 294 to identify, retrieve, move, and/or update data stored in the network file systems 296 and/or other storage systems.

In some implementations, one or more query servers 282 may communicate with the NFS 296 to retrieve and/or update information stored outside of the pod 244. The NFS 296 may allow servers located in the pod 244 to access information to access files over a network in a manner similar to how local storage is accessed.

In some implementations, queries from the query servers 222 may be transmitted to the NFS 296 via the load balancer 228, which may distribute resource requests over various resources available in the on-demand database service environment. The NFS 296 may also communicate with the QFS 292 to update the information stored on the NFS 296 and/or to provide information to the QFS 292 for use by servers located within the pod 244.

In some implementations, the pod may include one or more database instances 290. The database instance 290 may transmit information to the QFS 292. When information is transmitted to the QFS, it may be available for use by servers within the pod 244 without using an additional database call.

In some implementations, database information may be transmitted to the indexer 294. Indexer 294 may provide an index of information available in the database 290 and/or QFS 292. The index information may be provided to file force servers 286 and/or the QFS 292.

III. Tracking Updates to a Record Stored in a Database

As multiple users might be able to change the data of a record, it can be useful for certain users to be notified when a record is updated. Also, even if a user does not have authority to change a record, the user still might want to know when there is an update to the record. For example, a vendor may negotiate a new price with a salesperson of company X, where the salesperson is a user associated with tenant Y. As part of creating a new invoice or for accounting purposes, the salesperson can change the price saved in the database. It may be important for co-workers to know that the price has changed. The salesperson could send an email to certain people, but this is onerous and the salesperson might not email all of the people who need to know or want to know. Accordingly, some implementations of the disclosed techniques can inform others (e.g., co-workers) who want to know about an update to a record automatically.

Figure 3:
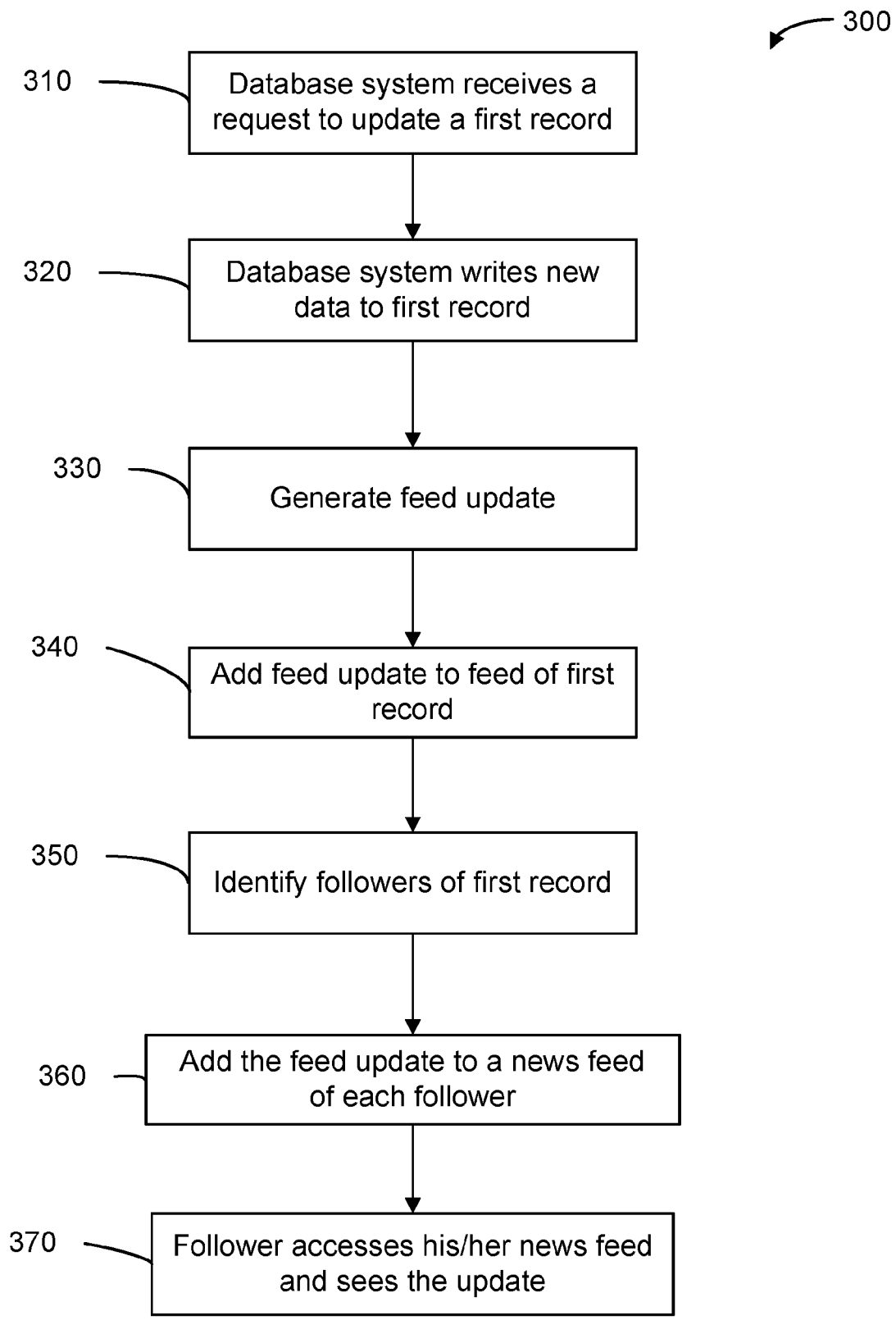
FIG. 3 shows a flowchart of an example of a method 300 for tracking updates to a record stored in a database system, performed in accordance with some implementations.

FIG. 3 shows a flowchart of an example of a method 300 for tracking updates to a record stored in a database system, performed in accordance with some implementations. Method 300 (and other methods described herein) may be implemented at least partially with multi-tenant database system 16, e.g., by one or more processors configured to receive or retrieve information, process the information, store results, and transmit the results. In other implementations, method 300 may be implemented at least partially with a single tenant database system. In various implementations, blocks may be omitted, combined, or split into additional blocks for method 300, as well as for other methods described herein.

In block 310, the database system receives a request to update a first record. In one implementation, the request is received from a first user. For example, a user may be accessing a page associated with the first record, and may change a displayed field and hit save. In another implementation, the database system can automatically create the request. For instance, the database system can create the request in response to another event, e.g., a request to change a field could be sent periodically at a particular date and/or time of day, or a change to another field or object. The database system can obtain a new value based on other fields of a record and/or based on parameters in the system.

The request for the update of a field of a record is an example of an event associated with the first record for which a feed tracked update may be created. In other implementations, the database system can identify other events besides updates to fields of a record. For example, an event can be a submission of approval to change a field. Such an event can also have an associated field (e.g., a field showing a status of whether a change has been submitted). Other examples of events can include creation of a record, deletion of a record, converting a record from one type to another (e.g., converting a lead to an opportunity), closing a record (e.g., a case type record), and potentially any other state change of a record—any of which could include a field change associated with the state change. Any of these events update the record whether by changing a field of the record, a state of the record, or some other characteristic or property of the record. In one implementation, a list of supported events for creating a feed tracked update can be maintained within the database system, e.g., at a server or in a database.

In block 320, the database system writes new data to the first record. In one implementation, the new data may include a new value that replaces old data. For example, a field is updated with a new value. In another implementation, the new data can be a value for a field that did not contain data before. In yet another implementation, the new data could be a flag, e.g., for a status of the record, which can be stored as a field of the record.

In some implementations, a "field" can also include records, which are child objects of the first record in a parent-child hierarchy. A field can alternatively include a pointer to a child record. A child object itself can include further fields. Thus, if a field of a child object is updated with a new value, the parent record also can be considered to have a field changed. In one example, a field could be a list of related child objects, also called a related list.

In block 330, a feed tracked update is generated about the update to the record. In one implementation, the feed tracked update is created in parts for assembling later into a display version. For example, event entries can be created and tracked in a first table, and changed field entries can be tracked in another table that is cross-referenced with the first table. More specifics of such implementations are provided later, e.g., with respect to FIG. 9A. In another implementation, the feed tracked update is automatically generated by the database system. The feed tracked update can convey in words that the first record has been updated and provide details about what was updated in the record and who performed the update. In some implementations, a feed tracked update is generated for only certain types of event and/or updates associated with the first record.

In one implementation, a tenant (e.g., through an administrator) can configure the database system to create (enable) feed tracked updates only for certain types of records. For example, an administrator can specify that records of designated types such as accounts and opportunities are enabled. When an update (or other event) is received for the enabled record type, then a feed tracked update would be generated. In another implementation, a tenant can also specify the fields of a record whose changes are to be tracked, and for which feed tracked updates are created. In one aspect, a maximum number of fields can be specified for tracking, and may include custom fields. In one implementation, the type of change can also be specified, for example, that the value change of a field is to be larger than a threshold (e.g., an absolute amount or a percentage change). In yet another implementation, a tenant can specify which events are to cause a generation of a feed tracked update. Also, in one implementation, individual users can specify configurations specific to them, which can create custom feeds as described in more detail below.

In one implementation, changes to fields of a child object are not tracked to create feed tracked updates for the parent record. In another implementation, the changes to fields of a child object can be tracked to create feed tracked updates for the parent record. For example, a child object of the parent type can be specified for tracking, and certain fields of the child object can be specified for tracking. As another example, if the child object is of a type specified for tracking, then a tracked change for the child object is propagated to parent records of the child object.

In block 340, the feed tracked update is added to a feed for the first record. In one implementation, adding the feed tracked update to a feed can include adding events to a table (which may be specific to a record or be for all or a group of objects), where a display version of a feed tracked update can be generated dynamically and presented in a GUI as a feed item when a user requests a feed for the first record. In another implementation, a display version of a feed tracked update can be added when a record feed is stored and maintained for a record. As mentioned above, a feed may be maintained for only certain records. In one implementation, the feed of a record can be stored in the database associated with the record. For example, the feed can be stored as a field (e.g., as a child object) of the record. Such a field can store a pointer to the text to be displayed for the feed tracked update.

In some implementations, only the current feed tracked update (or other current feed item) may be kept or temporarily stored, e.g., in some temporary memory structure. For example, a feed tracked update for only a most recent change to any particular field is kept. In other implementations, many previous feed tracked updates may be kept in the feed. A time and/or date for each feed tracked update can be tracked. Herein, a feed of a record is also referred to as an entity feed, as a record is an instance of a particular entity object of the database.

In block 350, followers of the first record can be identified. A follower is a user following the first record, such as a subscriber to the feed of the first record. In one implementation, when a user requests a feed of a particular record, such an identification of block 350 can be omitted. In another implementation where a record feed is pushed to a user (e.g., as part of a news feed), then the user can be identified as a follower of the first record. Accordingly, this block can include the identification of records and other objects being followed by a particular user.

In one implementation, the database system can store a list of the followers for a particular record. In various implementations, the list can be stored with the first record or associated with the record using an identifier (e.g., a pointer) to retrieve the list. For example, the list can be stored in a field of the first record. In another implementation, a list of the records that a user is following is used. In one implementation, the database system can have a routine that runs for each user, where the routine polls the records in the list to determine if a new feed tracked update has been added to a feed of the record. In another implementation, the routine for the user can be running at least partially on a user device, which contacts the database to perform the polling.

In block 360, in one implementation, the feed tracked update can be stored in a table, as described in greater detail below. When the user opens a feed, an appropriate query is sent to one or more tables to retrieve updates to records, also described in greater detail below. In some implementations, the feed shows feed tracked updates in reverse chronological order. In one implementation, the feed tracked update is pushed to the feed of a user, e.g., by a routine that determines the followers for the record from a list associated with the record. In another implementation, the feed tracked update is pulled to a feed, e.g., by a user device. This pulling may occur when a user requests the feed, as occurs in block 370. Thus, these actions may occur in a different order. The creation of the feed for a pull may be a dynamic creation that identifies records being followed by the requesting user, generates the display version of relevant feed tracked updates from stored information (e.g., event and field change), and adds the feed tracked updates into the feed. A feed of feed tracked updates of records and other objects that a user is following is also generally referred to herein as a news feed, which can be a subset of a larger information feed in which other types of information updates appear, such as posts.

In yet another implementation, the feed tracked update could be sent as an email to the follower, instead of in a feed. In one implementation, email alerts for events can enable people to be emailed when certain events occur. In another implementation, emails can be sent when there are posts on a user profile and posts on entities to which the user subscribes. In one implementation, a user can turn on/off email alerts for all or some events. In an implementation, a user can specify what kind of feed tracked updates to receive about a record that the user is following. For example, a user can choose to only receive feed tracked updates about certain fields of a record that the user is following, and potentially about what kind of update was performed (e.g., a new value input into a specified field, or the creation of a new field).

In block 370, a follower can access his/her news feed to see the feed tracked update. In one implementation, the user has just one news feed for all of the records that the user is following. In one aspect, a user can access his/her own feed by selecting a particular tab or other object on a page of an interface to the database system. Once selected the feed can be provided as a list, e.g., with an identifier (e.g., a time) or including some or all of the text of the feed tracked update. In another implementation, the user can specify how the feed tracked updates are to be displayed and/or sent to the user. For example, a user can specify a font for the text, a location of where the feed can be selected and displayed, amount of text to be displayed, and other text or symbols to be displayed (e.g., importance flags).

Figure 4:
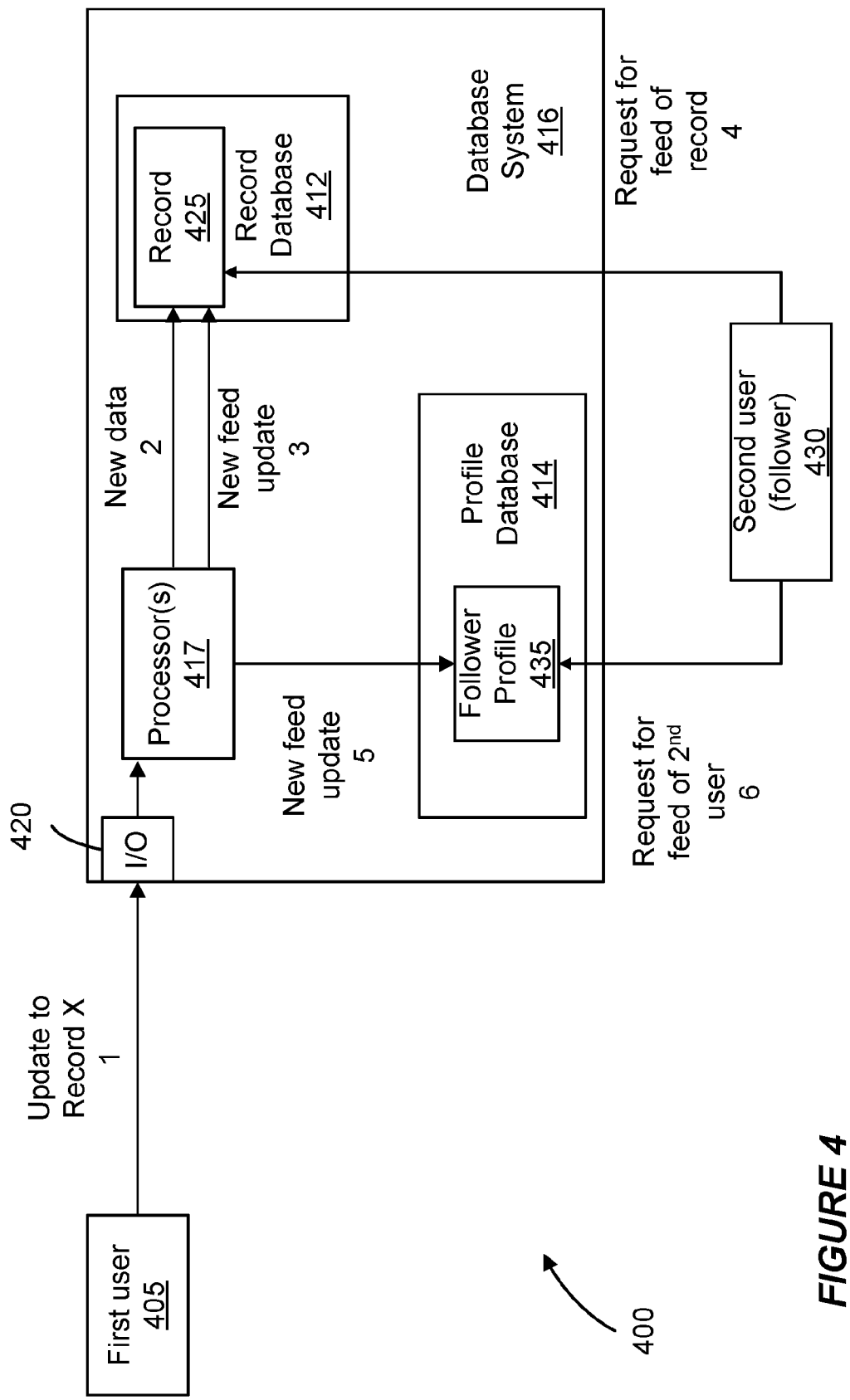
FIG. 4 shows a block diagram of an example of components of a database system configuration 400 performing a method for tracking an update to a record according to some implementations.

FIG. 4 shows a block diagram of an example of components of a database system configuration 400 performing a method for tracking an update to a record according to some implementations. Database system configuration 400 can perform implementations of method 300, as well as implementations of other methods described herein.

A first user 405 sends a request 1 to update record 425 in database system 416. Although an update request is described, other events that are being tracked are equally applicable. In various implementations, the request 1 can be sent via a user interface (e.g., 30 of FIG. 1B) or an application program interface (e.g., API 32). An I/O port 420 can accommodate the signals of request 1 via any input interface, and send the signals to one or more processors 417. The processor 417 can analyze the request and determine operations to be performed. Herein, any reference to a processor 417 can refer to a specific processor or any set of processors in database system 416, which can be collectively referred to as processor 417.

Processor 417 can determine an identifier for record 425, and send commands with the new data 2 of the request to record database 412 to update record 425. In one implementation, record database 412 is where tenant storage space 112 of FIG. 1B is located. The request 1 and new data commands 2 can be encapsulated in a single write transaction sent to record database 412. In one implementation, multiple changes to records in the database can be made in a single write transaction.

Processor 417 can also analyze request 1 to determine whether a feed tracked update is to be created, which at this point may include determining whether the event (e.g., a change to a particular field) is to be tracked. This determination can be based on an interaction (i.e., an exchange of data) with record database 412 and/or other databases, or based on information stored locally (e.g., in cache or RAM) at processor 417. In one implementation, a list of record types that are being tracked can be stored. The list may be different for each tenant, e.g., as each tenant may configure the database system to its own specifications. Thus, if the record 425 is of a type not being tracked, then the determination of whether to create a feed tracked update can stop there.

The same list or a second list (which can be stored in a same location or a different location) can also include the fields and/or events that are tracked for the record types in the first list. This list can be searched to determine if the event is being tracked. A list may also contain information having the granularity of listing specific records that are to be tracked (e.g., if a tenant can specify the particular records to be tracked, as opposed to just type).

As an example, processor 417 may obtain an identifier associated with record 425 (e.g., obtained from request 1 or database 412), potentially along with a tenant identifier, and cross-reference the identifier with a list of records for which feed tracked updates are to be created. Specifically, the record identifier can be used to determine the record type and a list of tracked types can be searched for a match. The specific record may also be checked if such individual record tracking was enabled. The name of the field to be changed can also be used to search a list of tracking-enabled fields. Other criteria besides field and events can be used to determine whether a feed tracked update is created, e.g., type of change in the field. If a feed tracked update is to be generated, processor 417 can then generate the feed tracked update.

In some implementations, a feed tracked update is created dynamically when a feed (e.g., the entity feed of record 425) is requested. Thus, in one implementation, a feed tracked update can be created when a user requests the entity feed for record 425. In this implementation, the feed tracked update may be created (e.g., assembled), including re-created, each time the entity feed is to be displayed to any user. In one implementation, one or more event history tables can keep track of previous events so that the feed tracked update can be re-created.

In another implementation, a feed tracked update can be created at the time the event occurs, and the feed tracked update can be added to a list of feed items. The list of feed items may be specific to record 425, or may be an aggregate of feed items including feed items for many records. Such an aggregate list can include a record identifier so that the feed items for the entity feed of record 425 can be easily retrieved. For example, after the feed tracked update has been generated, processor 417 can add the new feed tracked update 3 to a feed of record 425. As mentioned above, in one implementation, the feed can be stored in a field (e.g., as a child object) of record 425. In another implementation, the feed can be stored in another location or in another database, but with a link (e.g., a connecting identifier) to record 425. The feed can be organized in various ways, e.g., as a linked list, an array, or other data structure.

A second user 430 can access the new feed tracked update 3 in various ways. In one implementation, second user 430 can send a request 4 for the record feed. For example, second user 430 can access a home page (detail page) of the record 425 (e.g., with a query or by browsing), and the feed can be obtained through a tab, button, or other activation object on the page. The feed can be displayed on the screen or downloaded.

In another implementation, processor 417 can add the new feed tracked update 5 to a feed (e.g., a news feed) of a user that is following record 425. In one implementation, processor 417 can determine each of the followers of record 425 by accessing a list of the users that have been registered as followers. This determination can be done for each new event (e.g., update 1). In another implementation, processor 417 can poll (e.g., with a query) the records that second user 430 is following to determine when new feed tracked updates (or other feed items) are available. Processor 417 can use a follower profile 435 of second user 430 that can contain a list of the records that the second user 430 is following. Such a list can be contained in other parts of the database as well. Second user 430 can then send a request 6 to his/her profile 435 to obtain a feed, which contains the new feed tracked update. The user's profile 435 can be stored in a profile database 414, which can be the same or different than database 412.

In some implementations, a user can define a news feed to include new feed tracked updates from various records, which may be limited to a maximum number. In one implementation, each user has one news feed. In another implementation, the follower profile 435 can include the specifications of each of the records to be followed (with the criteria for what feed tracked updates are to be provided and how they are displayed), as well as the feed.

Some implementations can provide various types of record (entity) feeds. Entity Feeds can exist for record types like account, opportunity, case, and contact. An entity feed can tell a user about the actions that people have taken on that particular record or on one its related records. The entity feed can include who made the action, which field was changed, and the old and new values. In one implementation, entity feeds can exist on all supported records as a list that is linked to the specific record. For example, a feed could be stored in a field that allows lists (e.g., linked lists) or as a child object.

IV. Tracking Actions of a User

In addition to knowing about events associated with a particular record, it can be helpful for a user to know what a particular user is doing. In particular, it might be nice to know what the user is doing without the user having to generate the feed tracked update (e.g., a user submitting a synopsis of what the user has done). Accordingly, implementations can automatically track actions of a user that trigger events, and feed tracked updates can be generated for certain events.

Figure 5:
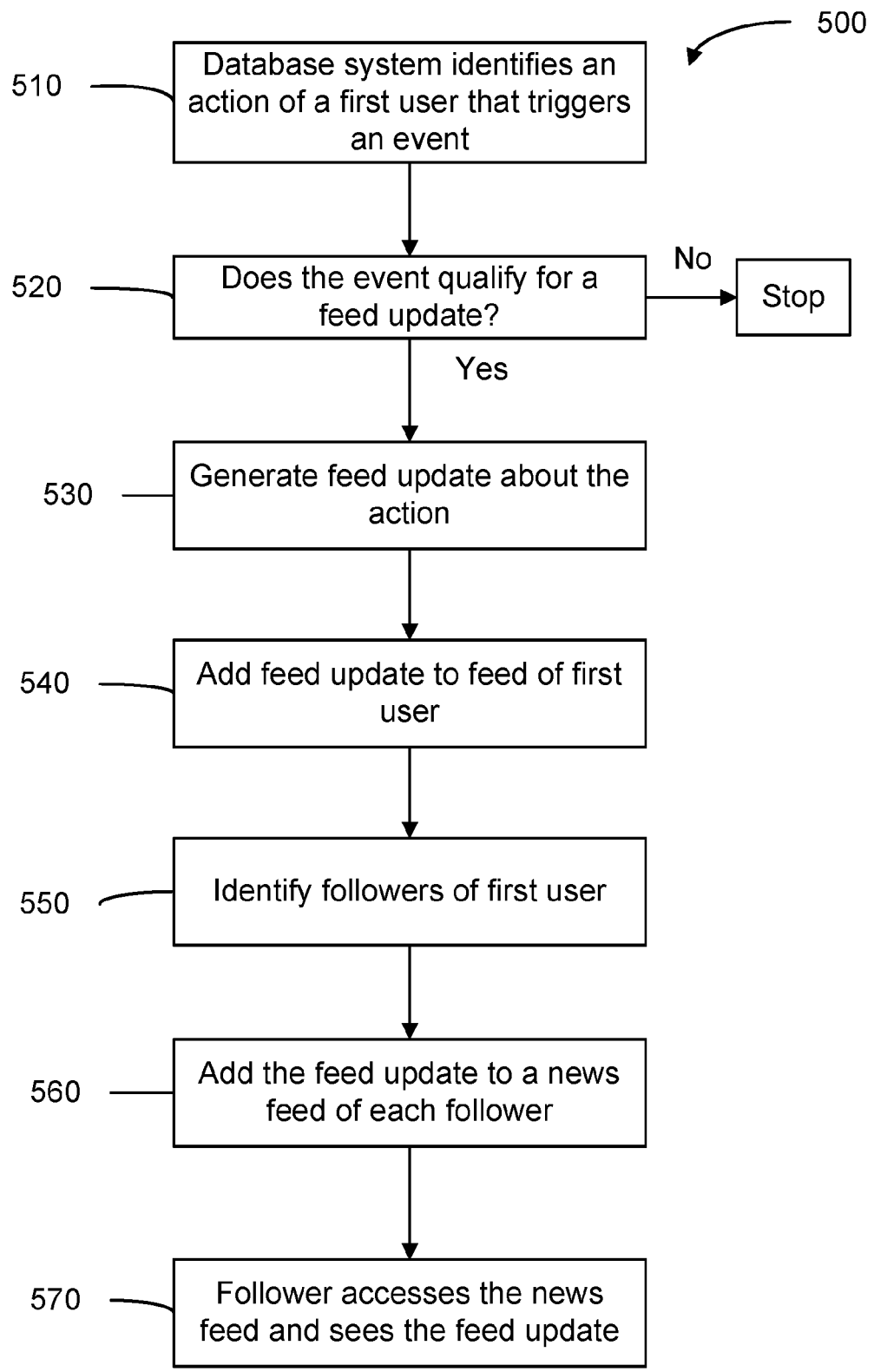
FIG. 5 shows a flowchart of an example of a method 500 for tracking actions of a user of a database system, performed in accordance with some implementations.

FIG. 5 shows a flowchart of an example of a method 500 for tracking actions of a user of a database system, performed in accordance with some implementations. Method 500 may be performed in addition to method 300. The operations of method 300, including order of blocks, can be performed in conjunction with method 500 and other methods described herein. Thus, a feed can be composed of changes to a record and actions of users.

In block 510, a database system (e.g., 16 of FIGS. 1A and 1B) identifies an action of a first user. In one implementation, the action triggers an event, and the event is identified. For example, the action of a user requesting an update to a record can be identified, where the event is receiving a request or is the resulting update of a record. The action may thus be defined by the resulting event. In another implementation, only certain types of actions (events) are identified. Which actions are identified can be set as a default or can be configurable by a tenant, or even configurable at a user level. In this way, processing effort can be reduced since only some actions are identified.

In block 520, it is determined whether the event qualifies for a feed tracked update. In one implementation, a pre-defined list of events (e.g., as mentioned herein) can be created so that only certain actions are identified. In one implementation, an administrator (or other user) of a tenant can specify the type of actions (events) for which a feed tracked update is to be generated. This block may also be performed for method 300.

In block 530, a feed tracked update is generated about the action. In an example where the action is an update of a record, the feed tracked update can be similar or the same as the feed tracked update created for the record. The description can be altered though to focus on the user as opposed to the record. For example, "John D. has closed a new opportunity for account XYZ" as opposed to "an opportunity has been closed for account XYZ."

In block 540, the feed tracked update is added to a profile feed of the first user when, e.g., the user clicks on a tab to open a page in a browser program displaying the feed. In one implementation, a feed for a particular user can be accessed on a page of the user's profile, in a similar manner as a record feed can be accessed on a detail page of the record. In another implementation, the first user may not have a profile feed and the feed tracked update may just be stored temporarily before proceeding. A profile feed of a user can be stored associated with the user's profile. This profile feed can be added to a news feed of another user.

In block 550, followers of the first user are identified. In one implementation, a user can specify which type of actions other users can follow. Similarly, in one implementation, a follower can select what actions by a user the follower wants to follow. In an implementation where different followers follow different types of actions, which users are followers of that user and the particular action can be identified, e.g., using various lists that track what actions and criteria are being followed by a particular user. In various implementations, the followers of the first user can be identified in a similar manner as followers of a record, as described above for block 350.

In block 560, the feed tracked update is added to a news feed of each follower of the first user when, e.g., the follower clicks on a tab to open a page displaying the news feed. The feed tracked update can be added in a similar manner as the feed items for a record feed. The news feed can contain feed tracked updates both about users and records. In another implementation, a user can specify what kind of feed tracked updates to receive about a user that the user is following. For example, a user could specify feed tracked updates with particular keywords, of certain types of records, of records owned or created by certain users, particular fields, and other criteria as mentioned herein.

In block 570, a follower accesses the news feed and sees the feed tracked update. In one implementation, the user has just one news feed for all of the records that the user is following. In another implementation, a user can access his/her own feed (i.e. feed about his/her own actions) by selecting a particular tab or other object on a page of an interface to the database system. Thus, a feed can include feed tracked updates about what other users are doing in the database system. When a user becomes aware of a relevant action of another user, the user can contact the co-worker, thereby fostering teamwork.

V. Generation of a Feed Tracked Update

As described above, some implementations can generate text describing events (e.g., updates) that have occurred for a record and actions by a user that trigger an event. A database system can be configured to generate the feed tracked updates for various events in various ways.

In one implementation, the feed tracked update is a grammatical sentence, thereby being easily understandable by a person. In another implementation, the feed tracked update provides detailed information about the update. In various examples, an old value and new value for a field may be included in the feed tracked update, an action for the update may be provided (e.g., submitted for approval), and the names of particular users that are responsible for replying or acting on the feed tracked update may be also provided. The feed tracked update can also have a level of importance based on settings chosen by the administrator, a particular user requesting an update, or by a following user who is to receive the feed tracked update, which fields is updated, a percentage of the change in a field, the type of event, or any combination of these factors.

The system may have a set of heuristics for creating a feed tracked update from the event (e.g., a request to update). For example, the subject may be the user, the record, or a field being added or changed. The verb can be based on the action requested by the user, which can be selected from a list of verbs (which may be provided as defaults or input by an administrator of a tenant). In one implementation, feed tracked updates can be generic containers with formatting restrictions, As an example of a feed tracked update for a creation of a new record, "Mark Abramowitz created a new Opportunity for IBM—20,000 laptops with Amount as $3.5 M and Sam Palmisano as Decision Maker." This event can be posted to the profile feed for Mark Abramowitz and the entity feed for record of Opportunity for IBM—20,000 laptops. The pattern can be given by (AgentFullName) created a new (ObjectName)(RecordName) with [(FieldName) as (FieldValue) [, /and]]*[[added/changed/removed] (RelatedListRecordName) [as/to/as] (RelatedListRecordValue) [, /and]]*. Similar patterns can be formed for a changed field (standard or custom) and an added child record to a related list.

VI. Tracking Commentary From or About a User

Some implementations can also have a user submit text, instead of the database system generating a feed tracked update. As the text is submitted as part or all of a message by a user, the text can be about any topic. Thus, more information than just actions of a user and events of a record can be conveyed. In one implementation, the messages can be used to ask a question about a particular record, and users following the record can provide comments and responses.

Figure 6:
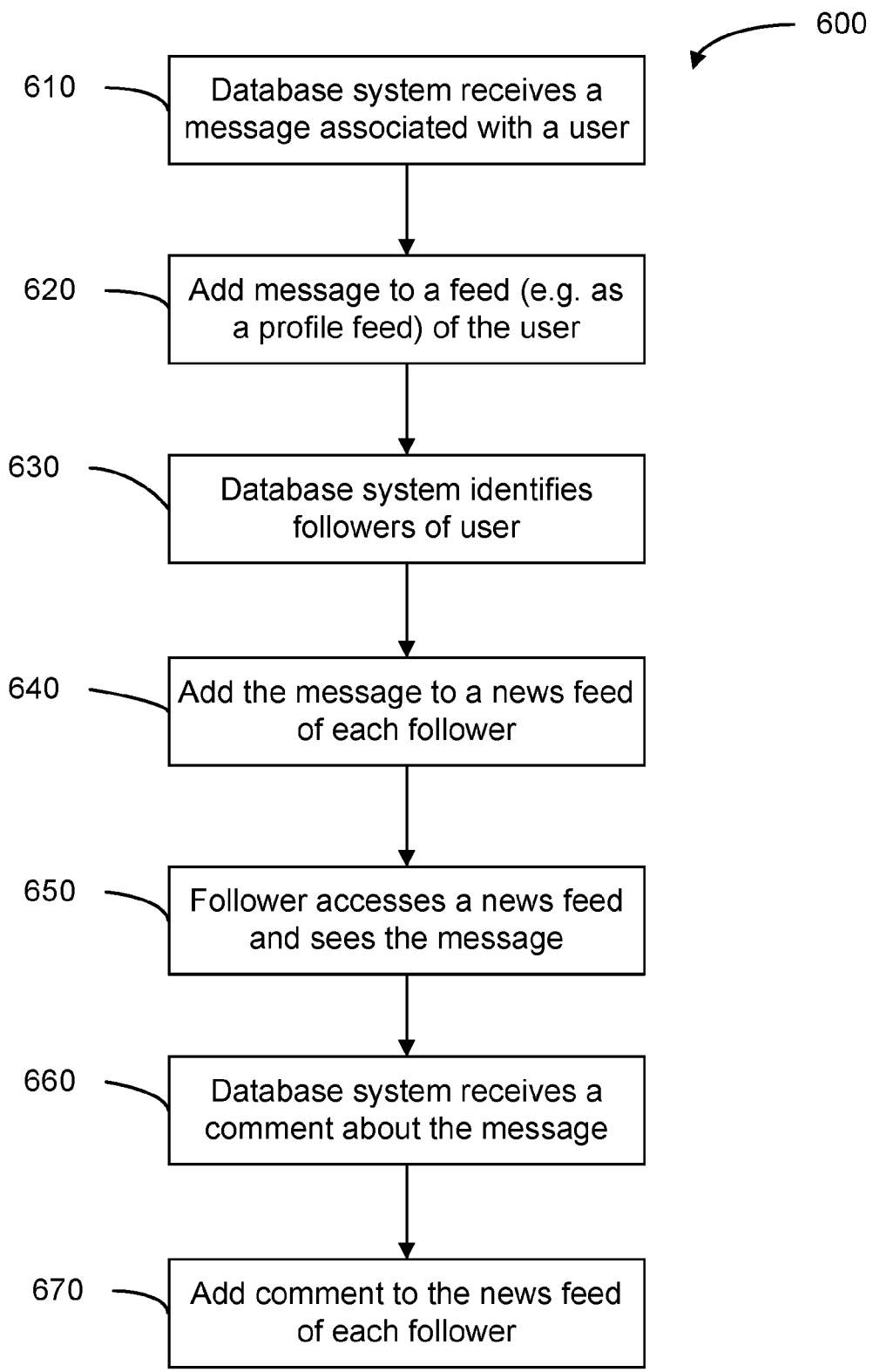
FIG. 6 shows a flowchart of an example of a method 600 for creating a news feed from messages created by a user about a record or another user, performed in accordance with some implementations.

FIG. 6 shows a flowchart of an example of a method 600 for creating a news feed from messages created by a user about a record or another user, performed in accordance with some implementations. In one implementation, method 600 can be combined with methods 300 and 500. In one aspect, a message can be associated with the first user when the first user creates the message (e.g., a post or comment about a record or another user). In another aspect, a message can be associated with the first user when the message is about the first user (e.g., posted by another user on the first user's profile feed).

In block 610, the database system receives a message (e.g., a post or status update) associated with a first user. The message (e.g., a post or status update) can contain text and/or multimedia content submitted by another user or by the first user. In one implementation, a post is for a section of the first user's profile page where any user can add a post, and where multiple posts can exist. Thus, a post can appear on the first user's profile page and can be viewed when the first user's profile is visited. For a message about a record, the post can appear on a detail page of a record. Note the message can appear in other feeds as well. In another implementation, a status update about the first user can only be added by the first user. In one implementation, a user can only have one status message.

In block 620, the message is added to a table, as described in greater detail below. When the feed is opened, a query filters one or more tables to identify the first user, identify other persons that the user is following, and retrieve the message. Messages and record updates are presented in a combined list as the feed. In this way, in one implementation, the message can be added to a profile feed of the first user, which is associated (e.g., as a related list) with the first user's profile. In one implementation, the posts are listed indefinitely. In another implementation, only the most recent posts (e.g., last 50) are kept in the profile feed. Such implementations can also be employed with feed tracked updates. In yet another implementation, the message can be added to a profile of the user adding the message.

In block 630, the database system identifies followers of the first user. In one implementation, the database system can identify the followers as described above for method 500. In various implementations, a follower can select to follow a feed about the actions of the first user, messages about the first user, or both (potentially in a same feed).

In block 640, the message is added to a news feed of each follower. In one implementation, the message is only added to a news feed of a particular follower if the message matches some criteria, e.g., the message includes a particular keyword or other criteria. In another implementation, a message can be deleted by the user who created the message. In one implementation, once deleted by the author, the message is deleted from all feeds to which the message had been added.

In block 650, the follower accesses a news feed and sees the message. For example, the follower can access a news feed on the follower's own profile page. As another example, the follower can have a news feed sent to his/her own desktop without having to first go to a home page.

In block 660, the database system receives a comment about the message. The database system can add the comment to a feed of the same first user, much as the original message was added. In one implementation, the comment can also be added to a feed of a second user who added the comment. In one implementation, users can also reply to the comment. In another implementation, users can add comments to a feed tracked update, and further comments can be associated with the feed tracked update. In yet another implementation, making a comment or message is not an action to which a feed tracked update is created. Thus, the message may be the only feed item created from such an action.

In one implementation, if a feed tracked update or post is deleted, its corresponding comments are deleted as well. In another implementation, new comments on a feed tracked update or post do not update the feed tracked update timestamp. Also, the feed tracked update or post can continue to be shown in a feed (profile feed, record feed, or news feed) if it has had a comment within a specified timeframe (e.g., within the last week). Otherwise, the feed tracked update or post can be removed in an implementation.

In some implementations, all or most feed tracked updates can be commented on. In other implementations, feed tracked updates for certain records (e.g., cases or ideas) are not commentable. In various implementations, comments can be made for any one or more records of opportunities, accounts, contacts, leads, and custom objects.

In block 670, the comment is added to a news feed of each follower. In one implementation, a user can make the comment within the user's news feed. Such a comment can propagate to the appropriate profile feed or record feed, and then to the news feeds of the following users. Thus, feeds can include what people are saying, as well as what they are doing. In one aspect, feeds are a way to stay up-to-date (e.g., on users, opportunities, etc.) as well as an opportunity to reach out to co-workers/partners and engage them around common goals.

In some implementations, users can rate feed tracked updates or messages (including comments). A user can choose to prioritize a display of a feed so that higher rated feed items show up higher on a display. For example, in an implementation where comments are answers to a specific question, users can rate the different status posts so that a best answer can be identified. As another example, users are able to quickly identify feed items that are most important as those feed items can be displayed at a top of a list. The order of the feed items can be based on an importance level (which can be determined by the database system using various factors, some of which are mentioned herein) and based on a rating from users. In one implementation, the rating is on a scale that includes at least 3 values. In another implementation, the rating is based on a binary scale.

Besides a profile for a user, a group can also be created. In various implementations, the group can be created based on certain attributes that are common to the users, can be created by inviting users, and/or can be created by receiving requests to join from a user. In one implementation, a group feed can be created, with messages being added to the group feed when someone submits a message to the group as a whole through a suitable user interface. For example, a group page may have a group feed or a section within the feed for posts, and a user can submit a post through a publisher component in the user interface by clicking on a "Share" or similar button. In another implementation, a message can be added to a group feed when the message is submitted about any one of the members. Also, a group feed can include feed tracked updates about actions of the group as a whole (e.g., when an administrator changes data in a group profile or a record owned by the group), or about actions of an individual member.

Figure 7:
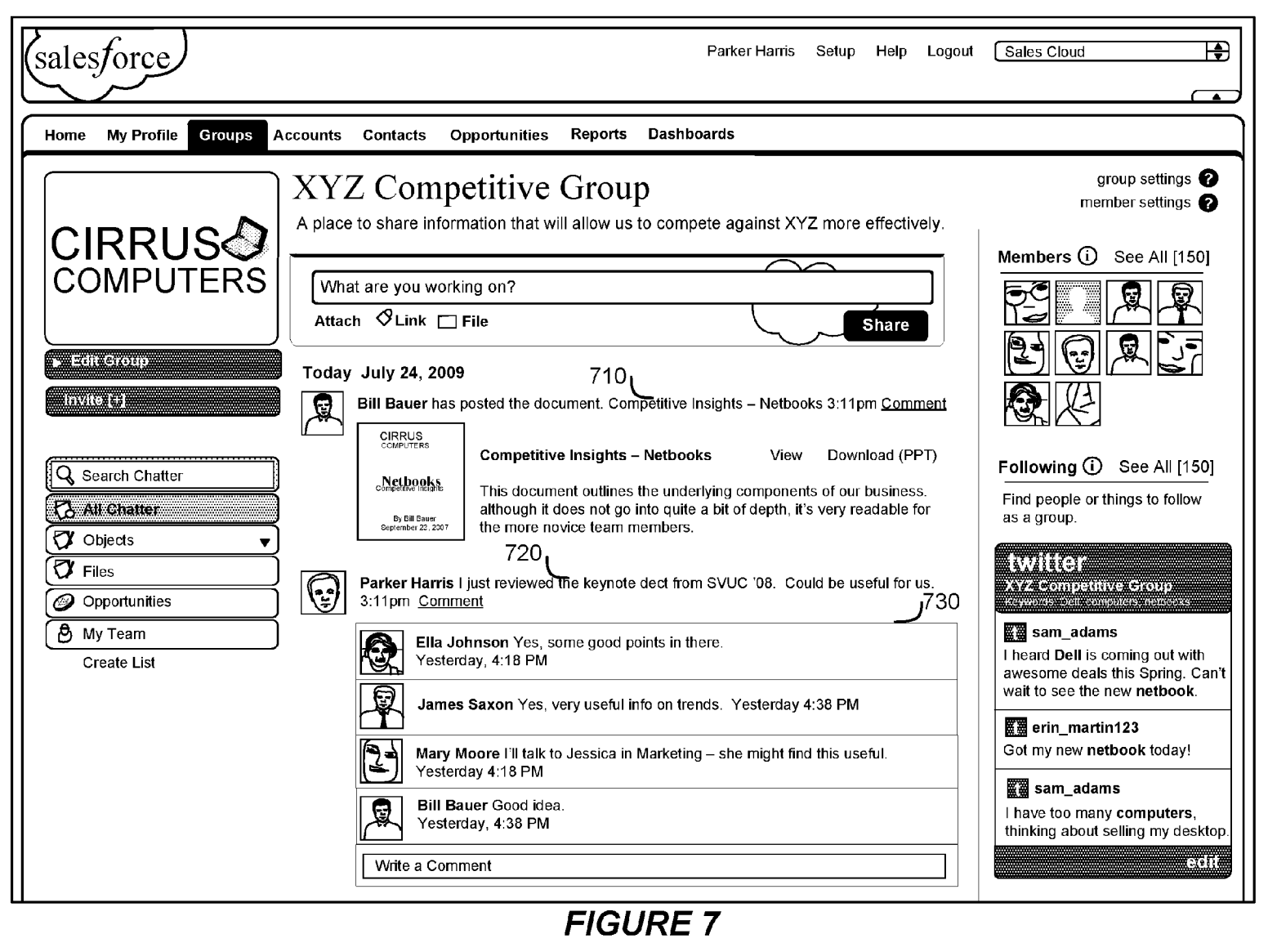

FIG. 7 shows an example of a group feed on a group page according to some implementations. As shown, a feed item 710 shows that a user has posted a document to the group object. The text "Bill Bauer has posted the document Competitive Insights" can be generated by the database system in a similar manner as feed tracked updates about a record being changed. A feed item 720 shows a post to the group, along with comments 730 from Ella Johnson, James Saxon, Mary Moore and Bill Bauer.

Figure 8:
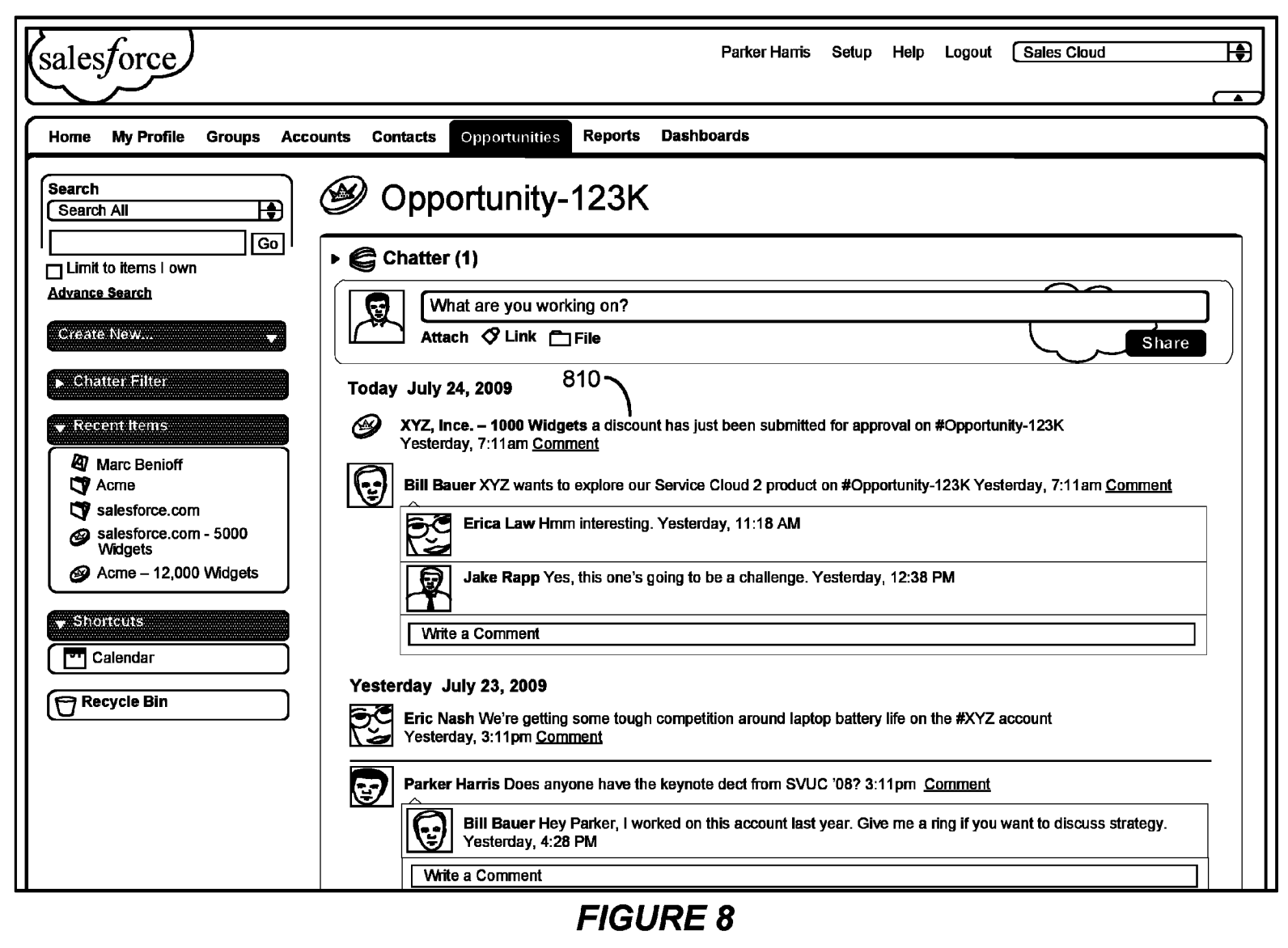

FIG. 8 shows an example of a record feed containing a feed tracked update, post, and comments according to some implementations. Feed item 810 shows a feed tracked update based on the event of submitting a discount for approval. Other feed items show posts, e.g., from Bill Bauer, that are made to the record and comments, e.g., from Erica Law and Jake Rapp, that are made on the posts.

VII. Infrastructure for a Feed

A. Tables Used to Create a Feed

FIG. 9A shows an example of a plurality of feed tracked update tables that may be used in tracking events and creating feeds according to some implementations. The tables of FIG. 9A may have entries added, or potentially removed, as part of tracking events in the database from which feed items are creates or that correspond to feed items. In one implementation, each tenant has its own set of tables that are created based on criteria provided by the tenant.

An event history table 910 can provide a feed tracked update of events from which feed items are created. In one aspect, the events are for objects that are being tracked. Thus, table 910 can store and change feed tracked updates for feeds, and the changes can be persisted. In various implementations, event history table 910 can have columns of event ID 911, object ID 912 (also called parent ID), and created by ID 913. The event ID 911 can uniquely identify a particular event and can start at 1 (or other number or value).

Each new event can be added chronologically with a new event ID, which may be incremented in order. An object ID 912 can be used to track which record or user's profile is being changed. For example, the object ID can correspond to the record whose field is being changed or the user whose feed is receiving a post. The created by ID 913 can track the user who is performing the action that results in the event, e.g., the user that is changing the field or that is posting a message to the profile of another user.

In one implementation, a name of an event can also be stored in table 910. In one implementation, a tenant can specify events that they want tracked. In an implementation, event history table 910 can include the name of the field that changed (e.g., old and new values). In another implementation, the name of the field, and the values, are stored in a separate table. Other information about an event (e.g., text of comment, feed tracked update, post or status update) can be stored in event history table 910, or in other tables, as is now described.

A field change table 920 can provide a feed tracked update of the changes to the fields. The columns of table 920 can include an event ID 921 (which correlates to the event ID 911), an old value 922 for the field, and the new value 923 for the field. In one implementation, if an event changes more than one field value, then there can be an entry for each field changed. As shown, event ID 921 has two entries for event E37.

A comment table 930 can provide a feed tracked update of the comments made regarding an event, e.g., a comment on a post or a change of a field value. The columns of table 930 can include an event ID 921 (which correlates to the event ID 911), the comment column 932 that stores the text of the comment, and the time/date 933 of the comment. In one implementation, there can be multiple comments for each event. As shown, event ID 921 has two entries for event E37.

A user subscription table 940 can provide a list of the objects being followed (subscribed to) by a user. In one implementation, each entry has a user ID 941 of the user doing the following and one object ID 942 corresponding to the object being followed. In one implementation, the object being followed can be a record or a user. As shown, the user with ID U819 is following object IDs O615 and O489. If user U819 is following other objects, then additional entries may exist for user U819. Also as shown, user U719 is also following object O615. The user subscription table 940 can be updated when a user adds or deletes an object that is being followed.

In one implementation, regarding a profile feed and a news feed, these are read-only views on the event history table 910 specialized for these feed types. Conceptually the news feed can be a semi-join between the user subscription table 940 and the event history table 910 on the object IDs 912 and 942 for the user. In one aspect, these entities can have polymorphic parents and can be subject to a number of restrictions detailed herein, e.g., to limit the cost of sharing checks.

In one implementation, entity feeds are modeled in the API as a feed associate entity (e.g., AccountFeed, CaseFeed, etc). A feed associate entity includes information composed of events (e.g., event IDs) for only one particular record type. Such a list can limit the query (and sharing checks) to a specific record type. In one aspect, this structuring of the entity feeds can make the query run faster. For example, a request for a feed of a particular account can include the record type of account. In one implementation, an account feed table can then be searched, where the table has account record IDs and corresponding event IDs or pointers to particular event entries in event history table 910. Since the account feed table only contains some of the records (not all), the query can run faster.

In one implementation, there may be objects with no events listed in the event history table 910, even though the record is being tracked. In this case, the database service can return a result indicating that no feed items exist.

A feed item can represent an individual field change of a record, creation and deletion of a record, or other events being tracked for a record or a user. In one implementation, all of the feed items in a single transaction (event) can be grouped together and have the same event ID. A single transaction relates to the operations that can be performed in a single communication with the database. In another implementation where a feed is an object of the database, a feed item can be a child of a profile feed, news feed, or entity feed. If a feed item is added to multiple feeds, the feed item can be replicated as a child of each feed to which the feed item is added.

In some implementations, a comment exists as an item that depends from feed tracked updates, posts, status updates, and other items that are independent of each other. Thus, a feed comment object can exist as a child object of a feed item object. For example, comment table 930 can be considered a child table of event history table 910. In one implementation, a feed comment can be a child of a profile feed, news feed, or entity feed that is separate from other feed items.

In one implementation, viewing a feed pulls up the most recent messages or feed tracked updates (e.g., 25) and searches the most recent (e.g., 4) comments for each feed item. The comments can be identified via the comment table 930. In one implementation, a user can request to see more comments, e.g., by selecting a see more link.

After feed items have been generated, they can be filtered so that only certain feed items are displayed, which may be tailored to a specific tenant and/or user. In one implementation, a user can specify changes to a field that meet certain criteria for the feed item to show up in a feed displayed to the user, e.g., a news feed or even an entity feed displayed directly to the user. In one implementation, the criteria can be combined with other factors (e.g., number of feed items in the feed) to determine which feed items to display. For instance, if a small number of feed items exist (e.g., below a threshold), then all of the feed items may be displayed.

In one implementation, a user can specify the criteria via a query on the feed items in his/her new feed, and thus a feed may only return objects of a certain type, certain types of events, feed tracked updates about certain fields, and other criteria mentioned herein. Messages can also be filtered according to some criteria, which may be specified in a query. Such an added query can be added onto a standard query that is used to create the news feed for a user. A first user could specify the users and records that the first user is following in this manner, as well as identify the specific feed items that the first user wants to follow. The query could be created through a graphical interface or added by a user directly in a query language. Other criteria could include receiving only posts directed to a particular user or record, as opposed to other feed items.

In one implementation, a user can access a feed of a record if the user can access the record. The security rules for determining whether a user has access to a record can be performed in a variety of ways, some of which are described in commonly assigned U.S. Pat. No. 8,095,531, titled METHODS AND SYSTEMS FOR CONTROLLING ACCESS TO CUSTOM OBJECTS IN A DATABASE, by Weissman et al., issued on Jan. 10, 2012, and hereby incorporated by reference in its entirety and for all purposes.

In one implementation, a user can edit a feed of a record if the user has access to the record, e.g., deleting or editing a feed item. In another implementation, a user (besides an administrator) cannot edit a feed item, except for performing an action from which a feed item can be created. In one example, a user is first has to have access to a particular record and field for a feed item to be created based on an action of the user. In this case, an administrator can be considered to be a user with MODIFY-ALL-DATA security level. In yet another implementation, a user who created the record can edit the feed.

In one implementation, the text of posts are stored in a child table (post table 950), which can be cross-referenced with event history table 910. Post table 950 can include event ID 951 (to cross-reference with event ID 911), post text 952 to store the text of the post, and time/date 953. An entry in post table 950 can be considered a feed post object.

VIII. Subscribing to Users and Records to Follow

As described above, a user can follow users, groups, and records. Implementations can provide mechanisms for a user to manage which users, groups, and records that the user is currently following. In one implementation, a user can be limited to the number of users and records (collectively or separately) that the user can follow. For example, a user may be restricted to only following 10 users and 15 records, or as another example, 25 total. Alternatively, the user may be permitted to follow more or less users.

In one implementation, a user can go to a page of a record and then select to follow that object (e.g., with a button marked "follow" or "join"). In another implementation, a user can search for a record and have the matching records show up in a list. The search can include criteria of records that the user might want to follow. Such criteria can include the owner, the creation date, last comment date, and numerical values of particular fields (e.g., an opportunity with a value of more than $10,000).

A follow button (or other activation object) can then reside next to each record in the resulting list, and the follow button can be selected to start following the record. Similarly, a user can go to a profile page of a user and select to follow the user, or a search for users can provide a list, where one or more users can be selected for following from the list. The selections of subscribing and unsubscribing can add and delete rows in table 920.

In some implementations, a subscription center acts as a centralized place in a database application (e.g., application platform 18) to manage which records a user subscribes to, and which field updates the user wants to see in feed tracked updates. The subscription center can use a subscription table to keep track of the subscriptions of various users. In one implementation, the subscription center shows a list of all the items (users and records) a user is subscribed to. In another implementation, a user can unsubscribe to subscribed objects from the subscription center.

A. Automatic Subscription

Figure 9B:
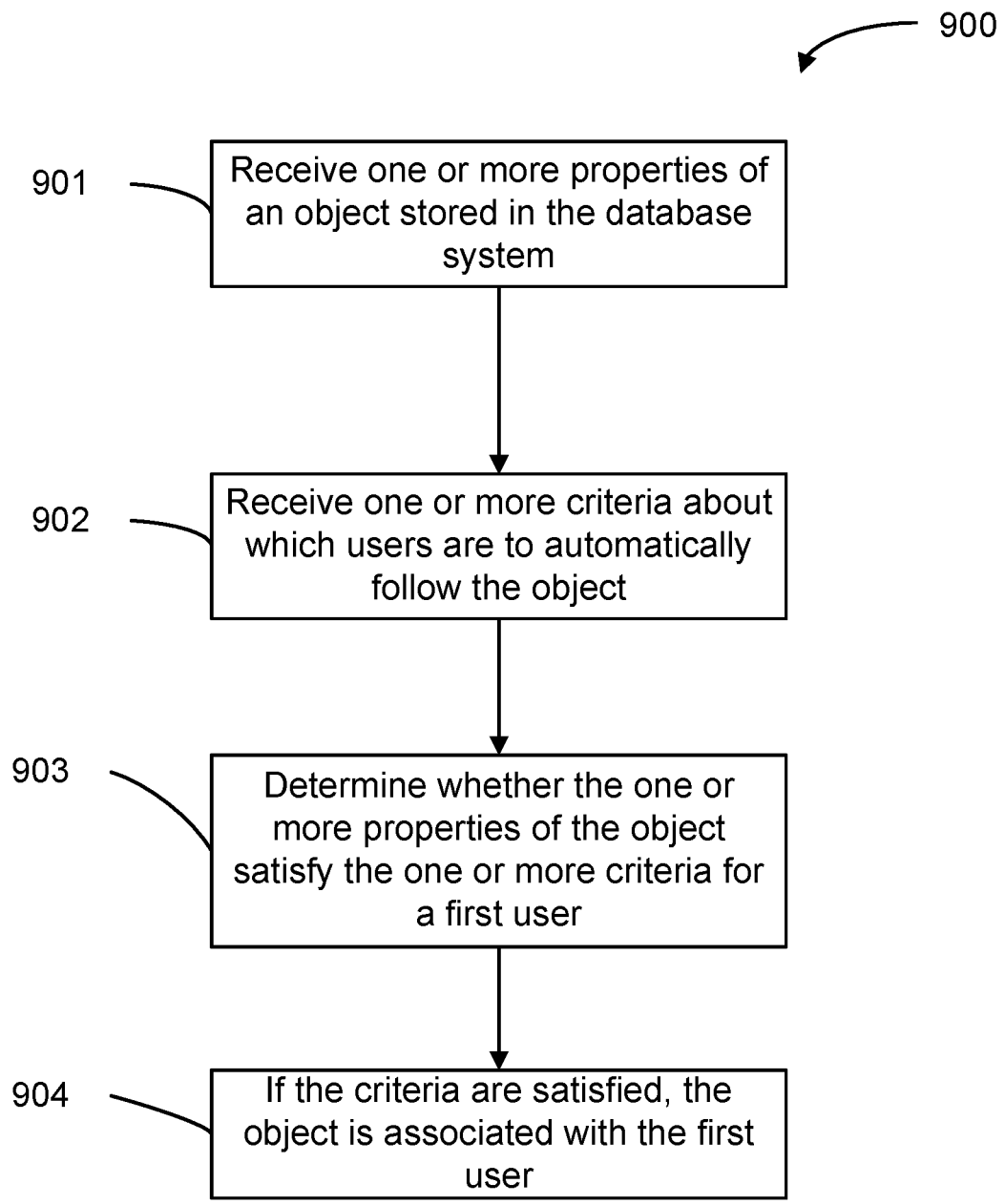
FIG. 9B shows a flowchart of an example of a method 900 for automatically subscribing a user to an object in a database system, performed in accordance with some implementations.

FIG. 9B shows a flowchart of an example of a method 900 for automatically subscribing a user to an object in a database system, performed in accordance with some implementations. Any of the following blocks can be performed wholly or partially with the database system, and in particular by one or more processor of the database system.

In block 901, one or more properties of an object stored in the database system are received. The properties can be received from administrators of the database system, or from users of the database system (which may be an administrator of a customer organization). The properties can be records or users, and can include any of the fields of the object that are stored in the database system. Examples of properties of a record include: an owner of the record, a user that converted the record from one record type to another record type, whether the first user has viewed the record, and a time the first user viewed the record. Examples of properties of a user include: which organization (tenant) the user is associated with, the second user's position in the same organization, and which other users the user had emailed or worked with on projects.

In block 902, the database system receives one or more criteria about which users are to automatically follow the object. Examples of the criteria can include: an owner or creator of a record is to follow the record, subordinates of an owner or creator of a record are to follow the record, and a user is to follow his/her manager, the user's peers, other users in the same business group as the user, and other users that the user has emailed or worked with on a project. The criteria can be specific to a user or group of users (e.g., users of a tenant).

In block 903, the database system determines whether the one or more properties of the object satisfy the one or more criteria for a first user. In one implementation, this determination can occur by first obtaining the criteria and then determining objects that satisfy the criteria. The determination can occur periodically, at time of creation of an object, or at other times.

In block 904, if the criteria are satisfied, the object is associated with the first user. The association can be in a list that stores information as to what objects are being followed by the first user. User subscription table 940 is an example of such a list. In one implementation, the one or more criteria are satisfied if one property satisfies at least one criterion. Thus, if the criteria are that a user follows his/her manager and the object is the user's manager, then the first user will follow the object.

In one implementation, a user can also be automatically unsubscribed, e.g., if a certain action happens. The action could be a change in the user's position within the organization, e.g., a demotion or becoming a contractor. As another example, if a case gets closed, then users following the case may be automatically unsubscribed.

IX. Adding Items to a Feed

As described above, a feed includes feed items, which include feed tracked updates and messages, as defined herein. Various feeds can be generated. For example, a feed can be generated about a record or about a user. Then, users can view these feeds. A user can separately view a feed of a record or user, e.g., by going to a home page for the user or the record. As described above, a user can also follow another user or record and receive the feed items of those feeds through a separate feed application. The feed application can provide each of the feeds that a user is following and, in some examples, can combine various feeds in a single information feed.

A feed generator can refer to any software program running on a processor or a dedicated processor (or combination thereof) that can generate feed items (e.g., feed tracked updates or messages) and combine them into a feed. In one implementation, the feed generator can generate a feed item by receiving a feed tracked update or message, identifying what feeds the item should be added to, and adding the feed. Adding the feed can include adding additional information (metadata) to the feed tracked update or message (e.g., adding a document, sender of message, a determined importance, etc.). The feed generator can also check to make sure that no one sees feed tracked updates for data that they don't have access to see (e.g., according to sharing rules). A feed generator can run at various times to pre-compute feeds or to compute them dynamically, or combinations thereof.

In one implementation, processor 417 in FIG. 4 can identify an event that meets criteria for a feed tracked update, and then generate the feed tracked update. Processor 417 can also identify a message. For example, an application interface can have certain mechanisms for submitting a message (e.g., "submit" buttons on a profile page, detail page of a record, "comment" button on post), and use of these mechanisms can be used to identify a message to be added to a table used to create a feed or added directly to a list of feed items ready for display.

A. Adding Items to a Pre-Computed Feed

In some implementations, a feed of feed items is created before a user requests the feed. Such an implementation can run fast, but have high overall costs for storage. In one implementation, once a profile feed or a record feed has been created, a feed item (messages and feed tracked updates) can be added to the feed. The feed can exist in the database system in a variety of ways, such as a related list. The feed can include mechanisms to remove items as well as add them.

As described above, a news feed can be an aggregated feed of all the record feeds and profile feeds to which a user has subscribed. The news feed can be provided on the home page of the subscribing user. Therefore, a news feed can be created by and exist for a particular user. For example, a user can subscribe to receive entity feeds of certain records that are of interest to the user, and to receive profile feeds of people that are of interest (e.g., people on a same team, that work for the user, are a boss of the user, etc.). A news feed can tell a user about all the actions across all the records (and people) whom have explicitly (or implicitly) been subscribed to via the subscriptions center (described above).

In one implementation, only one instance of each feed tracked update is shown on a user's news feed, even if the feed tracked update is published in multiple entities to which the user is subscribed. In one aspect, there may be delays in publishing news articles. For example, the delay may be due to queued up messages for asynchronous entity feed tracked update persistence. Different feeds may have different delays (e.g., delay for new feeds, but none of profile and entity feeds). In another implementation, certain feed tracked updates regarding a subscribed profile feed or an entity feed are not shown because the user is not allowed access, e.g., due to sharing rules (which restrict which users can see which data). Also, in one implementation, data of the record that has been updated (which includes creation) can be provided in the feed (e.g., a file or updated value of a feed can be added as a flash rendition).

B. Dynamically Generating Feeds

In some implementations, a feed generator can generate the feed items dynamically when a user requests to see a particular feed, e.g., a profile feed, entity feed, or the user's news feed. In one implementation, the most recent feed items (e.g., top 50) are generated first. In one aspect, the other feed items can be generated as a background process, e.g., not synchronously with the request to view the feed. However, since the background process is likely to complete before a user gets to the next 50 feed items, the feed generation may appear synchronous. In another aspect, the most recent feed items may or may not include comments, e.g., that are tied to feed tracked updates or posts.

In one implementation, the feed generator can query the appropriate subset of tables shown in FIG. 9A and/or other tables as necessary, to generate the feed items for display. For example, the feed generator can query the event history table 910 for the updates that occurred for a particular record. The ID of the particular record can be matched against the ID of the record. In one implementation, changes to a whole set of records can be stored in one table. The feed generator can also query for status updates, posts, and comments, each of which can be stored in different parts of a record or in separate tables, as shown in FIG. 9A. What gets recorded in the entity event history table (as well as what is displayed) can be controlled by a feed settings page in setup, which can be configurable by an administrator and can be the same for the entire organization, as is described above for custom feeds.

In one implementation, there can be two feed generators. For example, one generator can generate the record and profile feeds and another generator can generate news feeds. For the former, the feed generator can query identifiers of the record or the user profile. For the latter, the news feed generator can query the subscribed profile feeds and record feeds, e.g., user subscription table 940. In one implementation, the feed generator looks at a person's subscription center to decide which feeds to query for and return a list of feed items for the user. The list can be de-duped, e.g., by looking at the event number and values for the respective table, such as field name or ID, comment ID, or other information.

C. Adding Information to Feed Tracked Update Tables

Figure 10:
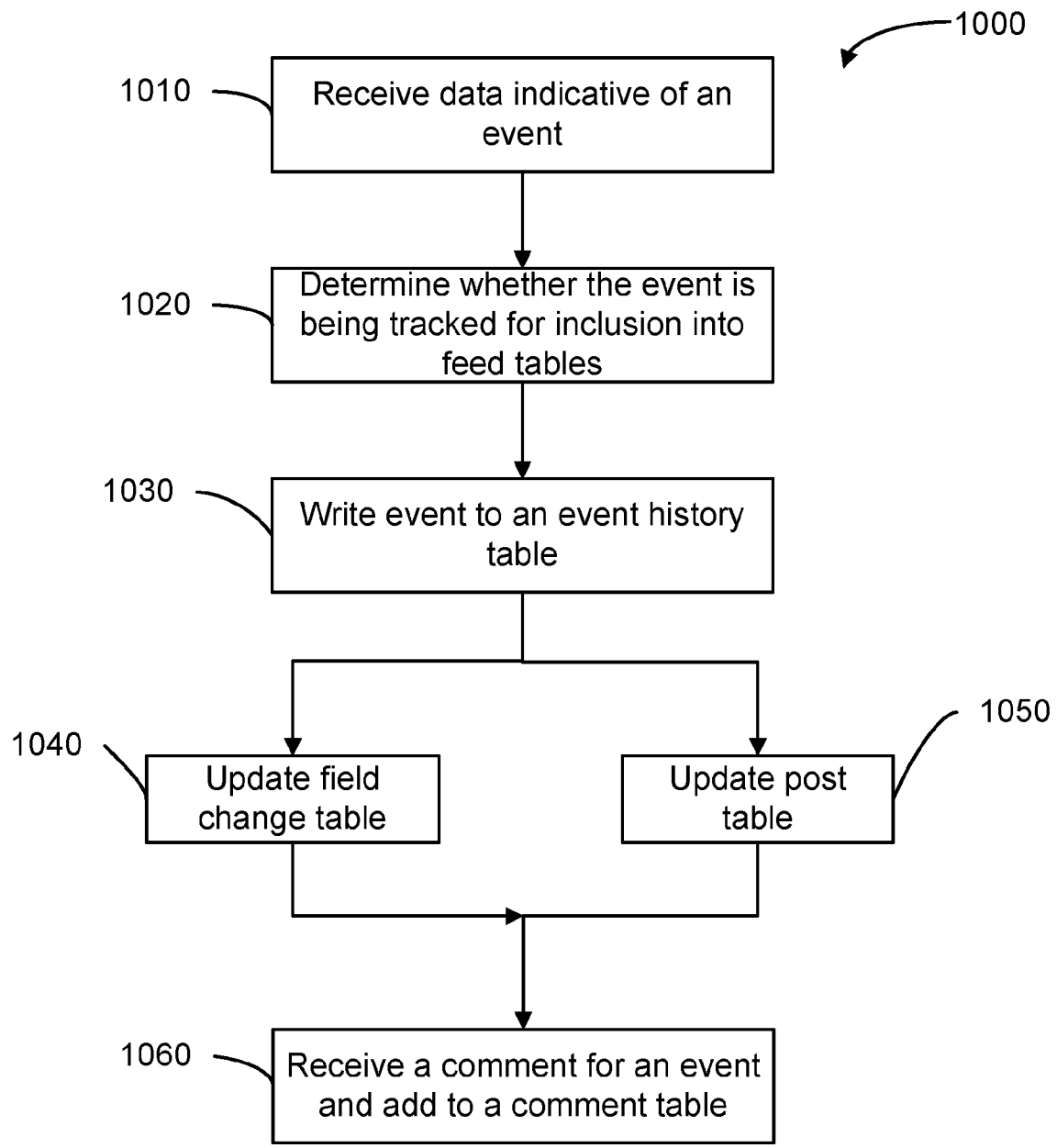
FIG. 10 shows a flowchart of an example of a method 1000 for saving information to feed tracking tables, performed in accordance with some implementations.

FIG. 10 shows a flowchart of an example of a method 1000 for saving information to feed tracking tables, performed in accordance with some implementations. In one implementation, some of the blocks may be performed regardless of whether a specific event or part of an event (e.g., only one field of an update is being tracked) is being tracked. In various implementations, a processor or set of processors (hardwired or programmed) can perform method 1000 and any other method described herein.

In block 1010, data indicative of an event is received. The data may have a particular identifier that specifies the event. For example, there may be a particular identifier for a field update. In another implementation, the transaction may be investigated for keywords identifying the event (e.g., terms in a query indicating a close, change field, or create operations).

In block 1020, it is determined whether the event is being tracked for inclusion into feed tracked update tables. The determination of what is being tracked can be based on a tenant's configuration as described above. In one aspect, the event has an actor (person performing an event), and an object of the event (e.g., record or user profile being changed).

In block 1030, the event is written to an event history table (e.g., table 910). In one implementation, this feed tracking operation can be performed in the same transaction that performs a save operation for updating a record. In another implementation, a transaction includes at least two roundtrip database operations, with one roundtrip being the database save (write), and the second database operation being the saving of the update in the feed tracked update table. In one implementation, the event history table is chronological. In another implementation, if user A posts on user B's profile, then user A is under the "created by" 913 and user B is under the object ID 912.

In block 1040, a field change table (e.g., field change table 920) can be updated with an entry having the event identifier and fields that were changed in the update. In one implementation, the field change table is a child table of the event history table. This table can include information about each of the fields that are changed. For example, for an event that changes the name and balance for an account record, an entry can have the event identifier, the old and new name, and the old and new balance. Alternatively, each field change can be in a different row with the same event identifier. The field name or ID can also be included to determine which field the values are associated.

In block 1050, when the event is a post, a post table (e.g., post table 950) can be updated with an entry having the event identifier and text of the post. In one implementation, the field change table is a child table of the event history table. In another implementation, the text can be identified in the transaction (e.g., a query command), stripped out, and put into the entry at the appropriate column. The various tables described herein can be combined or separated in various ways. For example, the post table and the field change table may be part of the same table or distinct tables, or may include overlapping portions of data.

In block 1060, a comment is received for an event and the comment is added to a comment table (e.g., comment table 930). The comment could be for a post or an update of a record, from which a feed tracked update can be generated for display. In one implementation, the text can be identified in the transaction (e.g., a query command), stripped out, and put into the entry at the appropriate column.

D. Reading Information from Feed Tracked Update Tables

Figure 11:
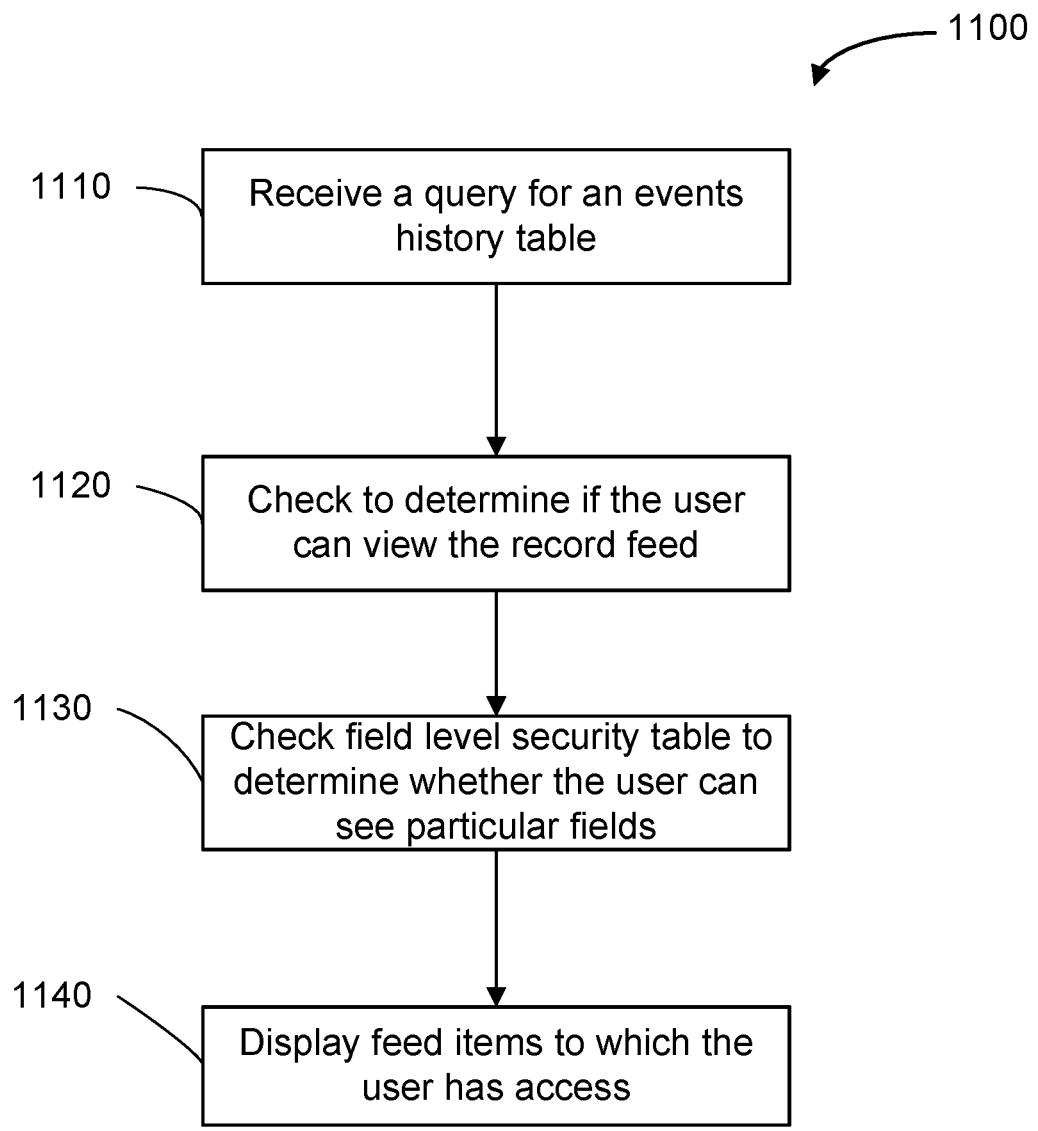
FIG. 11 shows a flowchart of an example of a method 1100 for reading a feed item as part of generating a feed for display, performed in accordance with some implementations.

FIG. 11 shows a flowchart of an example of a method 1100 for reading a feed item as part of generating a feed for display, performed in accordance with some implementations. In one implementation, the feed item may be read as part of creating a feed for a record.

In block 1110, a query is received for an events history table (e.g., event history table 910) for events related to a particular record. In one implementation, the query includes an identifier of the record for which the feed is being requested. In various implementations, the query may be initiated from a detail page of the record, a home page of a user requesting the record feed, or from a listing of different records (e.g., obtained from a search or from browsing).

In block 1120, the user's security level can be checked to determine if the user can view the record feed. Typically, a user can view a record feed, if the user can access the record. This security check can be performed in various ways. In one implementation, a first table is checked to see if the user has a classification (e.g., a security level that allows him to view records of the given type). In another implementation, a second table is checked to see if the user is allowed to see the specific record. The first table can be checked before the second table, and both tables can be different sections of a same table. If the user has requested the feed from the detail page of the record, one implementation can skip the security level check for the record since the check was already done when the user requested to view the detail page.

In one implementation, a security check is determined upon each request to view the record feed. Thus, whether or not a feed item is displayed to a user is determined based on access rights, e.g., when the user requests to see a feed of a record or a news feed of all the objects the user is following. In this manner, if a user's security changes, a feed automatically adapts to the user's security level when it is changed. In another implementation, a feed can be computed before being requested and a subsequent security check can be made to determine whether the person still has access right to view the feed items. The security (access) check may be at the field level, as well as at the record level.

In block 1130, if the user can access the record, a field level security table can be checked to determine whether the user can see particular fields. In one implementation, only those fields are displayed to the user. Alternatively, a subset of those the user has access to is displayed. The field level security check may optionally be performed at the same time and even using the same operation as the record level check. In addition, the record type check may also be performed at this time. If the user can only see certain fields, then any feed items related to those fields (e.g., as determined from field change table 920) can be removed from the feed being displayed.

In block 1140, the feed items that the user has access to are displayed. In one implementation, a predetermined number (e.g., 20) of feed items are displayed at a time. The method can display the first 20 feed items that are found to be readable, and then determine others while the user is viewing the first 20. In another implementation, the other feed items are not determined until the user requests to see them, e.g., by activating a see more link.

Figure 12:
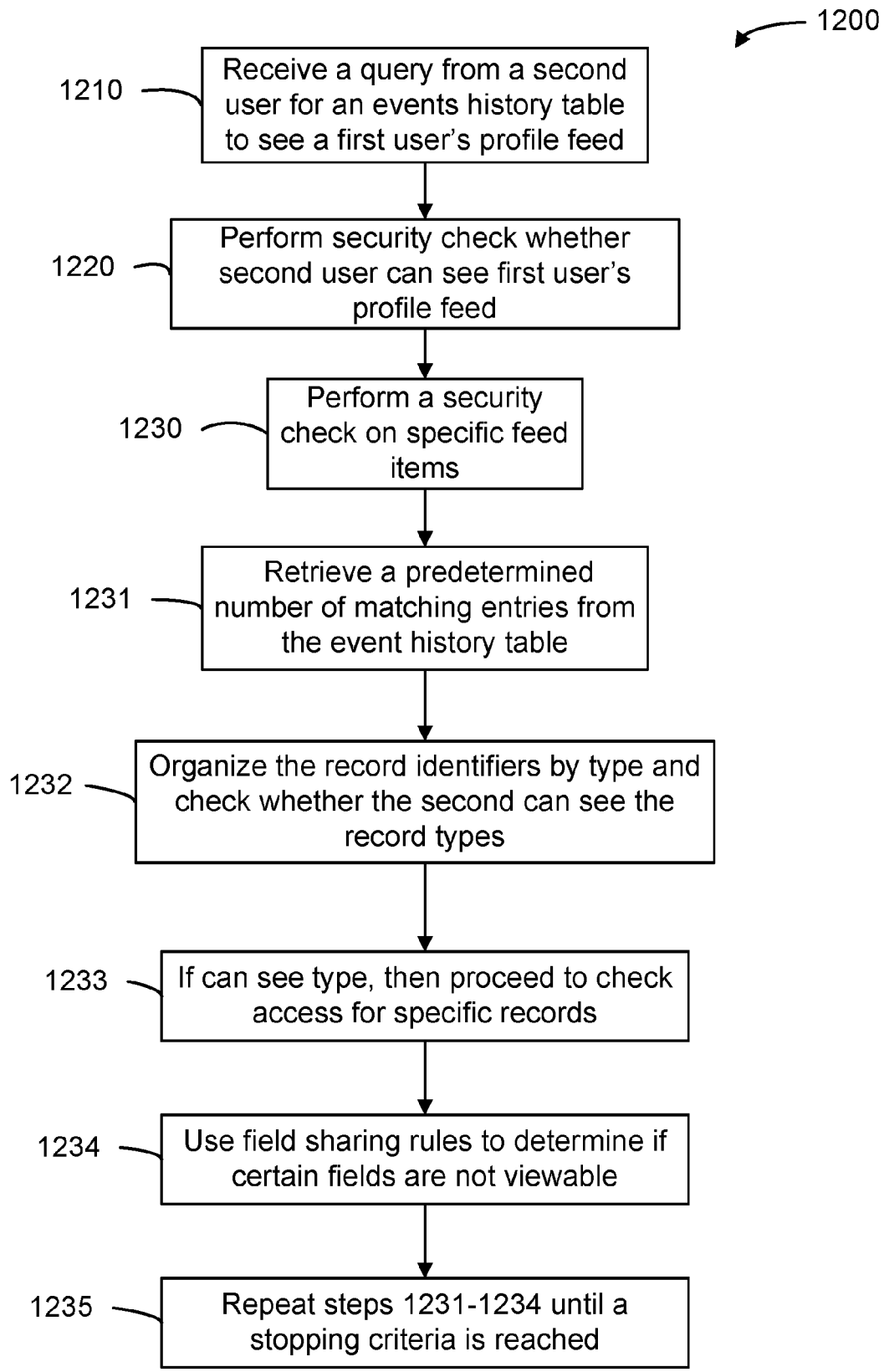
FIG. 12 shows a flowchart of an example of a method 1200 for reading a feed item of a profile feed for display, performed in accordance with some implementations.

FIG. 12 shows a flowchart of an example of a method 1200 for reading a feed item of a profile feed for display, performed in accordance with some implementations. In one implementation, the query includes an identifier of the user profile feed that is being requested. Certain blocks may be optional, as is also true for other methods described herein. For example, security checks may not be performed.

In block 1210, a query is directed to an event history table (e.g., event history table 910) for events having a first user as the actor of the event (e.g., creation of an account) or on which the event occurred (e.g., a post to the user's profile). In various implementations, the query may be initiated by a second user from the user's profile page, a home page of a user requesting the profile feed (e.g., from a list of users being followed), or from a listing of different users (e.g., obtained from a search or from browsing). Various mechanisms for determining aspects of events and obtaining information from tables can be the same across any of the methods described herein.

In block 1220, a security check may also be performed on whether the second user can see the first user's profile. In one implementation any user can see the profile of another user of the same tenant, and block 1220 is optional.

In block 1230, a security (access) check can be performed for the feed tracked updates based on record types, records, and/or fields, as well security checks for messages. In one implementation, only the feed tracked updates related to records that the person has updated are the ones that need security check as the feed items about the user are readable by any user of the same tenant. Users of other tenants are not navigable, and thus security can be enforced at a tenant level. In another implementation, messages can be checked for keywords or links to a record or field that the second user does not have access.

As users can have different security classifications, it is important that a user with a low-level security cannot see changes to records that have been performed by a user with high-level security. In one implementation, each feed item can be checked and then the viewable results displayed, but this can be inefficient. For example, such a security check may take a long time, and the second user would like to get some results sooner rather than later. The following blocks illustrate one implementation of how security might be checked for a first user that has a lot of feed items, but the second user cannot see most of them. This implementation can be used for all situations, but can be effective in the above situation.

In block 1231, a predetermined number of entries are retrieved from the event history table (e.g., starting from the most recent, which may be determined from the event identifier). The retrieved entries may just be ones that match the user ID of the query. In one implementation, entries are checked to find the entries that are associated with the user and with a record (i.e. not just posts to the user account). In another implementation, those entries associated with the user are allowed to be viewed, e.g., because the second user can see the profile of the first user as determined in block 1220.

In block 1232, the record identifiers are organized by type and the type is checked on whether the second user can see the record types. Other checks such as whether a record was manually shared (e.g., by the owner) can also be performed. In one implementation, the queries for the different types can be done in parallel.

In block 1233, if a user can see the record type, then a check can be performed on the specific record. In one implementation, if a user can see a record type, then the user can see all of the records of that type, and so this block can be skipped. In another implementation, the sharing model can account for whether a user below the second user (e.g., the second user is a manager) can see the record. In such an implementation, the second user may see such a record. In one implementation, if a user cannot see a specific record, then comments on that record are also not viewable.

In block 1234, field level sharing rules can be used to determine whether the second user can see information about an update or value of certain fields. In one implementation, messages can be analyzed to determine if reference to a particular field name is made. If so, then field level security can be applied to the messages.

In block 1280, blocks 1231-1234 are repeated until a stopping criterion is met. In one implementation, the stopping criteria may be when a maximum number (e.g., 100) of entries that are viewable have been identified. In another implementation, the stopping criteria can be that a maximum number (e.g., 500) of entries from the entity feed tracked update table have been analyzed, regardless of whether the entries are viewable or not.

In one implementation, a news feed can be generated as a combination of the profile feeds and the entity feeds, e.g., as described above. In one implementation, a list of records and user profiles for the queries in blocks 1110 and 1210 can be obtained form user subscription table 940. In one implementation, there is a maximum number of objects that can be followed.

E. Partial Pre-Computing of Items for a Feed

Figure 13:
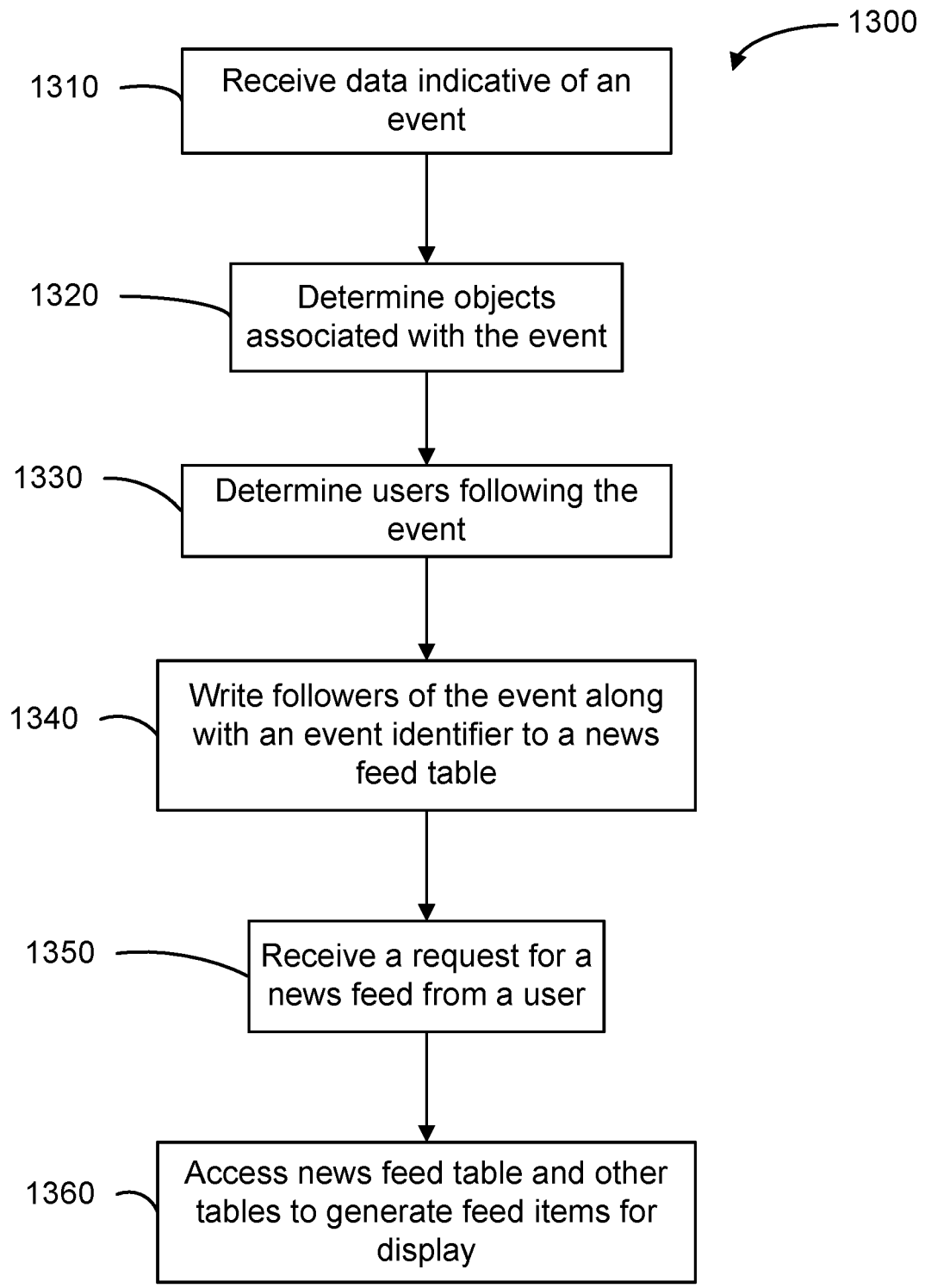
FIG. 13 shows a flowchart of an example of a method 1300 of storing event information for efficient generation of feed items to display in a feed, performed in accordance with some implementations.

FIG. 13 shows a flowchart of an example of a method 1300 of storing event information for efficient generation of feed items to display in a feed, performed in accordance with some implementations. In various implementations, method 1300 can be performed each time an event is written to the event history table, or periodically based on some other criteria (e.g., every minute, after five updates have been made, etc.).

In block 1310, data indicative of an event is received. The data may be the same and identified in the same way as described for block 1010. The event may be written to an event history table (e.g., table 910).

In block 1320, the object(s) associated with the event are identified. In various implementations, the object may be identified by according to various criteria, such as the record being changed, the user changing the record, a user posting a message, and a user whose profile the message is being posted to.

In block 1330, the users following the event are determined. In one implementation, one or more objects that are associated with the event are used to determine the users following the event. In one implementation, a subscription table (e.g., table 940) can be used to find the identified objects. The entries of the identified objects can contain an identifier (e.g., user ID 941) of each the users following the object.

In block 1340, the event and the source of the event, e.g., a record (for a record update) or a posting user (for a user-generated post) are written to a news feed table along with an event identifier. In one implementation, such information is added as a separate entry into the news feed table along with the event ID. In another implementation, each of the events for a user is added as a new column for the row of the user. In yet another implementation, more columns (e.g., columns from the other tables) can be added.

News feed table 960 shows an example of such a table with user ID 961 and event ID or pointer 962. The table can be organized in any manner. One difference from event history table 910 is that one event can have multiple entries (one for each subscriber) in the news feed table 960. In one implementation, all of the entries for a same user are grouped together, e.g., as shown. The user U819 is shown as following events E37 and E90, and thus any of the individual feed items resulting from those events. In another implementation, any new entries are added at the end of the table. Thus, all of the followers for a new event can be added as a group. In such an implementation, the event IDs would generally be grouped together in the table. Of course, the table can be sorted in any suitable manner.

In an implementation, if the number of users is small, then the feed items in one or more of the tables may be written as part of the same write transaction. In one implementation, the determination of small depends on the number of updates performed for the event (e.g., a maximum number of update operations may be allowed), and if more operations are performed, then the addition of the feed items is performed. In one aspect, the number of operations can be counted by the number of rows to be updated, including the rows of the record (which depends on the update event), and the rows of the feed tracked update tables, which can depend on the number of followers. In another implementation, if the number of users is large, the rest of the feed items can be created by batch. In one implementation, the feed items are written as part of a different transaction, i.e., by batch job.

In one implementation, security checks can be performed before an entry is added to the news feed table 960. In this manner, security checks can be performed during batch jobs and may not have to be performed at the time of requesting a news feed. In one implementation, the event can be analyzed and if access is not allowed to a feed item of the event, then an entry is not added. In one aspect, multiple feed items for a same user may not result from a same event (e.g., by how an event is defined in table 910), and thus there is no concern about a user missing a feed item that he/she should be able to view.

In block 1350, a request for a news feed is received from a user. In one implementation, the request is obtained when a user navigates to the user's home page. In another implementation, the user selects a table, link, or other page item that causes the request to be sent.

In block 1360, the news feed table and other tables are accessed to provide displayable feed items of the news feed. The news feed can then be displayed. In one implementation, the news feed table can then be joined with the event history table to determine the feed items. For example, the news feed table 960 can be searched for entries with a particular user ID. These entries can be used to identify event entries in event history table 910, and the proper information from any child tables can be retrieved. The feed items (e.g., feed tracked updates and messages) can then be generated for display.

In one implementation, the most recent feed items (e.g., 100 most recent) are determined first. The other feed items may then be determined in a batch process. Thus, the feed item that a user is most likely to view can come up first, and the user may not recognize that the other feed items are being done in batch. In one implementation, the most recent feed items can be gauged by the event identifiers. In another implementation, the feed items with a highest importance level can be displayed first. The highest importance being determined by one or more criteria, such as, who posted the feed item, how recently, how related to other feed items, etc.

In one implementation where the user subscription table 940 is used to dynamically create a news feed, the query would search the subscription table, and then use the object IDs to search the event history table (one search for each object the user is following). Thus, the query for the news feed can be proportional to the number of objects that one was subscribing to. The news feed table allows the intermediate block of determining the object IDs to be done at an earlier stage so that the relevant events are already known. Thus, the determination of the feed is no longer proportional to the number of object being followed.

In some implementations, a news feed table can include a pointer (as opposed to an event identifier) to the event history table for each event that is being followed by the user. In this manner, the event entries can immediately be retrieved without having to perform a search on the event history table. Security checks can be made at this time, and the text for the feed tracked updates can be generated.

X. Display of a Feed

Feeds include messages and feed tracked updates and can show up in many places in an application interface with the database system. In one implementation, feeds can be scoped to the context of the page on which they are being displayed. For example, how a feed tracked update is presented can vary depending on which page it is being displayed (e.g., in news feeds, on a detail page of a record, and even based on how the user ended up at a particular page). In another implementation, only a finite number of feed items are displayed (e.g., 50). In one implementation, there can be a limit specifically on the number of feed tracked updates or messages displayed. Alternatively, the limit can be applied to particular types of feed tracked updates or messages. For example, only the most recent changes (e.g., 5 most recent) for a field may be displayed. Also, the number of fields for which changes are displayed can also be limited. Such limits can also be placed on profile feeds and news feeds. In one implementation, feed items may also be subject to certain filtering criteria before being displayed, e.g., as described below.

XI. Filtering and Searching Feeds

It can be possible that a user subscribes to many users and records, which can cause a user's news feed to be very long and include many feed items. In such instances, it can be difficult for the user to read every feed item, and thus some important or interesting feed items may not be read. In some implementations, filters may be used to determine which feed items are added to a feed or displayed in the feed.

Figure 14:
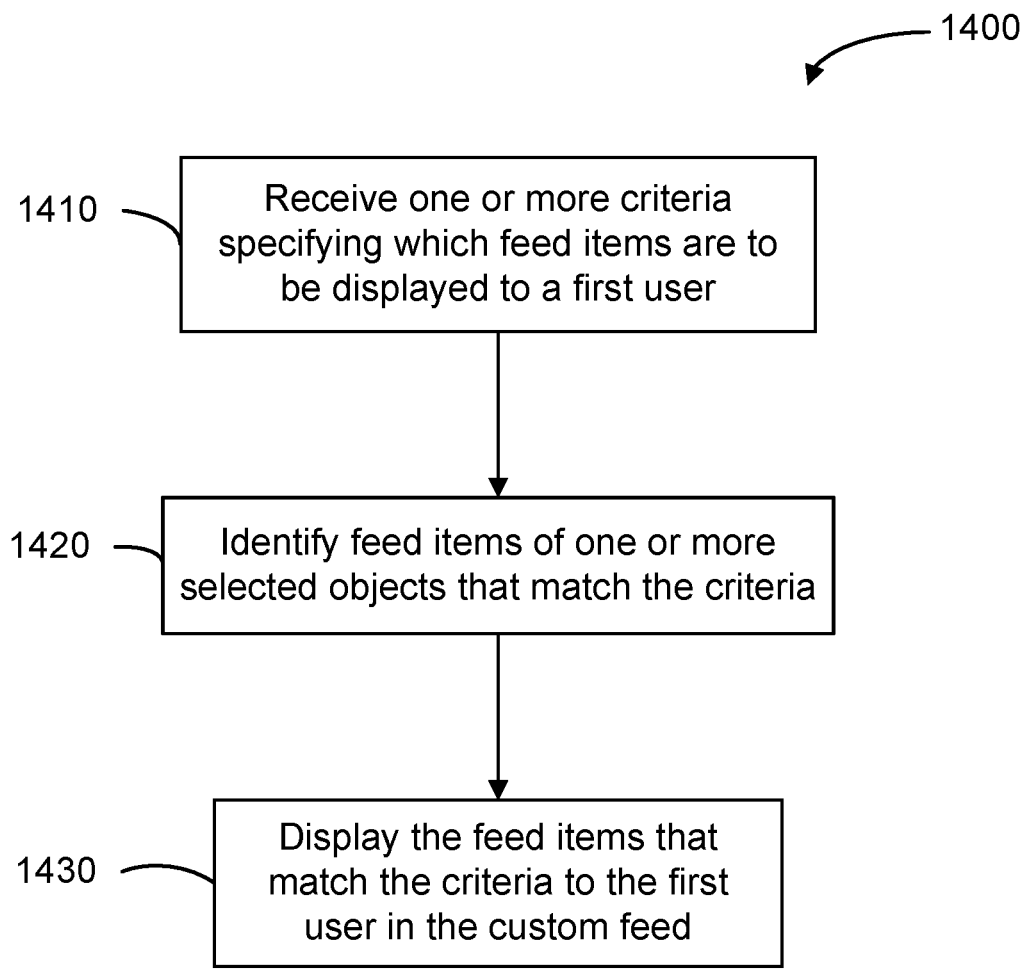
FIG. 14 shows a flowchart of an example of a method 1400 for creating a custom feed for users of a database system using filtering criteria, performed in accordance with some implementations.

FIG. 14 shows a flowchart of an example of a method 1400 for creating a custom feed for users of a database system using filtering criteria, performed in accordance with some implementations. Any of the following blocks can be performed wholly or partially with the database system, and in particular by one or more processor of the database system.

In block 1410, one or more criteria specifying which feed items are to be displayed to a first user are received from a tenant. In one implementation, the criteria specify which items to add to the custom feed. For example, the criteria could specify to only include feed items for certain fields of a record, messages including certain keywords, and other criteria mentioned herein. In another implementation, the criteria specify which items to remove from the custom feed. For example, the criteria could specify not to include feed items about certain fields or including certain keywords.

In block 1420, the database system identifies feed items of one or more selected objects that match the criteria. The feed items can be stored in the database, e.g., in one or more of the tables of FIG. 9A. In one implementation, the one or more selected objects are the objects that the first user is following. In another implementation, the one or more selected objects is a single record whose record feed the first user is requesting.

In block 1430, the feed items that match the criteria are displayed to the first user in the custom feed. The generation of text for a feed tracked update can occur after the identification of the feed items (e.g., data for a field change) and before the display of the final version of the feed item.

In one implementation, the criteria are received before a feed item is created. In another implementation, the criteria are received from the first user. In one aspect, the criteria may only be used for determining feeds to display to the first user. In yet another implementation, the criteria are received from a first tenant and apply to all of the users of the first tenant. Also, in an implementation where a plurality of criteria are specified, the criteria may be satisfied for a feed item if one criterion is satisfied.

Some implementations can provide mechanisms to search for feed items of interest. For example, the feed items can be searched by keyword, e.g., as entered by a user. As another example, a tab (or other selection device) can show feed items about or from a particular user. In one implementation, only messages (or even just comments) from a particular user can be selected. Besides searching for feed items that match criteria, one also could search for a particular feed item.

XIII. Topical-Based Highlight Filtering

Figure 15:
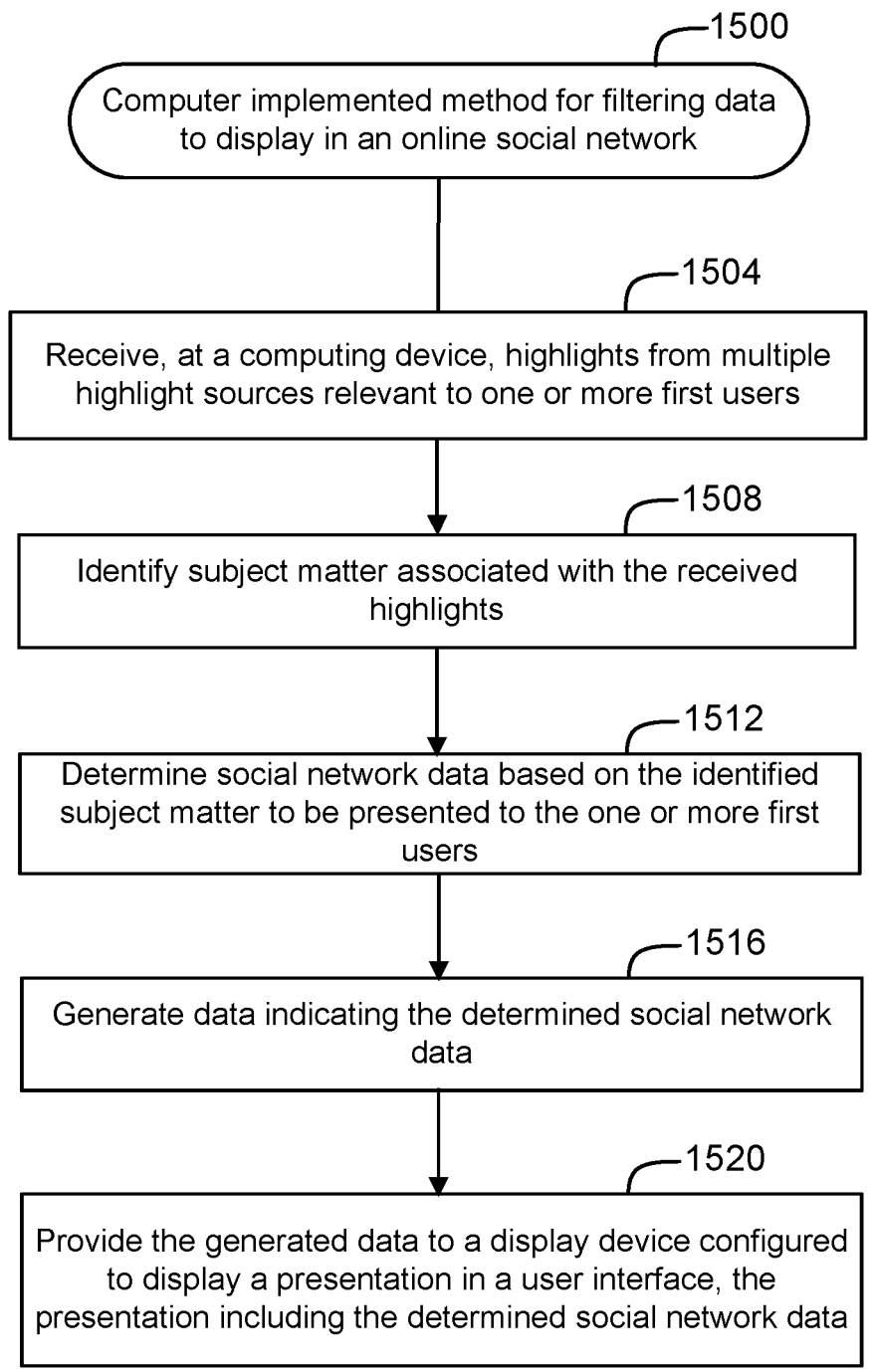
FIG. 15 shows a flowchart of an example of a computer implemented method 1500 for filtering data to display in an online social network, performed in accordance with some implementations.

FIG. 15 shows a flowchart of an example of a computer implemented method 1500 for filtering data to display in an online social network, performed in accordance with some implementations. At block 1504, highlights from multiple highlight sources relevant to one or more first users are received at a computing device or any number of computing devices cooperating to perform method 1500. Highlights can include information updates or other content posted or published to a social network. Examples include conversations, posts, comments, updates to a user's status, updates to a record, uploaded files, and hyperlinks to social network data or other network data such as various documents and/or web pages on the Internet. Highlight sources can include one or more collections of users, entities, and/or topics that are relevant to the one or more first users. One example of a highlight source for a user John D. is his "inner circle," the users and/or other entities with whom he interacts most in the online social network. Inner circle highlights may include content posted to the social network from these users and other entities. Another example of a highlight source is "global influence," the users and/or other entities that exert the most influence on the social network. Global influence highlights can include content posted to the social network from these users and other entities. These and other examples of highlight sources are described further with reference to FIG. 16, below. Examples of methods for providing highlights from a highlight source are also described below with reference to FIG. 16.

At block 1504, a server can retrieve the highlights from any of a variety of storage mediums as disclosed herein, by way of example. For instance, tenant data storage 22 and/or system data storage 24 of FIGS. 1A and 1B can store the information updates and other social network data that may be retrieved in block 1504. One or more servers can be configured to process data to perform part or all of block 1504, as well as part or all of the remaining blocks of method 1500. In an alternative example, a user system 12 as mentioned above can be configured to perform part or all of the blocks of method 1500. Any of the various databases and/or memory devices described herein can serve as storage media to store and maintain information updates and other social network data for retrieval at block 1504.

A highlight source can be generated or selected by a user or system-generated, as described in the examples below, and stored and maintained in the social networking system in which method 1500 is practiced. In some implementations, when a highlight source is used in conjunction with the identity of a first user, the highlight source can be stored in association with the first user. In some implementations, the highlight source can be stored in association with the user profile of the first user. For instance, a database table can store users and other entities of the first user's inner circle in rows with a column identifying the first user and/or the first user's profile with which the entities are linked. Information updates that are associated with the inner circle entities can be linked to the first user by cross-referenced tables such as one or more of the tables of FIG. 9A. According to various implementations, all or only a subset of the content posted by a user of other entity of a particular highlight source can be received at block 1504. For example, only information updates of a certain type (e.g., posts) or from a certain time period (e.g., information updates from the last week or last hour) may be received.

In FIG. 15, at block 1508, subject matter associated with the received highlights is identified. In some implementations, the one or more computing devices performing method 1500 can cause the received highlights to be analyzed to identify subject matter associated with the highlights. Examples of subject matter associated with highlights can include the name of a user, a group, an account, a record, or some category of information. A category of information may indicate subject matter related to a product or a service, technology, software, music, movies, books, travel, or any other subject matter. As discussed further below, in some implementations, the subject matter includes topics in the online social network.

In some implementations, one or more servers configured to perform method 1500 may be configured to identify subject matter associated with an information update using the content of the information update or cause the subject matter to be identified. For example, a designated character, word, phrase, symbol, expression (e.g., an emoticon), command, @mention, user ID and/or hash tag can be identified in the update. The designated information may be selected by a user or may be system-generated. In some implementations, subject matter may be identified based on a URL address, a hyperlink, a language, a header, a document, an image file, a video file, and/or an audio file associated with an information update or an entity. For example, subject matter may be identified based on the content of a conversation thread including a post and a string of comments in an information feed of the online social network. The systems described herein may determine subject matter based on the frequency or occurrence of keywords, phrases, symbols, etc. within a conversation thread.

In some implementations, block 1508 may involve identifying topics associated with the received highlights. In some implementations, the associated topics may be retrieved from a storage media of the online social network. In some implementations, the one or more computing devices configured to perform method 1500 can be configured to analyze the highlights or cause the highlights to be analyzed to identify one or more topics. For example, a post or conversational thread may be associated with the topic "solar panel design". Management of topics in an online social network is discussed further below with respect to FIG. 19.

In FIG. 15, at block 1512, social network data associated with the subject matter to be presented to the first user is determined. In some implementations, social network data that can be identified include data objects in the form of records such as cases, accounts, or opportunities, individual users and groups of users, and topics. In some implementations, the social network data that can be identified includes one or more posts, messages, conversations, entities, records, uploaded files, products, advertisements, and multimedia data in the online social network. In some implementations, the determined social network data includes highlights received in block 1504. For example, in some implementations, the system may identify a subset of the most relevant highlights received in block 1504 in block 1512. In some implementations, the determined social network data can include social network data in addition to or instead of social network data received in block 1504. For example, in some implementations, one or more persons, topics, objects, or records that may be relevant to the first user may be identified. In a particular example, a contact at ABC Company may be identified to a user George W. as potentially relevant. In other example, a topic "e-commerce in Asia" may be identified as a topic that may be relevant to George W., for example, based on highlights from his inner circle, topical highlights, global influence highlights, or a combination thereof. In some implementations, determining social network data to be presented to the first user based on the identified subject matter includes identifying social network data associated with topics that correspond to the identified subject matter. For example, if the topic "emerging markets" is identified, a recommendation to follow a user Al Gore may be presented to the first user based on Al Gore's being a top influencer of the topic.

Data can then be generated at block 1516 indicating the determined social network data. In some instances, the generated data can include a reference to one or more subject matter and/or highlight sources from which the determined social network data was derived in blocks 1504-1512. Data indicating the determined social network data can be provided at block 1520 to a display device configured to display a presentation in a user interface. In some implementations, the determined social network data may be part of a feed in the user interface. As described in further detail in the examples below, in some implementations, such a presentation will include a reference to associated subject matter or highlight sources. In one example, a presentation may indicate that a highlight source (e.g., the first user's inner circle) is talking about a particular topic (e.g., XYZ Company). In some implementations, a presentation may include a recommendation for first user to follow or otherwise access the determined social network data.

In FIG. 15, at block 1520, the display device can be a display of a user system 12 as described above with reference to FIGS. 1A and 1B. The display device of block 1520 can be configured to concurrently display other components in a suitable user interface, including feeds, lists of users, and relevant data regarding a user's profile, a record, or other construct in the online social network.

In FIG. 15, in one example, an app server 288 in the on-demand service environment 200 of FIGS. 2A and 2B includes one or more processors configured to perform part or all of blocks 1504-1520. In other instances, one or more other computing devices such as user systems 12 and/or other servers retrieve, process, and exchange data to cooperate with app server 288 to perform the blocks. When user input data, for example, is used in block 1504 and/or block 1512, such data can be received by a server over a data network from a user operating a user system 12 as shown in FIGS. 1A and 1B. In other instances, such data is received from a proxy server on behalf of a user or other data source. Various implementations of method 1500 are possible, such that any of the servers described above with reference to FIG. 2B or other computing devices disclosed herein can be configured to receive and process parameters and information updates in accordance with method 1500.

Returning to block 1520, in one example, the data provided to the display device is transmitted from a server such as app server 288 over network 14 to a user system 12 of FIGS. 1A and 1B. In this example, the display device is one component of the user system 12, which includes a processor configured to execute a web browser program stored on user system 12 to output a graphical presentation of the data on the display device, for instance, in a GUI. In other examples, the data provided to the display device at block 1520 is generated locally at user system 12. By the same token, one or more of the blocks 1504-1520 as described above can also be performed at user system 12 as an alternative to being performed at one or more servers in an online social network. The same is true for the other examples of methods described below.

Figure 16:
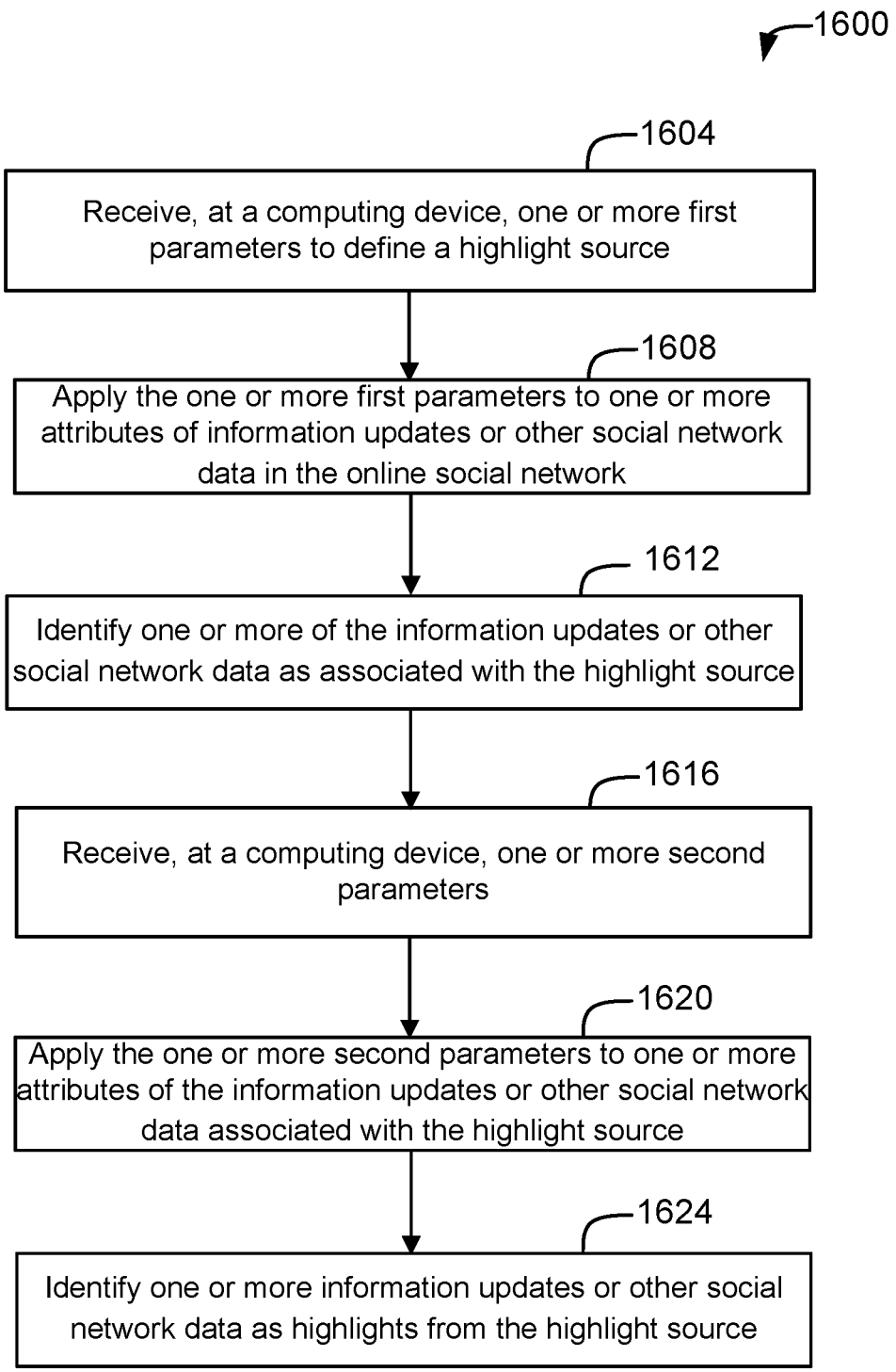
FIG. 16 shows a flowchart of an example of a computer implemented method 1600 for defining a highlight source and identifying highlights of the highlight source, performed in accordance with some implementations.

FIG. 16 shows a flowchart of an example of a computer implemented method 1600 for defining a highlight source and identifying highlights of the highlight source, performed in accordance with some implementations. Method 1600 can be performed, for example, prior to or as part of block 1504 of method 1500 described above with reference to FIG. 15. In FIG. 16, at block 1604, a computing device performing or any number of computing devices cooperating to perform method 1600 receives one or more first parameters to define a highlight source.

For example, a parameter can identify a user, a group, a role, a title, a group, a record, a field of a record, a type of record, a geographic location, and a keyword. A number of other examples of parameters and combinations of parameters can be selected and customized according to the particular implementation as illustrated in the various examples described below.

In some implementations, a highlight source for a first user can be defined in whole or part based on a level of interaction with the first user. For example, in some implementations, a highlight source can be a user's inner circle. An inner circle can be defined as one or more entities with whom a user interacts most. According to various implementations, an inner circle may include one or more of: other users in the online social network, groups of users in the online social network, data objects such as records (e.g., cases, accounts, or opportunities) in the online social network, and other entities having a presence on the online social network including non-human entities such as servers or devices. Non-limiting examples of entity types include users, groups, organizations, records, feeds and other social networking constructs. Another type of entity that can contribute to an inner circle highlight source is an application executing on one or more servers or other computing devices. For example, an application hosted on a cloud application platform such as Heroku® can be in the inner circle of a user. In some implementations, an inner circle may be limited by entity type. For example, an inner circle may include only others users and/or other groups of users, only data objects such as records, only non-human entities, etc. In some other implementations, an inner circle may include a combination of these.

According to various implementations, contributing entities to an inner circle can selected by a user, can be system-generated or selected using any of the various available social network data stored and maintained in the social networking system in which method 1600 is practiced. For example, an inner circle of a user may be identified manually by the user, by monitoring the user's activity on the online social network, or a combination of these. Factors that can be considered in defining an inner circle of a first user can include whether the first user follows the user, record, or other entity, the number of times the first user interacts with the user, record, or other entity, e.g., via message, post, comment, conversation, etc., the number of times the first user posts information about the user, record, or other entity, and the number of times the user accesses the user, record, or other entity or information about the user, record, or other entity (e.g., such as a user profile). In some implementations, multiple inner circle highlight sources may be identified for a first user. For example, a user-only inner circle and a record-only inner circle may be identified. Similarly, multiple inner circle highlight sources may be identified based on different levels of interaction by the first user.

In some implementations, the parameters defining a highlight source may be retrieved from one or more suitable storage media of the online social network. FIG. 17 shows an example of an inner circle table 1700 that may be used in tracking an inner circle of one or more users. Inner circle table 1700 includes columns of user ID 1701, inner circle object IDs 1703, and inner circle user IDs 1705. In the example of FIG. 17, an inner circle of the user with the user ID U919 includes objects with object IDs O615, O712, O987, etc. and users with user IDs U921, U981, U100, etc. Inner circle table 1700 may be arranged in any appropriate manner; for example, each inner circle object ID or user ID may occupy an individual row in some implementations. The inner circle table 1700 can be updated periodically as the user's interactions change. In some implementations, the parameters defining a highlight source may be retrieved from one or more tables in the online social network. For example, in implementations in which objects of a first user's inner circle include or are defined by objects to which the first user subscribes, block 1604 can involve retrieving parameters such as object ID's from a user subscription table 940 as shown in FIG. 9A, above.

Another example of a highlight source is an influence highlight source. Influence considers users, data objects, and other entities that have influence on the online social network. One example of an influence highlight source is a global influence highlight source. Global influence considers those entities that exert the most influence on the online social network. Another example of an influence highlight source is a topical influence highlight source. Topical influence considers those entities that exert influence of a topic in the online social network.

Contributing entities to an influence highlight source can be system-generated or selected using any of the various available social network data stored and maintained in the social networking system. For example, in some implementations, a user may designate one or more entities as being influential. In some implementations, an entity is determined to be an influencer based on one or more factors. For example, the one or more factors can indicate the extent of dissemination of information contributed by the entity to other entities in the online social network. The one or more factors can be selected by a user, can be system-generated or selected using any of the various available social network data stored and maintained in the social networking system in which methods 1500 and 1600 are practiced.

Figure 18A:
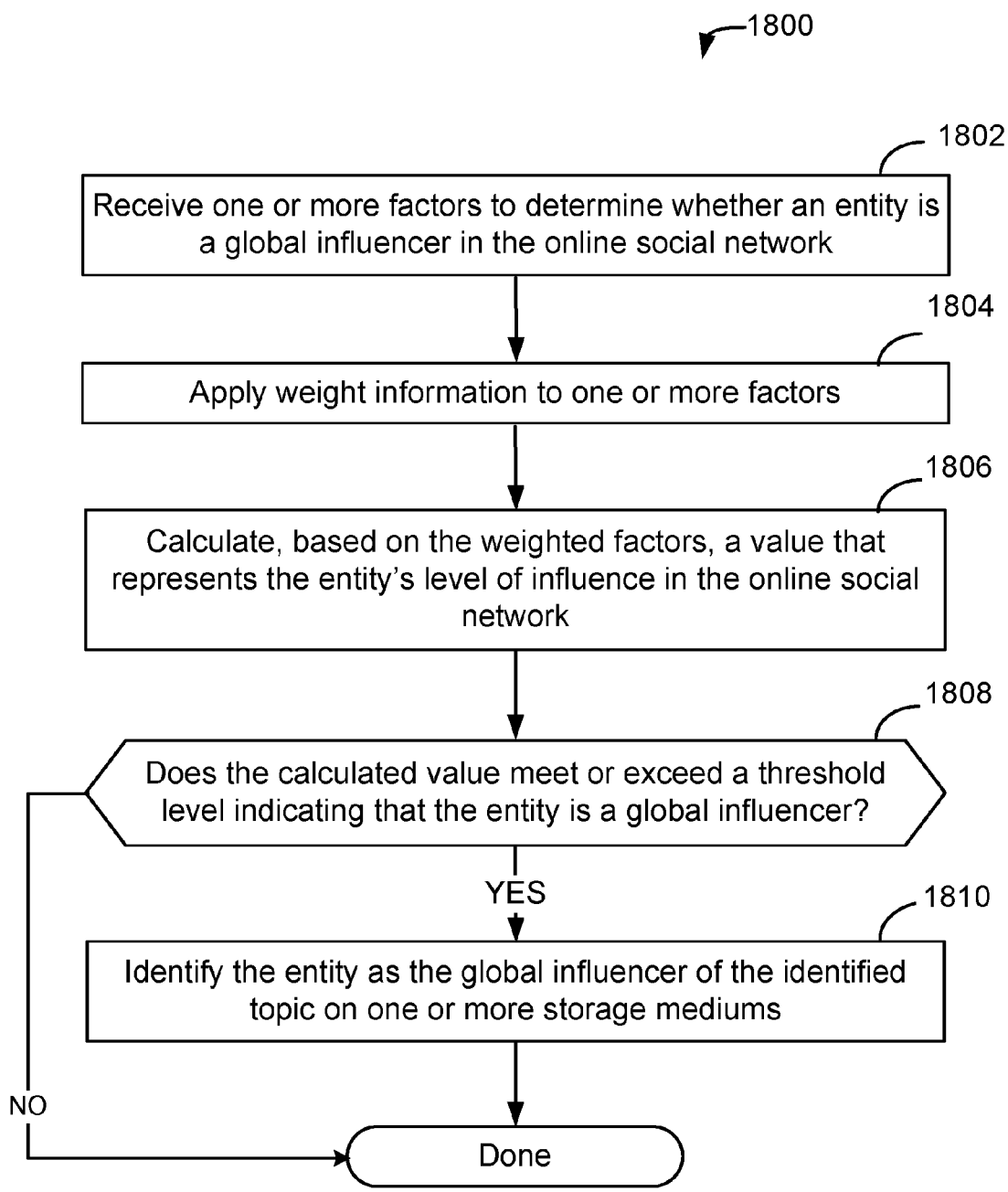
FIG. 18A shows a flowchart of an example of a computer implemented method 1800 for determining whether an entity is a global influencer in an online social network based on one or more factors, performed in accordance with some implementations.

FIG. 18A shows a flowchart of an example of a computer implemented method 1800 for determining whether an entity is a global influencer in an online social network based on one or more factors, performed in accordance with some implementations. At block 1802, one or more factors are used to determine whether an entity is a global influencer in the online social network. For example, the one or more factors can be used as indicators of an entity's contributions of content to an online social network and the breadth of dissemination of the entity's contributions to other entities in the online social network. Any one or more factors, including combinations of selected factors in block 1802 can be applied to determine whether an entity is an influencer in the online social network.

Examples of factors used to determine where an entity is a global influencer may include one or more of: a number of followers of the entity, the influence of followers of the entity (e.g., whether the entity is followed by other influencers), a number of preference indications associated with feed items associated with the entity (e.g., posts by the entity that are "liked"), a number of times a feed item is shared within the online social network, a number of comments feed items associated with the entity receive, a number of times the entity is @mentioned in messages or feed items submitted by one or more users of the online social network, a number of times the entity has been recognized as an expert or an authority by one or more users of the online social network, and a number of user-submitted messages having content identifying the entity. For example, the number of times posts from a user, Amanda K., are shared in the online social network, such as re-tweets in Twitter®, re-shares in Google+®, shares in Facebook®, etc. add to her influence factor as well as indicate her reach in engaging other users with her content.

At block 1804, weight information is applied to one or more factors. In some implementations, numerical weights can be applied to any one or more of the various factors based on the importance of the factor. For example, "likes" for a post may be weighted less than a comment to a post because there is more effort required in submitting a comment. In some instances, the weight may depend on how an entity engages other entities in an online social network. For example, if a feed item submitted by a user is shared over one hundred times in an online social network, this reaction may increase the user's influence value. In contrast, if a user posts one hundred feed items resulting in only 10 shares of a feed item, this reaction may be weighted less. In another example, if a user receives likes, comments, and shares of his post from one hundred different people instead of one hundred messages from one person, then this may be weighted more heavily in calculating an entity's level of influence.

At block 1806, a value that represents the entity's level of influence is calculated based on the weight information that was applied in block 1804. In some implementations, the weighted values of each factor may be summed to calculate the entity's level of influence. In some implementations, a custom algorithm may be executed to calculate the entity's level of influence. For example, the algorithm may calculate the number of messages (posts, comments, likes, private messages, shares) generated by a user, Jackie Chang. Then, a summation of user reactions to Jackie's messages is calculated. The user reactions include posts, comments, likes and shares generated by other users in response to Jackie's messages. In this example, the summation is calculated as follows: (2×number of comments)+(3×number of posts)+(number of likes)+(5×shares). Then, Jackie's level of global influence is the ratio of the number of messages generated by Jackie to the summation of user reactions. The same algorithm can be applied to calculate other entities' respective levels of influence.

At 1808, it is determined whether the calculated value meets or exceeds a threshold level that indicates that the entity is a global influencer in the online social network. In some implementations, the threshold value may designate different influence ranges. For example, a value calculated at block 1806 that falls within the 0-30 range may be identified as an observer. If the value is within 31-69, then the entity is an active influencer. Otherwise, the entity is a top influencer. In this example, an entity may be identified as an observer if the entity's contributions provoke little or no engagement with other entities. In contrast, an active influencer or a top influencer is an entity that actively contributes information and content in the online social network (e.g., by creating comments, posts, and other messages) that cause other users to react and perform actions ("like", comment, share, @mention the influencer) in response those messages.

In some implementations, at block 1808, if it is determined that the entity is not an influencer, method 1800 ends. Alternatively, if it is determined that the entity is an influencer, appropriate data is stored in one or more storage mediums at block 1810. For example, the influence value of block 1806 may be stored in a database table in connection with a user ID, and the influence value may be periodically updated as new user interactions are detected. This way, a running influence value may be maintained for a user, and when the value meets or exceeds the threshold level, the user may be identified as a contributor to a global influencer highlight source. FIG. 17 shows an example of a global influence table 1710 that may be used in tracking global influencers. Global influence table 1700 includes columns of user ID 1711 and global influence value 1713. Returning to FIG. 16, in some implementations, the parameters defining a highlight source in block 1604 can include a threshold global influence value.

Figure 18B:
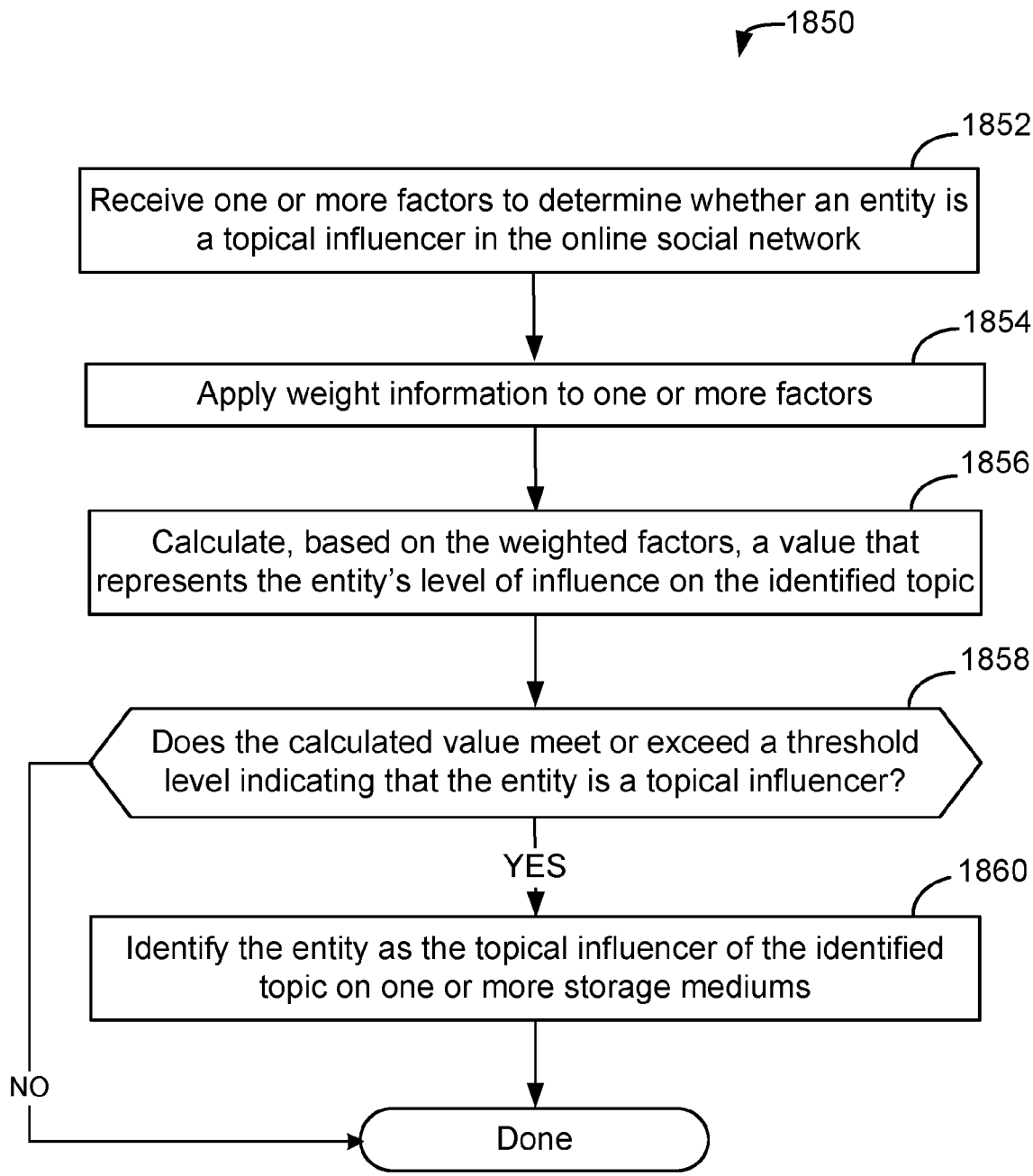
FIG. 18B shows a flowchart of an example of a computer implemented method 1850 for determining whether an entity is a topical influencer of an identified topic based on one or more factors, performed in accordance with some implementations.

FIG. 18B shows a flowchart of an example of a computer implemented method 1850 for determining whether an entity is a topical influencer of an identified topic based on one or more factors, performed in accordance with some implementations. The one or more factors are used as indicators of an entity's contributions of content to a topic and the breadth of dissemination of these contributions to other entities in an online social network. Any one or more factors, including combinations of selected factors in block 1852 can be applied to determine whether an entity is a topical influencer of an identified topic.

In some implementations, some of the factors are based on how an entity's contribution to a topic impacts other online social network users, groups, organizations, and other entities. For instance, some of the factors measure whether an entity's post on a topic causes other entities to react or perform an action. For example, a user, Dr. Sanjay Gupta, posts a feed item about treatment of blood clots in the human body. In this example, the number of preference indications, such as "likes," "+1", emoticons (☺, ☻), and comments received in response to Dr. Sanjay Gupta's post may be used as factors to determine Gupta's influence on blood clots. Additionally, the number of times Dr. Sanjay Gupta's post is shared in the online social network, such as re-tweets in Twitter®, re-shares in Google+®, shares in Facebook®, etc. add to Dr. Sanjay Gupta's influence factor as well as indicate Dr. Sanjay Gupta's reach in engaging other users with his content.

In some implementations, some of the factors are based on the influence of the topic in an online social network. For example, a number of times a topic is discussed by other users in an online social network, or a number of users discussing blood clots, can be a factor. Additionally, the factors could include the number of followers of a topic profile page. In this example, if a topic has a high number of followers, then the topic may be considered influential because a lot of users, groups, and other entities are interested in the topic.

In some implementations, some of the factors relate to an entity contributing information to a topic. For instance, the number of times a topic is included in a message submitted by a user, the number of times the user accesses a topic feed, or the number of times comments and posts include content about a topic may be a factor to determine a user's topical influence. In some instances, the factors may also include the number of times the entity has been recognized as an expert or authority regarding the topic. For example, users, groups and organizations may endorse Dr. Sanjay Gupta as an expert on blood clots. In some other instances, a number of times user-submitted messages that include content identifying an entity and a topic may be used. In yet some other instances, the factors may include a number of times an entity is @mentioned in messages submitted by other users. In some instances, topical influence may be based on an association of an entity profile page with the topic. For example, a user may indicate some topics that are of interest and topics that he is following in his user profile information. This information can be used as a factor in determining topical influence.

At block 1854, weight information is applied to one or more factors. As in the method 1800, in some implementations, numerical weights can be applied to any one or more of the various factors based on the importance of the factor. In some implementations, the weight may depend on how an entity's contribution to a topic engages other entities in an online social network. For example, if a feed item submitted by a user is shared over one hundred times in an online social network, this reaction may increase the user's topical influence value. In contrast, if a user posts one hundred feed items resulting in only 10 shares of a feed item, this reaction may be weighted less. In another example, if a user receives likes, comments, and shares of his post from one hundred different people instead of one hundred messages from one person, then this may be weighted more heavily in calculating an entity's level of influence on a topic.

At block 1856, a value that represents the entity's level of influence on the identified topic is calculated based on the weight information that was applied in block 1854. As in the method 1800, in some implementations, the weighted values of each factor may be summed to calculate the entity's level of influence. In some implementations, a custom algorithm may be executed to calculate the entity's level of influence. For example, a user's level of topical influence may be or include the ratio of the number of messages generated by the user to the summation of user reactions.

At 1858, it is determined whether the calculated value meets or exceeds a threshold level that indicates that the entity is a topical influencer. In some implementations, the threshold value may designate different topical influence ranges. For example, a value calculated at block 1856 that falls within the 0-30 range may be identified as an observer. If the value is within 31-69, then the entity is an active influencer. Otherwise, the entity is a top influencer. In this example, an entity is identified as an observer if the entity occasionally posts messages and sporadically comments on, shares or "likes" messages about a topic. In contrast, an active influencer or a top influencer is an entity that actively contributes information and content about a topic by creating messages (e.g., comments, posts) that causes other users to react and perform actions ("like", comment, share, @mention the topical influencer) in response those messages.

In some implementations, at block 1858, if it is determined that the entity is not a topical influencer, method 1850 ends. Alternatively, if it is determined that the entity is a topical influencer, appropriate data is stored in one or more storage mediums at block 1860. For example, the topical influence value of block 1856 may be stored in a database table in connection with a user ID, and the topical influence value may be periodically updated as new user interactions with the identified topic are detected. This way, a running topical influence value may be maintained for a user, and when the value meets or exceeds the threshold level, the user may be identified as a contributor to a topical influencer highlight source. In some implementations, the entity identified in the database table may be one of many entities that are topical influencers on a corresponding topic. FIG. 17 shows an example of a topical influence table 1720 that may be used in tracking topical influencers to define one or more topical influence highlight sources. Topical influence table 1720 includes columns of topic ID 1721, user ID 1723 and topical influence value 1725. In the example of FIG. 17, user U761 may be identified as an observer for topic T199 based on the topical influence value, user U777 may be identified as an active influencer of topic T199, and users U098 and U521 may be identified as top influencers of topic T199. Returning to FIG. 16, in some implementations, the parameters defining a highlight source in block 1604 can include a threshold topical influence value for a topic.

While the tables 1710 and 1720 in the example of FIG. 17 show users as possible contributing entities to a highlight source, non-limiting examples of entity types that may contribute to an influence highlight source include users, groups, organizations, records, feeds and other social networking constructs. For example, in some implementations, an influence highlight source may consider only certain types of entities. Further, in some implementations, an influence among a sub-set of an online social network may be considered. For example, an influence highlight source may consider only those users and/or other entities that exert the most influence among users and other entities in a particular geographic region (e.g., entities influential in Asia), among users having a particular seniority status or job title (e.g., entities influential with senior level executives or with salespeople), with a particular client, etc.

While an inner circle highlight source (or other highlight source based on an interaction level with a first user) may represent a collection of entities unique to a first user or group of first users, an influence highlight source may provide highlights across multiple users of an online social network. For example, a global influence highlight source that considers entities that exert influence across the online social network may provide highlights to all users on the online social network. In another example, an influence source that considers entities that exert influence in a certain geo-location may provide highlights to all users in that geo-location.

Another example of a highlight source is a topical highlight source. Topical highlights can consider topics relevant to a user. For example, in some implementations, a topical highlight source of a first user can consider information updates or other content in the online social network associated with a topic that the first user most commonly discusses in posted content. In some implementations, a topical highlight source can consider information updates or other content in the online social network associated with a topic that for which the user is an active or top influencer. According to various implementations, relevant topics to a first user can be system-generated or selected using any of the various available social network data stored and maintained in the social networking system. For example, a user can manually identify topics using a closed or open library of terms.

In some implementations, the system may consider topics associated with information updates or other content posted by a user or with which a user interacts most to identify relevant topics to the user or a group of users. FIG. 17 shows an example of a topical relevance table 1730. In the example of FIG. 17, topical relevance table 1730 includes columns of user ID 1731 and topic ID 1733. Topical relevance table 1730 includes relevant topics T412, T212, and T909 for user U919. In some implementations, a topical relevance table 1730 may include a topical relevance value indicating a degree of relevance to the user. Also in some implementations, the list of relevant topics to a user or a group of users can be updated periodically updated as new user interactions with topics are detected.

In some implementations, determining topics relevant to a user may include identifying topics associated with a user or other entity or a content posted by a user or other entity to the online social network. In some implementations, the identified topic may be the name of a user, a group, an account, a record, or some category of information. The category of information may indicate subject matter related to a product or a service, technology, software, music, movies, books, travel, or any other subject matter.

Relevance of a topic to a user can be based on one or more factors including how many posts, comments, or other content contributed by a user to the online social network is associated with the topic, the number of times the user includes keywords associated with the topic in his information updates or other feed items, the number of times the user has accessed or interacted with a topic profile page, the number of times the entity has been recognized as an expert or an authority regarding the topic, and the influence level of the user to the topic.

In some implementations, one or more servers may identify a topic associated with a feed item using the content of the feed item. For example, a designated character, word, phrase, symbol, expression (e.g., an emoticon), command, @mention, user ID and/or hash tag can be identified in the feed item. The designated information may be selected by a user or may be system-generated. In another example, a topic may be expressly identified in association with a feed item. Management of topics in an online social network is discussed further below with respect to FIG. 19.

Returning to FIG. 16, in some implementations, block 1604 may include receiving topics relevant to a first user as parameters. In some implementations, block 1604 may include identifying contributing entities to a topical highlight source as parameters. For example, in some implementations, contributing entities to a topical highlight source may include topical influencers of one or more topics that are most relevant to a user. In one example, a topic "blood clots" may be identified as being relevant to a user James V. based on one or more factors such as following a blood clots profile page, accessing a journal article associated with blood clots, and/or posting messages associated with the topic blood clots. In another example, as a topical influencer on blood clots, Dr. Sanjay Gupta, may be identified as a contributing entity to the topic blood clots.

Another example of a highlight source is a serendipity highlight source. Serendipity highlights can include topics, users, data objects, records, or other entities accessible through the social network feed that may be of interest to a user, but do not necessarily fall within any particular inner circle, influence, or common topic framework. Block 1604 of FIG. 16 can include receiving parameters based in whole or in part on random (including pseudo-random) sampling of content in the online social network. For example, one or more topics, users, data objects, or records may be identified at least in part by random sampling as parameters.

In some implementations, block 1604 may also involve receiving parameters based on one or more patterns in addition to or instead of random sampling to define a serendipity highlight source. For example, a system may consider a user's activity over time on the online social network, and may also consider other user's activities to identify a pattern. In one example, a server can be configured to perform analytics to identify and register various attributes of users based on their actions, personal profile information, and any input data such as messages received from them, and based on identified records and other objects acted upon by the users. As patterns are identified, such as the frequent and repeated mention of certain keywords among identifiable users, the server can be configured to automatically generate parameters specifying those keywords or other data representing the identified patterns. For example, if the system recognizes that a user is frequently in a particular geo-location (e.g., San Francisco), block 1604 may include receiving one or more topics popular with other users in that geo-location or top influencers of users in that geo-location as parameters. In another example, the system may recognize that user is interested in mid-sized companies and block 1604 may include receiving records related to similarly sized companies as parameters.

Further examples of highlight sources can include one or more transient highlight sources. A transient highlight source can include highlights relevant to a user based on one or more temporary or transient states of the user. Examples include one or more vital signs of the user (e.g., body temperature, pulse rate, heart rate, blood pressure, respiratory rate, or other physiological measurement), geo-location of the user (e.g., work, home, commute route, Shanghai, Market Street in San Francisco, etc.), and mood of the user (e.g., happy, content, angry, etc.). According to various implementations, a transient state may be automatically detected by the system, a user device and/or input by a user. For example, a system may determine a mood of a user based on one or more emoticons and/or indications of preference input by a user. In another example, a user device may be configured to measure the physiological statistics of the user such as pulse rate and/or eye movement. Block 1604 of FIG. 16 may include receiving parameters in the online social network relevant to the user based on one the one or more transient states. For example, if vital signs indicate that a user is stressed out, the system may identify parameters such as key clients or accounts that the user follows as being relevant to the user at that time. In another example, if the geo-location identifies the user as being at home on a weekend, the system may identify recreational topics or groups (e.g., a work softball league) as being relevant to the user at that time.

In FIG. 16, at block 1608, the one or more computing devices performing method 1600 are configured to apply the parameter or parameters of block 1604 to one or more attributes of information updates or other social network data in the online social network.

Parameters may be applied to social network data including information updates in a feed, topics, users, data objects, records, posts, messages, conversations, entities, records, uploaded files, products, advertisements, and multimedia data in the online social network. In some implementations, the social network data includes customer relationship management (CRM) data such as accounts, cases, contacts, leads, and opportunities. In some implementations, the social network data indicates a change in a field, a status, or a type of a CRM object. In some implementations, the social network data indicates an event in the online social network or in a CRM system. For example, an event can include updating a file, updating a CRM object, updating a user profile, and a user action.

Examples of attributes at block 1608 can include a user or other entity that publishes or is associated with the social network data and keywords (e.g., topics) associated with the social network data. For example, in the context of parameters of an inner circle highlight source applied to information updates, parameters can identify the users and other entities that are in a first user's inner circle, so that a subset of information updates in one or more feeds can be processed at block 1608. Parameters can be applied to various data associated with the information updates, including the content of an information update as well as header data, attached files, and other data linked or referenced by the information update. For instance, when a parameter identifies a specific entity belonging to an inner circle of the first user, the author or sender of a particular information update can be an attribute at block 1608. Similarly, for an influence highlight source, when a parameter identifies an entity as being an influencer (e.g., a global or topical influencer), the author or sender of a particular information update can be an attribute at block 1608. For a topical highlight source, when a parameter identifies a topic relevant to a first user, one or more keywords or topics associated with a particular information update can be an attribute at block 1608.

In FIG. 16, at block 1612, any information updates or other social network data having one or more attributes satisfying the one or more parameters at block 1608 are identified by the computing device or computing devices performing method 1600 as being associated with the highlight source. Examples of data identified at block 1612 can include information updates published by the first user's inner circle, information updates published by global influencers, information updates published by topical influencers of topics relevant to the first user, topics identified at least in part by random sampling of entities in the online social network, information updates published by topical influencers of these topics, information updates relevant to the first user based on one or more transient states of the first user, etc.

In some implementations, the information updates and/or other social network data identified in block 1612 may be identified as highlights to be received at block 1504 of method 1500. In some other implementations, the information updates and/or other online social network data may be further filtered based on one or more second parameters to produce a more relevant set of information updates and/or other online social network data. In FIG. 16, at block 1616, one or more second parameters can be received. Examples of second parameters can include parameters that indicate a trend and/or popularity of the information updates or other social network data. For example, a second parameter may include a threshold timeframe in which the information update or other social network data was published, modified, or accessed (e.g., past hour, week, or day). In another example, a second parameter may include a threshold number of times the social network data is commented on, shared, accessed, etc. Further examples of second parameters can include parameters that indicate a sentiment associated with the information update or other social network data. Associating sentiments with social network data is discussed further below with respect to FIG. 21. In some implementations, block 1616 can be performed as part of block 1604.

In FIG. 16, at block 1620, the one or more computing devices performing method 1600 are configured to apply the second parameter or parameters of block 1612 to one or more attributes of the information updates or other social network data identified in block 1612. In some implementations, block 1620 can be performed as part of block 1608. In FIG. 16, at block 1624, any information updates or other social network data having one or more attributes satisfying the one or more second parameters at block 1620 are identified by the computing device or computing devices performing method 1600 as being highlights from the highlight source. In some implementations, block 1624 can be performed as part of block 1612.

In FIG. 15, in one example, an on-demand service environment includes one or more processors configured to perform part or all of blocks 1604-1620 for each or highlight source or multiple highlight sources. For example, an on-demand service environment 200 of FIGS. 2A and 2B may include an inner circle highlights processor, a global influence highlights processor, a topical highlights processor, and a serendipity highlight processor.

Figure 19:
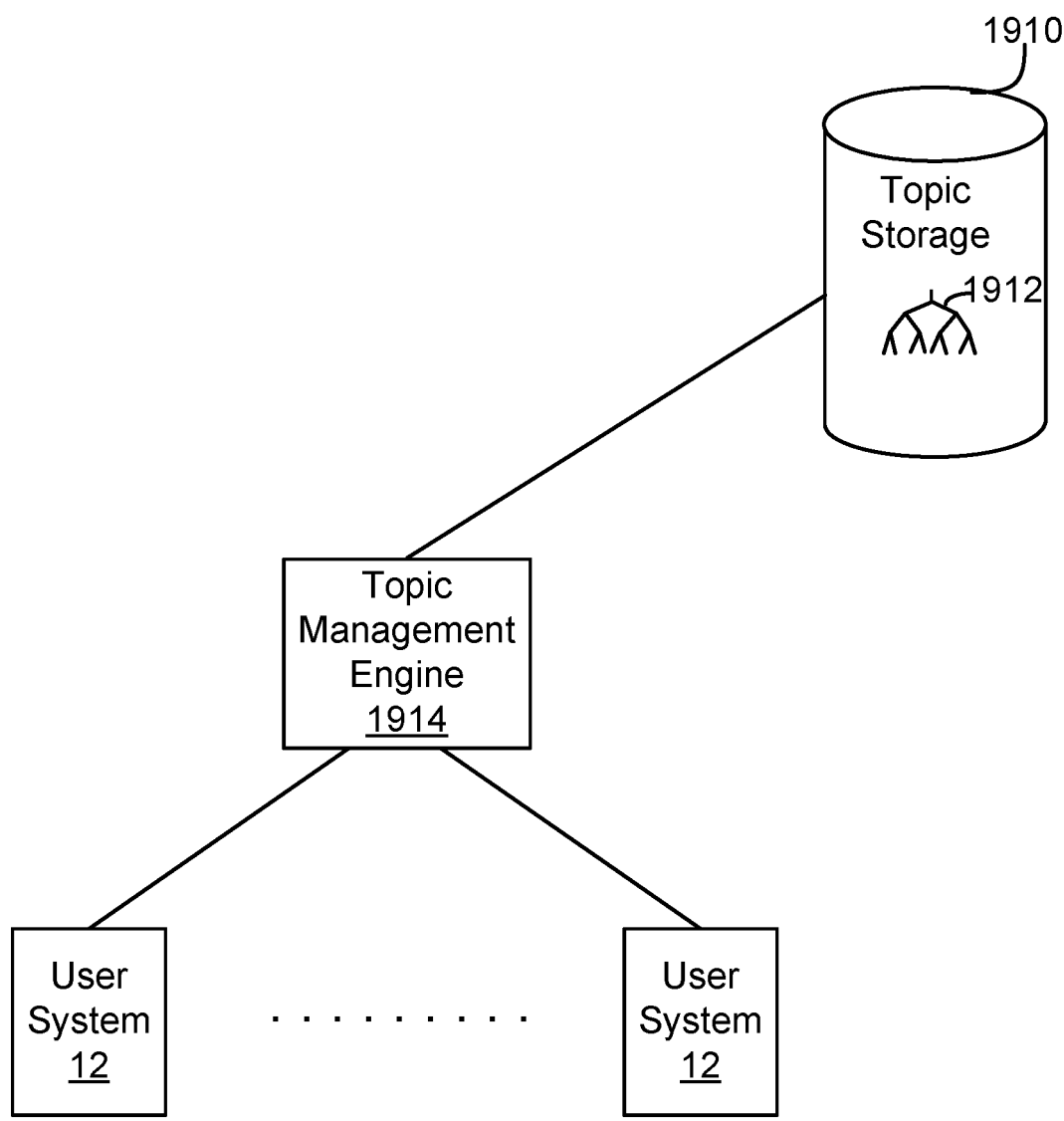
FIG. 19 shows an example of an environment 10 including components for managing topics in an online social network according to some implementations.

As indicated above, in some implementations one or more of blocks 1508 and 1512 in method 1500 can include retrieving associated topics from a storage media of the online social network. FIG. 19 shows an example of an environment 10 including components for managing topics in an online social network. Environment 10 includes topic storage 1910, topic management engine 1914, and user systems 12. Topic storage 1910 and topic management engine 1914 can be components of a database system, as described above with respect to FIGS. 1A and 1B. User systems 12 can interface with topic management engine 1914, for example, via a network, also as described above with respect to FIGS. 1A and 1B. For example, as a user submits information updates such as posts, comments, indications of the user's personal preferences, updates to a user's status, updates to a record, uploaded files, and hyperlinks to social network data or other network data such as various documents and/or web pages on the Internet, the topic management engine can associate the information update with one or more topics in topic library 1912 of topics. Topic library 1912 of topics can be stored in topic storage 1910 in any suitable data structure. In some implementations, topics can be stored in a hierarchical data structure, such as an ordered tree structure, e.g., a B-tree structure or a binary tree structure, and the like. The hierarchical data structure can include one or more top level categories, such as department, product, client, location, etc. each of which can have multiple levels of topics. In some implementations, topics may be stored in one or more database tables.

According to various implementations, library 1912 can be a closed or open library. For example, in some implementations, a topic library 1912 may include only a closed set of topics that may be associated with social network data. A closed topic library may be updated periodically, for example, by the system or an administrator. In some implementations, a user may submit any topic for inclusion in an open topic library 1912, for example, by tagging a post with the topic. According to various implementations, a topic library 1912 may be updated immediately on user submission or after review by a system administrator.

In some implementations, a user may associate a topic with an information update or other social network data, including information updates submitted by the user and/or other users. In some implementations, the topic management engine 1914 may automatically associate one or more topics with user-submitted information updates, e.g., by frequency or occurrence of keywords, phrases, symbols, etc. within a message, post, conversation thread, or other information update. In some implementations, associations of topics with information updates and other social network data may be stored in one or more database tables. FIG. 20 shows an example of a topic table 2000 that may be used in tracking information updates and topic associations in accordance with some implementations. Topic table 2000 can have columns of topic ID 2001 and associated information update IDs 2011. In implementations in which a hierarchical topic structure is used, parent and/or child topics may be stored in the topic table 2000. In some implementations, one or more of blocks 1508 and 1512 in method 1500 can include information from a database table such as topic table 2000.

In some implementations, data in the online social network may be filtered using sentiment information. For example, if a group of users or users within a group of users express a certain sentiment around a topic, e.g., positive or negative, this can alter whether information sources will be relevant to that user or group of users and/or another user or group of users. Accordingly, in some implementations, sentiment information can be used in block 1512 of method 1500.

Figure 21:
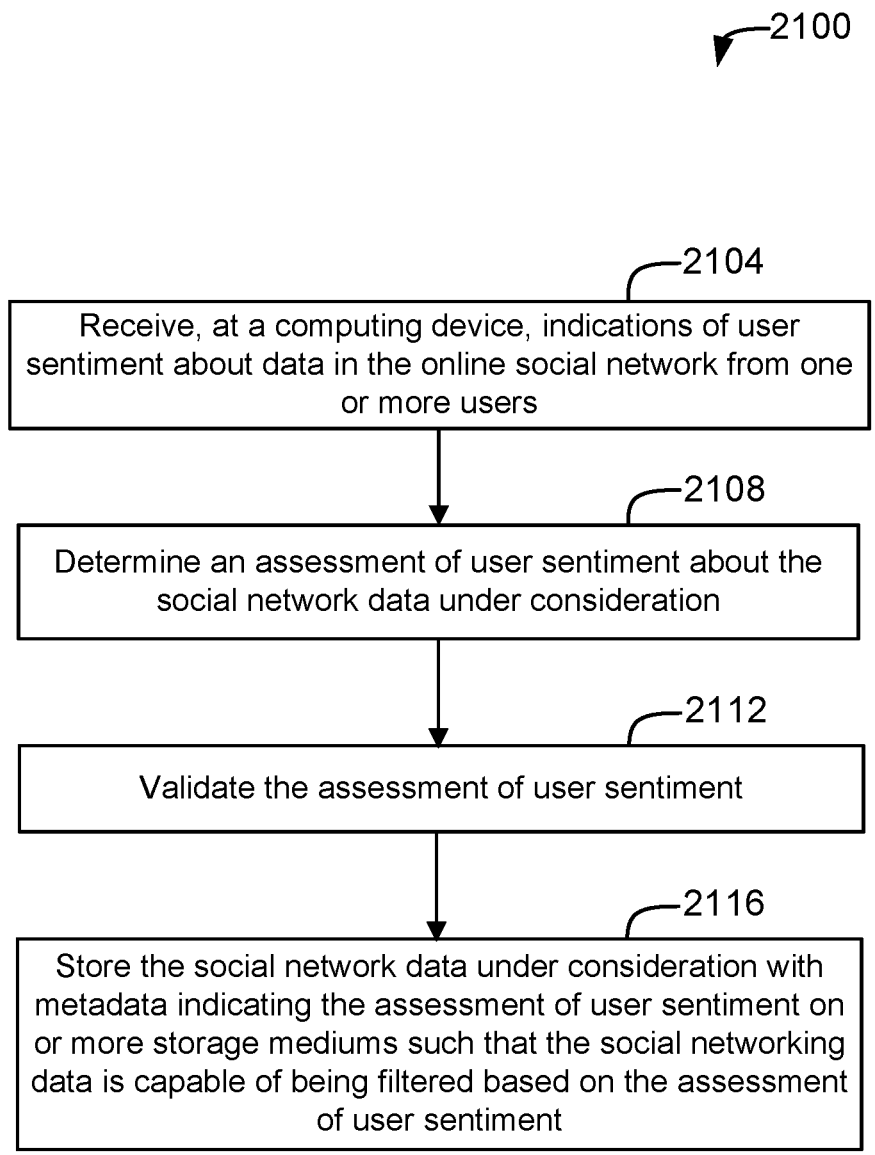
FIG. 21 shows a flowchart of an example of a computer implemented method 2100 for obtaining assessments of user sentiment in an online social network, performed in accordance with some implementations.

FIG. 21 shows a flowchart of an example of a computer implemented method 2100 for obtaining assessments of user sentiment in an online social network, performed in accordance with some implementations. At block 2104, a computing device or any number of computing devices cooperating to perform method 2100 receives indications of user sentiment about data in the online social network from one or more users. Information about user sentiment can be received for social network data, including social network data from one or more highlight sources as described above. For example, indications of user sentiment about one or more events, posts, messages, conversations, entities, records, updates to records, uploaded files, products, advertisements, multimedia data, and other data in the online social network can be received. Also, various indications and types of indications can be received at block 2104. In various implementations, an indication can be any user action or inaction related to the data in question. For example, an indication of user sentiment about an event such as converting a lead to an opportunity can be the user's answer to a survey about the event. In another example, an indication of user sentiment about a multimedia data such as client presentation can be a duration or frequency of the user accessing the client presentation. According to various implementations, the indications may be explicit and/or ambient. Explicit indications include user answers to surveys or other user input data about the social network data in question. Ambient indications include non-explicit user actions or inactions related to the social network data in question. Mouse, finger, and eye movements (or lack thereof) over a display device viewing area that includes the social network data are examples of ambient indications of user sentiment about the social network data.

In some implementations, indications received at block 2104 can include information about user sentiment of other users regarding the social network data in question. For example, an indication of user sentiment about an event received in block 2104 can include information about other users' sentiments regarding the event. In some implementations, indications received at block 2104 can information about the sentiment of a particular user regarding similar social network data. For example, an indication of user sentiment about a product received in block 1904 can include information about that user's sentiments regarding similar products.

In some instances, a suitable storage medium stores data used in block 2104, including social network data to be analyzed (e.g., record updates, multimedia presentations, etc.) and user sentiment indications (e.g., answers to surveys, duration or frequency of a user accessing the data, information about user sentiments regarding the same or similar social network data, etc.).

In FIG. 21, at block 2108, an assessment of user sentiment about the data under consideration is determined. The one or more computing devices performing method 2100 can cause the indications of user sentiment to be analyzed to determine the assessment of user sentiment. In various implementations, the analysis can be based on one or more of: explicit indications of user sentiment from one or more users, ambient indications of user sentiment from one or more users, user sentiment information of other users about the social network data, and user sentiment information about other data in the online social network. For example, block 2108 can include determining that a user is excited by an opportunity based on a user responding "yes" to the question "Are you excited by this opportunity?". In another example, block 2108 can include determining that a user is nervous about a draft presentation based on ambient signals such as the frequency, duration, time of day, day of week, etc. that a user accesses the draft presentation. In further examples, block 2108 can include determining that a user is confident about a deal based on information that other users are confident about the deal or determining that a user is interested in a lead based on information that the user is interested in other similar leads.

Depending in part on the number and types of sources of user sentiment indications, an analysis performed in block 2108 may be relatively simple (e.g., determining that a user is excited by an opportunity from a user indicating such on a survey) or more complex (e.g., determining that a user is nervous about an opportunity from indications such as the frequency, duration, time of day, etc. that a user accesses relevant data). In some implementations, block 2108 can include providing the indications of user sentiment to a data analysis tool. One example of a data analysis tool is Marketing Cloud®, provided by salesforce.com, inc. of San Francisco, Calif. An analysis performed at block 1908 can be performed by one or more servers of the online social network or by one or more third party servers.

In various implementations, the results of the analysis can provide an assessment of one or more sentiments of one or more users about the social network data under consideration, including happy, sad, pleased, angry, calm, nervous, excited, bored, engaged, annoyed, interested, uninterested, etc. In some implementations, the assessment can include information about the intensity of one or more sentiments, e.g., it may be determined at block 2108 that one or more users are "slightly nervous" about a deal or "extremely interested" in a record update. In some implementations, the assessment can include information about user sentiment along one or more spectra of sentiments. For example, an assessment of user sentiment may include an indication of the position of the sentiment along a spectrum having extremes of, for example, elation and sadness, surprise and anticipation, trust and distrust, love and hate, intrigue and boredom, etc.

In FIG. 21, at block 2112, the assessment of user sentiment about the data under consideration is validated. The one or more computing devices performing method 2100 can cause the assessment of user sentiment to be validated, e.g., by providing a prompt to a user, analyzing indications of user sentiment not considered in block 2108, or sending such indications of user sentiment to a system for analysis. In various implementations, the assessed user sentiment may be validated by comparing it with one or more of: explicit responses or acknowledgements by the one or more first users regarding the assessment, one or more ambient indications of the user sentiment about the social network data under consideration, information about user sentiment of other users regarding the social network data under consideration, and information about the sentiment of the one or more first users regarding similar social network data.

In some implementations, the validation at block 2112 can be performed as part of block 2108, using the same data analysis tool, or as an independent process. In some implementations, for example, a data analysis tool may be employed in block 2108 to determine that a user is excited by a document in the online social network based on the duration of time the user spends viewing the document, the number of times the user accesses the document, the types of devices that the user uses to access the document, and the number of people with whom the user shares the document, with block 2112 involving providing a prompt such as "are you excited?" that asks the user to acknowledge and accept the assessment of her sentiment.

Additional examples of ambient indications of user sentiment include indications of the following: a duration of the data under consideration being in viewing area of a display, whether the data is downloaded, mouse position or movement over a viewing area including the data, finger position or movement over a viewing area including the data, whether a user eye is focused on the data, a duration of a user eye being focused on the data, focused eye position or movement over a viewing area including the data, a user volume adjustment associated with the data, a duration of the data being viewed relative to other data in the online social network, the frequency that a user accesses the data, a number of times the user accesses the data, a number of devices used by the user to access the data, the types of device used to access the data, whether the user is stationary or moving while accessing the data, a change in user behavior associated with the data, whether the user shared the data with one or more other users, whether the user associated topics with the data, the number and identity of topics the user associated with the data, whether the user commented on the data, one or more keywords in a user comment associated with the data, the time of day that the data is accessed, the day of the week the data is accessed, the time of year the data is accessed, and one or more geo-locations from which the user accessed the data.

For example, if the data under consideration is a document posted to a feed of a user, ambient indications of user sentiment can include whether the user accesses the document, how many times the user accesses document, how long the document is in a viewing area of the display device, how many times the user clicks or drags a mouse on or over the document while the document is in a viewing area, how quickly the user scrolls through the document, whether the user edits the document, if the user accesses the document from one or locations (e.g., work, home, or a remote location), and the devices from which the user accesses the document. Additional indications may be received from devices configured for motion tracking, eye tracking, voice recognition, and the like. For example a vocal command to edit the document or a vocal reaction to the document may be an indication of user sentiment.

In FIG. 21, at block 2116, data identifying the social network data under consideration and the assessment of user sentiment indicated in block 2112 can be stored on a suitable storage medium such as tenant data storage 22 and/or system data storage 24 of FIGS. 1A and 1B or any of the various databases and/or memory devices disclosed herein for use in filtering social network data. For example, assessments of user sentiment may be employed at block 1512 of method 1500 to determine relevant highlights or other social network data to be presented to a user, or as one or more parameters used in blocks 1612 or 1620 of method 1600. In some implementations, information updates and metadata indicating their associated user sentiment can also be stored in one or more database tables that can be accessed to retrieve relevant information as part of a display feed. For example, a database table stored on a suitable storage medium can store one or more information updates in rows, with one or more columns identifying user sentiment information.

Figure 22:
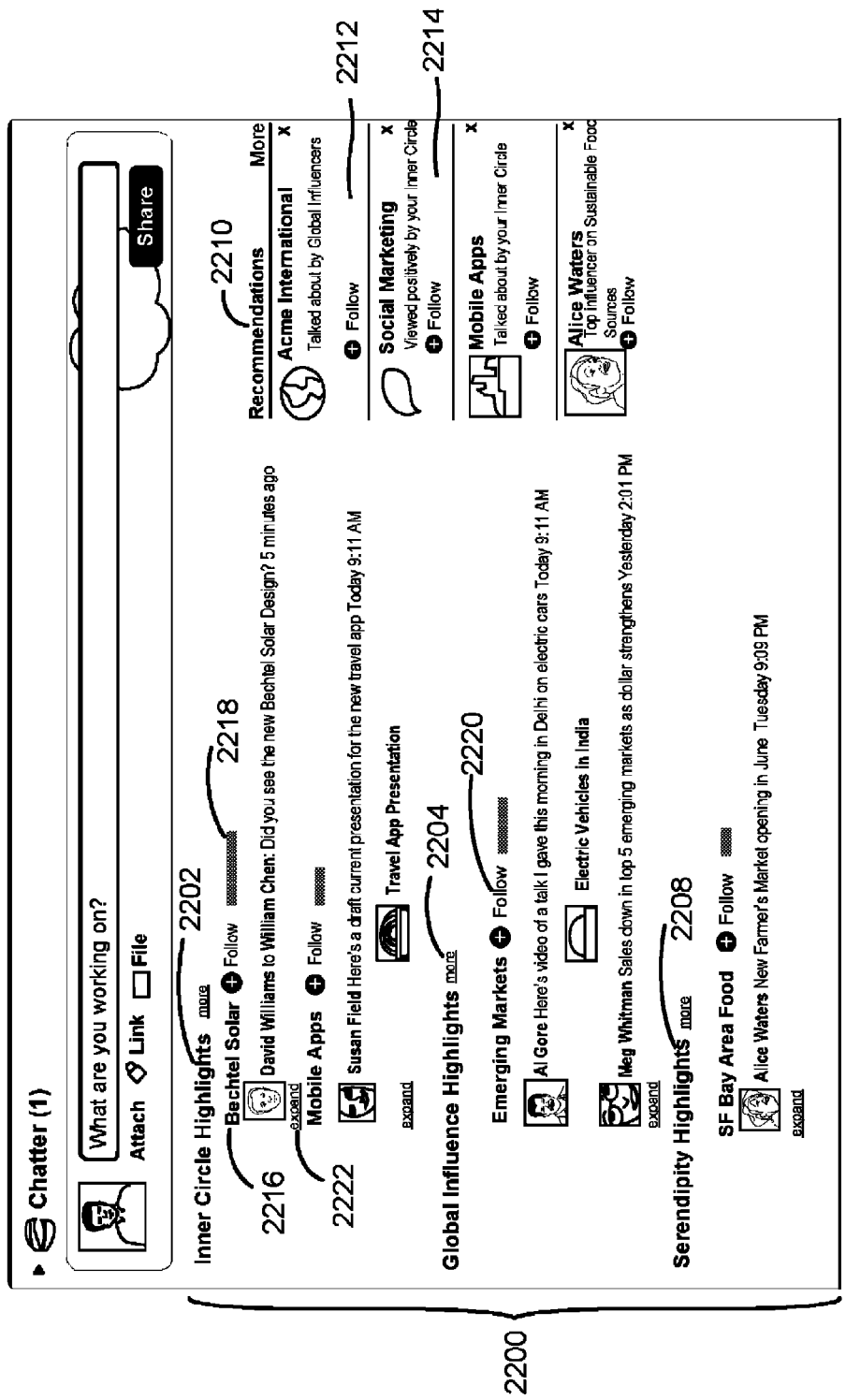
FIG. 22 shows an example of a feed 2200 displaying social network data derived from multiple highlight sources according to some implementations.

FIG. 22 shows an example of a feed 2200 displaying highlights from multiple highlight sources according to some implementations. The feed 2200 includes highlights from three highlight sources: inner circle highlights, global influence highlights, and serendipity highlights. In the example of FIG. 22, the highlights are displayed with an indication of their highlight source; for example, an indication 2202 of inner circle highlights is shown. In alternate implementations, highlights from multiple sources may be presented without an indication of the highlight sources. Inner circle highlights include topics "Bechtel Solar" and "Mobile Apps", global influence highlights includes the topic "Emerging Markets", and serendipity highlights include the topic "SF Bay Area Food". In some implementations, a visual indicator 2218 may show relative popularity or trending of each topic.

Figure 23:
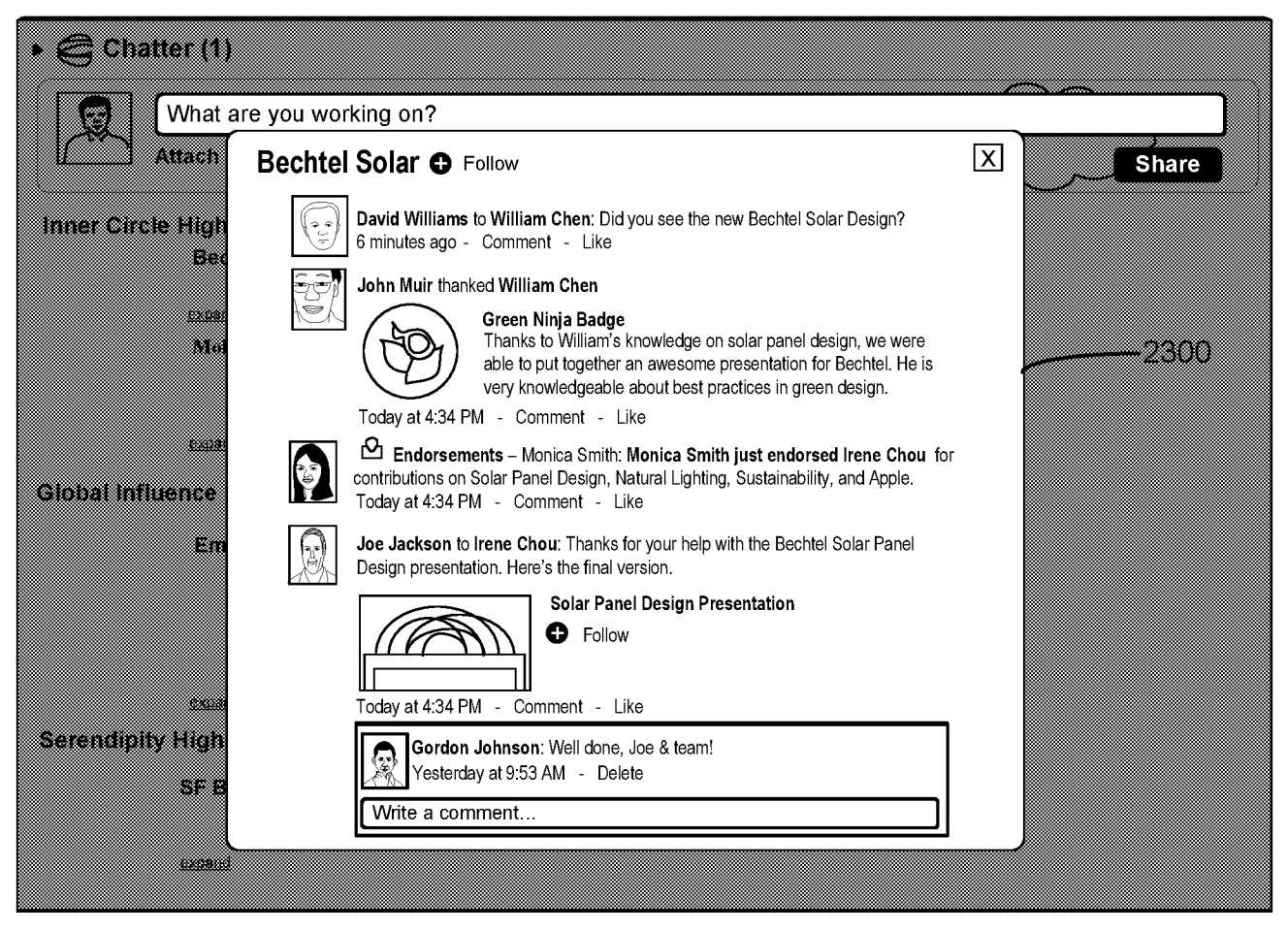

Also in the example of FIG. 22, one or more associated information updates is displayed with each topic. For example, at 2216, a portion of a conversation between David Williams and William Chen regarding the new Bechtel solar design is displayed. In another example, posts from Al Gore and Meg Whitman associated with the topic Emerging Markets are displayed. By clicking on a link, a user can expand the display of information updates associated with a topic. For example, by clicking on a link 2222, a user can see further information updates related to Bechtel Solar, either in the feed 2200, as an overlay of the feed 2200 or as a separate window, depending on the desired implementation. FIG. 23 shows an example of such an overlay window 2300. A user may also expand the highlights from any particular highlight source by clicking a link such as link 2204.

Further, in FIG. 22, the data sent to the display device may also include recommendations 2210 of other users, topics, groups, or other objects to follow. For example, in region 2212 is a recommendation that the user follow a company, Acme International. In some implementations, a recommendation may include an indication of a highlight source used to provide the recommendation; in region 2212, there is an indication that global influencers are talking about Acme International. A recommendation to follow a topic, Social Marketing, based on positive sentiment from the user's inner circle regarding the topic, is shown in region 2214.

In some instances, in addition to or instead of providing a recommendation in a GUI, for instance in the form of a pop-up window, an overlay window, or a separate page as described above, a suitable network communication can be sent to a user system, such as the user's smartphone. Such a network communication can be in the form of an email, a text message, a phone call, or a tweet including a recommendation.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A method comprising:
   maintaining, using a database system, a plurality of data objects identifying:
   a plurality of topics of a social networking system accessible by a plurality of users, and
   a plurality of highlight sources for sharing highlights of the social networking system with at least a first one of the users, the highlight sources comprising at least:
   a first subset of the users with which the first user communicates more than with others of the users, and
   a second subset of the users having more influence in the social networking system than others of the users;
   identifying, using the database system, a plurality of highlights from the highlight sources, the highlights comprising:
   social network data stored as or identifiable using data objects of the database system,
   a change in a field of a database record,
   a change in a status of a database record, and
   a change in a type of a database record;
   identifying, using the database system, one or more of the topics as being associated with the identified highlights;
   identifying, using the database system, online social network information based on the identified one or more topics;
   determining a user sentiment graph associated with the identified social network information;
   identifying, based on an overlap of the user sentiment graph with a user social graph and a user interest graph, a subset of the social network information as being relevant to the first user;
   storing or updating one or more data objects of the database system to identify the subset of social network information in association with the user sentiment graph;
   determining a characteristic of an assessment of a user sentiment based on the user sentiment graph; and
   causing code to be generated to display the characteristic of the assessment of the user sentiment in association with the subset of social network information on a device associated with the first user.

2. The method of claim 1, wherein the identified highlights comprise one or more of: posts, messages, conversations, record updates, uploaded files, advertisements, or multimedia data of the social networking system.

3. The method of claim 1, wherein the identified highlights comprise customer relationship management (CRM)

data associated with one or more of: an account, a case, a contact, a lead, or an opportunity.

4. The method of claim 1, further comprising:
assessing the user sentiment based on a plurality of user sentiments.

5. The method of claim 1, wherein the subset of social network information comprises all or a subset of the identified highlights.

6. The method of claim 1, wherein the subset of social network information identifies one or more of: users, records, topics, updates, or conversations.

7. The method of claim 1, further comprising:
generating a recommendation for the first user to follow one or more users; and
causing the recommendation to be displayed on the device associated with the first user.

8. The method of claim 1, the highlight sources further comprising:
a third subset of the users determined based at least in part on random selection, and
a subset of the topics designated as relevant to the first user.

9. A system comprising:
a database system implemented using a server system, the database system configurable to cause:
maintaining, using the database system, a plurality of data objects identifying:
a plurality of topics of a social networking system accessible by a plurality of users, and
a plurality of highlight sources for sharing highlights of the social networking system with at least a first one of the users, the highlight sources comprising at least:
a first subset of the users with which the first user communicates more than with others of the users, and
a second subset of the users having more influence in the social networking system than others of the users;
identifying, using the database system, a plurality of highlights from the highlight sources, the highlights comprising:
social network data stored as or identifiable using data objects of the database system,
a change in a field of a database record,
a change in a status of a database record, and
a change in a type of a database record;
identifying, using the database system, one or more of the topics as being associated with the identified highlights;
identifying, using the database system, online social network information based on the identified one or more topics;
determining a user sentiment graph associated with the identified social network information;
identifying, based on an overlap of the user sentiment graph with a user social graph and a user interest graph, a subset of the social network information as being relevant to the first user;
storing or updating one or more data objects of the database system to identify the subset of social network information in association with the user sentiment graph;
determining a characteristic of an assessment of a user sentiment based on the user sentiment graph; and
generating code to display the characteristic of the assessment of the user sentiment in association with the subset of social network information on a device associated with the first user.

10. The system of claim 9, wherein the identified highlights comprise one or more of: posts, messages, conversations, record updates, uploaded files, advertisements, or multimedia data of the social networking system.

11. The system of claim 9, wherein the identified highlights comprise customer relationship management (CRM) data associated with one or more of: an account, a case, a contact, a lead, or an opportunity.

12. The system of claim 9, wherein the identified social network information comprises all or a subset of the identified highlights.

13. The system of claim 9, the database system further configurable to cause:
generating a recommendation for the first user to follow one or more users; and
displaying the recommendation on the device associated with the first user.

14. The system of claim 9, the highlight sources further comprising:
a third subset of the users determined based at least in part on random selection, and
a subset of the topics designated as relevant to the first user.

15. A computer program product comprising program code to be executed by one or more processors when retrieved from a non-transitory computer-readable storage medium, the program code comprising instructions configurable to cause:
maintaining, using a database system, a plurality of data objects identifying:
a plurality of topics of a social networking system accessible by a plurality of users, and
a plurality of highlight sources for sharing highlights of the social networking system with at least a first one of the users, the highlight sources comprising at least:
a first subset of the users with which the first user communicates more than with others of the users, and
a second subset of the users having more influence in the social networking system than others of the users;
identifying, using the database system, a plurality of highlights from the highlight sources, the highlights comprising:
social network data stored as or identifiable using data objects of the database system,
a change in a field of a database record,
a change in a status of a database record, and
a change in a type of a database record;
identifying, using the database system, one or more of the topics as being associated with the identified highlights;
identifying, using the database system, online social network information based on the identified one or more topics;
determining a user sentiment graph associated with the identified social network information;
identifying, based on an overlap of the user sentiment graph with a user social graph and a user interest graph, a subset of the social network information as being relevant to the first user;

storing or updating one or more data objects of the database system to identify the subset of social network information in association with the user sentiment graph;

determining a characteristic of an assessment of a user sentiment based on the user sentiment graph; and generating code to display the characteristic of the assessment of the user sentiment in association with the subset of social network information on a device associated with the first user.

16. The computer program product of claim 15, wherein the identified highlights comprise customer relationship management (CRM) data associated with one or more of: an account, a case, a contact, a lead, or an opportunity.

17. The computer program product of claim 15, wherein the subset of social network information comprises all or a subset of the identified highlights.

18. The computer program product of claim 15, the instructions further configurable to cause:

generating a recommendation for the first user to follow one or more users; and displaying the recommendation on the device associated with the first user.

19. The computer program product of claim 15, the highlight sources further comprising:

a third subset of the users determined based at least in part on random selection, and a subset of the topics designated as relevant to the first user.

* * * * *